United States Patent
Henry et al.

(10) Patent No.: US 8,880,857 B2
(45) Date of Patent: Nov. 4, 2014

(54) CONDITIONAL ALU INSTRUCTION PRE-SHIFT-GENERATED CARRY FLAG PROPAGATION BETWEEN MICROINSTRUCTIONS IN READ-PORT LIMITED REGISTER FILE MICROPROCESSOR

(75) Inventors: G. Glenn Henry, Austin, TX (US);
Gerard M. Col, Austin, TX (US);
Rodney E. Hooker, Austin, TX (US);
Terry Parks, Austin, TX (US)

(73) Assignee: Via Technologies, Inc., New Taipei (TW)

( * ) Notice: Subject to any disclaimer, the term of this patent is extended or adjusted under 35 U.S.C. 154(b) by 536 days.

(21) Appl. No.: 13/333,572

(22) Filed: Dec. 21, 2011

(65) Prior Publication Data
US 2012/0260075 A1  Oct. 11, 2012

Related U.S. Application Data

(63) Continuation-in-part of application No. 13/224,310, filed on Sep. 1, 2011.

(60) Provisional application No. 61/473,062, filed on Apr. 7, 2011, provisional application No. 61/473,067, filed on Apr. 7, 2011, provisional application No. 61/473,069, filed on Apr. 7, 2011, provisional application No. 61/537,473, filed on Sep. 21, 2011.

(51) Int. Cl.
*G06F 9/30* (2006.01)
(52) U.S. Cl.
CPC ........ *G06F 9/30189* (2013.01); *G06F 9/30094* (2013.01); *G06F 9/30174* (2013.01)
USPC ......................................................... 712/226

(58) Field of Classification Search
CPC combination set(s) only.
See application file for complete search history.

(56) References Cited

U.S. PATENT DOCUMENTS

| | | | |
|---|---|---|---|
| 5,235,686 A | 8/1993 | Bosshart | |
| 5,396,634 A | 3/1995 | Zaidi et al. | |

(Continued)

FOREIGN PATENT DOCUMENTS

| | | |
|---|---|---|
| EP | 0709767 | 5/1996 |
| EP | 0747808 | 12/1996 |

(Continued)

OTHER PUBLICATIONS

Buchty, Rainer et al. "High-Performance and Hardware-aware Computing." Proceedings of the First International Workshop on New Frontiers in High-performance and Hardware-aware Computing (HipHac'08). Lake Como, Italy, Nov. 2008. pp. 1-8.

(Continued)

*Primary Examiner* — Eric Coleman
(74) *Attorney, Agent, or Firm* — E. Alan Davis; James W. Huffman

(57) ABSTRACT

A microprocessor includes a hardware instruction translator that translates an architectural instruction into first and second microinstructions. To execute the first microinstruction, an execution pipeline performs the shift operation on the first source operand to generate the first result and a carry flag value and updates a non-architectural carry flag with the generated carry flag value. To execute the second microinstruction, it performs the second operation on the first result and the second operand to generate the second result and new condition flag values based on the second result. If a architectural condition flags satisfy the condition, it updates the architectural carry flag with the non-architectural carry flag value and updates at least one of the other architectural condition flags with the corresponding generated new condition flag values; otherwise, it updates the architectural condition flags with the current value of the architectural condition flags.

25 Claims, 29 Drawing Sheets

(56) References Cited

U.S. PATENT DOCUMENTS

| | | | |
|---|---|---|---|
| 5,438,668 A * | 8/1995 | Coon et al. | 712/204 |
| 5,619,666 A | 4/1997 | Coon et al. | |
| 5,638,525 A | 6/1997 | Hammond et al. | |
| 5,664,215 A | 9/1997 | Burgess et al. | |
| 5,685,009 A | 11/1997 | Blomgren et al. | |
| 5,745,722 A | 4/1998 | Matsumoto et al. | |
| 5,781,457 A * | 7/1998 | Cohen et al. | 708/231 |
| 5,796,981 A | 8/1998 | Abudayyeh et al. | |
| 5,832,205 A | 11/1998 | Kelly et al. | |
| 5,832,297 A | 11/1998 | Ramagopal et al. | |
| 5,854,913 A | 12/1998 | Goetz et al. | |
| 5,887,152 A | 3/1999 | Tran | |
| 5,946,483 A | 8/1999 | Boutaud et al. | |
| 5,961,633 A | 10/1999 | Jaggar | |
| 6,076,155 A | 6/2000 | Blomgren et al. | |
| 6,178,482 B1 | 1/2001 | Sollars | |
| 6,374,346 B1 * | 4/2002 | Seshan et al. | 712/221 |
| 6,442,679 B1 | 8/2002 | Klauser et al. | |
| 6,571,316 B1 | 5/2003 | D'Souza et al. | |
| 6,611,909 B1 | 8/2003 | Roos et al. | |
| 6,647,489 B1 | 11/2003 | Col et al. | |
| 6,651,159 B1 | 11/2003 | Ramesh et al. | |
| 6,654,875 B1 | 11/2003 | Hartnett et al. | |
| 6,807,616 B1 | 10/2004 | McGrath et al. | |
| 6,871,273 B1 | 3/2005 | Moore | |
| 6,877,084 B1 | 4/2005 | Christie | |
| 6,880,152 B1 | 4/2005 | Torvalds et al. | |
| 6,889,312 B1 | 5/2005 | McGrath et al. | |
| 6,898,697 B1 | 5/2005 | Gao et al. | |
| 6,981,131 B2 | 12/2005 | Devereux | |
| 7,003,652 B2 | 2/2006 | Nevill et al. | |
| 7,047,394 B1 | 5/2006 | Van Dyke et al. | |
| 7,051,190 B2 | 5/2006 | Samra et al. | |
| 7,178,011 B2 | 2/2007 | Seal et al. | |
| 7,219,215 B2 | 5/2007 | Ford et al. | |
| 7,237,098 B2 | 6/2007 | Henry et al. | |
| 7,272,622 B2 * | 9/2007 | Sebot et al. | 708/200 |
| 7,299,343 B2 | 11/2007 | Kalluri et al. | |
| 7,353,368 B2 * | 4/2008 | Chow et al. | 712/229 |
| 7,478,388 B1 | 1/2009 | Chen et al. | |
| 7,617,388 B2 * | 11/2009 | Kissell | 712/242 |
| 7,624,256 B2 | 11/2009 | Sartorius et al. | |
| 7,647,480 B2 | 1/2010 | Ford et al. | |
| 7,925,868 B2 | 4/2011 | Lataille et al. | |
| 8,090,931 B2 | 1/2012 | Col et al. | |
| 2001/0008563 A1 | 7/2001 | Yamaura et al. | |
| 2001/0010072 A1 | 7/2001 | Yoshida | |
| 2001/0044891 A1 | 11/2001 | McGrath et al. | |
| 2002/0053013 A1 | 5/2002 | Sollars | |
| 2002/0194458 A1 | 12/2002 | Soni | |
| 2003/0018880 A1 | 1/2003 | Litaize et al. | |
| 2003/0061471 A1 | 3/2003 | Matsuo | |
| 2003/0188140 A1 | 10/2003 | Henry et al. | |
| 2004/0034757 A1 | 2/2004 | Gochman et al. | |
| 2004/0148496 A1 | 7/2004 | Thimmannagari et al. | |
| 2005/0081017 A1 | 4/2005 | Rupley, II et al. | |
| 2005/0091474 A1 | 4/2005 | Wojewoda et al. | |
| 2005/0188185 A1 | 8/2005 | Grochowski | |
| 2006/0179288 A1 | 8/2006 | Mellvaine et al. | |
| 2006/0236078 A1 | 10/2006 | Sartorius et al. | |
| 2007/0074010 A1 | 3/2007 | Nakajima | |
| 2007/0208924 A1 | 9/2007 | Ford et al. | |
| 2008/0046704 A1 | 2/2008 | Tanaka et al. | |
| 2008/0065862 A1 | 3/2008 | Hansen et al. | |
| 2008/0072011 A1 | 3/2008 | Kitamura | |
| 2008/0189519 A1 | 8/2008 | Gschwind et al. | |
| 2008/0216073 A1 | 9/2008 | Yates et al. | |
| 2008/0256336 A1 | 10/2008 | Henry et al. | |
| 2008/0276069 A1 | 11/2008 | Blaner et al. | |
| 2008/0276072 A1 | 11/2008 | Rychlik | |
| 2009/0006811 A1 | 1/2009 | Badran-Louca et al. | |
| 2009/0031116 A1 | 1/2009 | Sudhakar et al. | |
| 2009/0204785 A1 | 8/2009 | Yates, Jr. et al. | |
| 2009/0204800 A1 | 8/2009 | Hooker et al. | |
| 2009/0228691 A1 | 9/2009 | Furuta et al. | |
| 2009/0300331 A1 | 12/2009 | Gschwind et al. | |
| 2010/0070741 A1 | 3/2010 | Col et al. | |
| 2010/0274988 A1 | 10/2010 | Mimar | |
| 2010/0287359 A1 | 11/2010 | Norden | |
| 2010/0299504 A1 | 11/2010 | Henry et al. | |
| 2010/0332787 A1 | 12/2010 | Grohoski et al. | |
| 2011/0035569 A1 | 2/2011 | Col et al. | |
| 2011/0047357 A1 | 2/2011 | Stempel et al. | |
| 2011/0225397 A1 | 9/2011 | Grisenthwaite et al. | |
| 2012/0260042 A1 | 10/2012 | Henry et al. | |
| 2012/0260064 A1 | 10/2012 | Henry et al. | |
| 2012/0260065 A1 | 10/2012 | Henry et al. | |
| 2012/0260066 A1 | 10/2012 | Henry et al. | |
| 2012/0260067 A1 | 10/2012 | Henry et al. | |
| 2012/0260068 A1 | 10/2012 | Henry et al. | |
| 2012/0260071 A1 | 10/2012 | Henry et al. | |
| 2012/0260073 A1 | 10/2012 | Henry et al. | |
| 2012/0260074 A1 | 10/2012 | Henry et al. | |
| 2013/0067199 A1 | 3/2013 | Henry et al. | |
| 2013/0067202 A1 | 3/2013 | Henry et al. | |
| 2013/0097408 A1 | 4/2013 | Seal et al. | |
| 2013/0305013 A1 | 11/2013 | Ebersole | |
| 2013/0305014 A1 | 11/2013 | Ebersole | |

FOREIGN PATENT DOCUMENTS

| | | |
|---|---|---|
| EP | 1050803 | 11/2000 |
| EP | 1447742 | 8/2004 |
| WO | WO96/24895 A1 | 8/1996 |
| WO | WO0106354 A1 | 1/2001 |
| WO | WO02097612 A1 | 12/2002 |
| WO | WO2009056205 A1 | 5/2009 |
| WO | WO2012138950 A2 | 10/2012 |
| WO | WO2012138952 A1 | 10/2012 |
| WO | WO2012138957 A1 | 10/2012 |

OTHER PUBLICATIONS

"System/360, Model 30, 1401 Compatibility Feature." IBM Systems Reference Library. File No. S360-13, Form A24-3255-1. Revised Apr. 1964. pp. 5-12.

McCormack, M.A. et al. "1401 Compatibility Feature on the IBM System/360 Model 30." IBM Corporation, Endicott, New York. Downloaded May 11, 2011 from http://www.ibm-1401.info/ACM1401Sim.html. pp. 1-8.

Silberman, Gabriel M. et al. "An Architectural Framework for Supporting Heterogeneous Instruction-Set Architectures." IBM T.J. Watson Research Center. 8153 Computer, Jun. 26, 1993. No. 6 IEEE. XP000377627 pp. 39-56.

"Instruction Set Architectures." ARM the Architecture for the Digital World. Downloaded on Feb. 21, 2011 from http://www.arm.com/products/processors/technologies/instruction-set-architectures.php. pp. 1-2.

Bellard, Fabrice. "QEMU, a Fast and Portable Dynamic Translator." USENIX Association. FREENIX Track: 2005 USENIX Annual Technical Conference. pp. 41-46.

"Binary Translation" Wikipedia, the free encyclopedia. Downloaded on May 5, 2011from http://en.wikipedia.org/wiki/Binary_translation. pp. 1-4.

Nakada, Takashi et al. "OROCHI: A Multiple Instruction Set SMT Processor." Taken from High-performance and Harware-aware Computing; Proceedings of the First International Workshop on New Frontiers in High-performance and Hareware-aware Computing (HipHaC'08) Nov. 2008. pp. 13-20.

Shimada, Hajime et al. "Outline of OROCHI: A Multiple Instruction Set Executable SMT Processor." Downloaded on May 5, 2011 from http://arch.naist.jp/~shimada/pub/iwia07.pdf. pp. 1-8.

"Jazelle" Wikipedia, the free encyclopedia. Downloaded on May 30, 2011 from http://en.wikipedia.org/wiki/Jazelle. pp. 1-5.

"Concurrency (2): Advanced Operating Systems (M) Lecture 17" School of Computing Science, University of Glasgow. Downloaded on May 5, 2011 from http://csperkins.org/teaching/adv-os/Lecture17-concurrency.pdf. pp. 1-15.

"Machine Code" Wikipedia, the free encyclopedia. Downloaded on May 23, 2011 from http;//en.wikipedia.org/wiki/Machine_code. pp. 1-4.

(56) References Cited

OTHER PUBLICATIONS

Chen, Jiunn-Yeu et al. "On Static Binary Translation and Optimization for ARM Based Applications." Downloaded on Aug. 26, 2011 from http://www.cs.princeton.edu/~thhung/pubs/odes08.pdf pp. 1-10.

Ebcioglu, Kemal et al. "DAISY: Dynamic Compilation for 100% Architectural Compatibility." IBM Research Report. RC 20538 Computer Science Aug. 5, 1996. pp. 1-84.

"Texas Instruments OMAP" Wikipedia, the free encyclopedia. Downloaded on May 16, 2011 from http://en.wikipedia.org/wiki/Texas_Instruments_OMAP. pp. 1-4.

"Transmeta" Wikipedia, the free encyclopedia. Downloaded on May 12, 2011 from http://en.wikipedia.org/wiki/Transmeta. pp. 1-8.

Wang Hao, Lee. "ARM Instruction Set Simulation on Multi-Core x86 Hardware." School of Computer Science, The University of Adelaide. Jun. 19, 2009. pp. 1-70 Downloaded on May 5, 2011 from http://cs.adelaide.edu.au/~brad/students/wanghao.pdf.

Gochman, Simcha et al. "The Intel® Pentium® M Processor: Microarchitecture and Performance." Intel® Technology Journal. vol. 7 Issue 02 Published May 21, 2003. ISSN 1535-864X pp. 21-36.

Osdata.com "Assembly Language: address space and addressing modes." Downloaded from http://www.osdata.com/topic/language/asm/address.htm. Downloaded Dec. 7, 2009. pp. 1-11.

Tendler, J.M. et al. "Power4 System Microarchitecture." IBM J. Res. & Dev. vol. 46 No. 1, Jan. 2002. pp. 5-25.

Intel® "Intel® Itanium® Architecture Software Deverloper's Manual." vol. 2: System Architecture. Revision 2.1 Document # 245318-004. Oct. 2002. pp. 2:35, 2:86 and pp. 2:115 thru 2:130.

Karaki, Hussein et al. "Multiple Instruction Sets Architecture (MISA)." Energy Aware Computing (ICEAC), 2011 International Conference on, IEEE Nov. 30, 2011 thru Dec. 2, 2011. pp. 1-6, XP032099542, ISBN: 978-1-4673-0466-5.

\* cited by examiner

*FLAG-UPDATING NON-PRE-SHIFTING ALUOP CC RD, R1, R2 (1044):*

FLAG-UPDATING PRE-SHIFTING CUALUOP CC RD, R1, R2, R3 (1054):

NON-FLAG-UPDATING PRE-SHIFTING ALUOP USES CARRY CC RD, R1, R2, R3 (1036):

NON-FLAG-UPDATING NON-PRE-SHIFTING ALUOP USES CARRY CC RD, R1, R2, R3 (1026):

NON-FLAG-UPDATING NON-PRE-SHIFTING ALUOP CC RD, R1, R2, R3 (1024):

FLAG-UPDATING NON-PRE-SHIFTING ALUOP CC RD, RD, R2 (2144):

FLAG-UPDATING PRE-SHIFTING CUALUOP CC RD, RD, R2, R3 (2154):

NON-FLAG-UPDATING PRE-SHIFTING ALUOP USES CARRY CC RD, RD, R2, R3 (2136):

NON-FLAG-UPDATING PRE-SHIFTING ALUOP CC RD, RD, R2, R3 (2134):

NON-FLAG-UPDATING NON-PRE-SHIFTING ALUOP USES CARRY CC RD, RD, R2, R3 (2126):

NON-FLAG-UPDATING NON-PRE-SHIFTING ALUOP CC RD, RD, R2, R3 (2124):

CONDITIONAL ALU INSTRUCTION PRE-SHIFT-GENERATED CARRY FLAG PROPAGATION BETWEEN MICROINSTRUCTIONS IN READ-PORT LIMITED REGISTER FILE MICROPROCESSOR

CROSS REFERENCE TO RELATED APPLICATION(S)

This application is a continuation-in-part of co-pending U.S. patent application Ser. No. 13/224,310, filed Sep. 1, 2011, which is hereby incorporated by reference in its entirety for all purposes and which claims priority to the following U.S. Provisional patent applications, each of which is also hereby incorporated by reference in its entirety for all purposes.

| Serial No. | Filing Date | Title |
| --- | --- | --- |
| 61/473,062 (CNTR.2547) | Apr. 07, 2011 | MICROPROCESSOR WITH CONDITIONAL LOAD INSTRUCTION |
| 61/473,067 (CNTR.2552) | Apr. 07, 2011 | APPARATUS AND METHOD FOR USING BRANCH PREDICTION TO EFFICIENTLY EXECUTE CONDITIONAL NON-BRANCH INSTRUCTIONS |
| 61/473,069 (CNTR.2556) | Apr. 07, 2011 | APPARATUS AND METHOD FOR HANDLING OF MODIFIED IMMEDIATE CONSTANT DURING TRANSLATION |

This application claims priority based on the above U.S. Provisional applications.

This application claims priority based on U.S. Provisional Application No. 61/537,473, filed Sep. 21, 2011, which is hereby incorporated by reference in its entirety for all purposes.

This application is related to the following U.S. Non-Provisional Applications, each of which is filed concurrently herewith.

| Serial No. | Filing Date | Title |
| --- | --- | --- |
| 13/333,520 (CNTR.2569) | Dec. 21, 2011 | EFFICIENT CONDITIONAL ALU INSTRUCTION PERFORMANCE BY READ-PORT LIMITED REGISTER FILE MICROPROCESSOR |
| 13/333,631 (CNTR.2618) | Dec. 21, 2011 | CONDITIONAL ALU INSTRUCTION CONDITION SATISFACTION PROPAGATION BETWEEN MICRO-INSTRUCTIONS BY READ-PORT LIMITED REGISTER FILE MICROPROCESSOR |

FIELD OF THE INVENTION

The present invention relates in general to the field of microprocessors, and particularly to microprocessors that include conditional instructions in their instruction set.

BACKGROUND OF THE INVENTION

The x86 processor architecture, originally developed by Intel Corporation of Santa Clara, Calif., and the Advanced RISC Machines (ARM) architecture, originally developed by ARM Ltd. of Cambridge, UK, are well known in the art of computing. Many computing systems exist that include an ARM or x86 processor, and the demand for them appears to be increasing rapidly. Presently, the demand for ARM architecture processing cores appears to dominate low power, low cost segments of the computing market, such as cell phones, PDA's, tablet PCs, network routers and hubs, and set-top boxes (for example, the main processing power of the Apple iPhone and iPad is supplied by an ARM architecture processor core), while the demand for x86 architecture processors appears to dominate market segments that require higher performance that justifies higher cost, such as in laptops, desktops and servers. However, as the performance of ARM cores increases and the power consumption and cost of certain models of x86 processors decreases, the line between the different markets is evidently fading, and the two architectures are beginning to compete head-to-head, for example in mobile computing markets such as smart cellular phones, and it is likely they will begin to compete more frequently in the laptop, desktop and server markets.

This situation may leave computing device manufacturers and consumers in a dilemma over which of the two architectures will predominate and, more specifically, for which of the two architectures software developers will develop more software. For example, some entities purchase very large amounts of computing systems each month or year. These entities are highly motivated to buy systems that are the same configuration due to the cost efficiencies associated with purchasing large quantities of the same system and the simplification of system maintenance and repair, for example. However, the user population of these large entities may have diverse computing needs for these single configuration systems. More specifically, some of the users have computing needs in which they want to run software on an ARM architecture processor, and some have computing needs in which they want to run software on an x86 architecture processor, and some may even want to run software on both. Still further, new previously-unanticipated computing needs may emerge that demand one architecture or the other. In these situations, a portion of the extremely large investment made by these large entities may have been wasted. For another example, a given user may have a crucial application that only runs on the x86 architecture so he purchases an x86 architecture system, but a version of the application is subsequently developed for the ARM architecture that is superior to the x86 version (or vice versa) and therefore the user would like to switch. Unfortunately, he has already made the investment in the architecture that he does not prefer. Still further, a given user may have invested in applications that only run on the ARM architecture, but the user would also like to take advantage of fact that applications in other areas have been developed for the x86 architecture that do not exist for the ARM architecture or that are superior to comparable software developed for the ARM architecture, or vice versa. It should be noted that although the investment made by a small entity or an individual user may not be as great as by the large entity in terms of magnitude, nevertheless in relative terms the investment wasted may be even larger. Many other similar examples of wasted investment may exist or arise in the context of a switch in dominance from the x86 architecture to the ARM architecture, or vice versa, in various computing device markets. Finally, computing device manufacturers, such as OEMs, invest large amounts of resources into developing new products. They are caught in the dilemma also and may waste some of their valuable development resources if they develop and manufacture mass quantities of a system around the x86 or ARM architecture and then the user demand changes relatively suddenly.

It would be beneficial for manufacturers and consumers of computing devices to be able to preserve their investment regardless of which of the two architectures prevails. Therefore, what is needed is a solution that would allow system manufacturers to develop computing devices that enable users to run both x86 architecture and ARM architecture programs.

The desire to have a system that is capable of running programs of more than one instruction set has long existed, primarily because customers may make a significant investment in software that runs on old hardware whose instruction set is different from that of the new hardware. For example, the IBM System/360 Model 30 included an IBM System 1401 compatibility feature to ease the pain of conversion to the higher performance and feature-enhanced System/360. The Model 30 included both a System/360 and a 1401 Read Only Storage (ROS) Control, which gave it the capability of being used in 1401 mode if the Auxiliary Storage was loaded with needed information beforehand. Furthermore, where the software was developed in a high-level language, the new hardware developer may have little or no control over the software compiled for the old hardware, and the software developer may not have a motivation to re-compile the source code for the new hardware, particularly if the software developer and the hardware developer are not the same entity. Silberman and Ebcioglu proposed techniques for improving performance of existing ("base") CISC architecture (e.g., IBM S/390) software by running it on RISC, superscalar, and Very Long Instruction Word (VLIW) architecture ("native") systems by including a native engine that executes native code and a migrant engine that executes base object code, with the ability to switch between the code types as necessary depending upon the effectiveness of translation software that translates the base object code into native code. See "An Architectural Framework for Supporting Heterogeneous Instruction-Set Architectures," Siberman and Ebcioglu, Computer, June 1993, No. 6. Van Dyke et al. disclosed a processor having an execution pipeline that executes native RISC (Tapestry) program instructions and which also translates x86 program instructions into the native RISC instructions through a combination of hardware translation and software translation, in U.S. Pat. No. 7,047,394, issued May 16, 2006. Nakada et al. proposed a heterogeneous SMT processor with an Advanced RISC Machines (ARM) architecture front-end pipeline for irregular (e.g., OS) programs and a Fujitsu FR-V (VLIW) architecture front-end pipeline for multimedia applications that feed an FR-V VLIW back-end pipeline with an added VLIW queue to hold instructions from the front-end pipelines. See "OROCHI: A Multiple Instruction Set SMT Processor," Proceedings of the First International Workshop on New Frontiers in High-performance and Hardware-aware Computing (HipHaC'08), Lake Como, Italy, November 2008 (In conjunction with MICRO-41), Buchty and Weib, eds, Universitatsverlag Karlsruhe, ISBN 978-3-86644-298-6. This approach was proposed in order to reduce the total system footprint over heterogeneous System on Chip (SOC) devices, such as the Texas Instruments OMAP that includes an ARM processor core plus one or more co-processors (such as the TMS320, various digital signal processors, or various GPUs) that do not share instruction execution resources but are instead essentially distinct processing cores integrated onto a single chip.

Software translators, also referred to as software emulators, software simulators, dynamic binary translators and the like, have also been employed to support the ability to run programs of one architecture on a processor of a different architecture. A popular commercial example is the Motorola 68K-to-PowerPC emulator that accompanied Apple Macintosh computers to permit 68K programs to run on a Macintosh with a PowerPC processor, and a PowerPC-to-x86 emulator was later developed to permit PowerPC programs to run on a Macintosh with an x86 processor. Transmeta Corporation of Santa Clara, Calif., coupled VLIW core hardware and "a pure software-based instruction translator [referred to as "Code Morphing Software"] [that] dynamically compiles or emulates x86 code sequences" to execute x86 code. "Transmeta." Wikipedia. 2011. Wikimedia Foundation, Inc. <http://en.wikipedia.org/wiki/Transmeta>. See also, for example, U.S. Pat. No. 5,832,205, issued Nov. 3, 1998 to Kelly et al. The IBM DAISY (Dynamically Architected Instruction Set from Yorktown) system includes a VLIW machine and dynamic binary software translation to provide 100% software compatible emulation of old architectures. DAISY includes a Virtual Machine Monitor residing in ROM that parallelizes and saves the VLIW primitives to a portion of main memory not visible to the old architecture in hopes of avoiding re-translation on subsequent instances of the same old architecture code fragments. DAISY includes fast compiler optimization algorithms to increase performance. QEMU is a machine emulator that includes a software dynamic translator. QEMU emulates a number of CPUs (e.g., x86, PowerPC, ARM and SPARC) on various hosts (e.g., x86, PowerPC, ARM, SPARC, Alpha and MIPS). As stated by its originator, the "dynamic translator performs a runtime conversion of the target CPU instructions into the host instruction set. The resulting binary code is stored in a translation cache so that it can be reused . . . . QEMU is much simpler [than other dynamic translators] because it just concatenates pieces of machine code generated off line by the GNU C Compiler." QEMU, a Fast and Portable Dynamic Translator, Fabrice Bellard, USENIX Association, FREENIX Track: 2005 USENIX Annual Technical Conference. See also, "ARM Instruction Set Simulation on Multi-Core x86 Hardware," Lee Wang Hao, thesis, University of Adelaide, Jun. 19, 2009. However, while software translator-based solutions may provide sufficient performance for a subset of computing needs, they are unlikely to provide the performance required by many users.

Static binary translation is another technique that has the potential for high performance. However, there are technical considerations (e.g., self-modifying code, indirect branches whose value is known only at run-time) and commercial/legal barriers (e.g., may require the hardware developer to develop channels for distribution of the new programs; potential license or copyright violations with the original program distributors) associated with static binary translation.

One feature of the ARM ISA is conditional instruction execution. As the ARM Architecture Reference Manual states at page A4-3:

Most ARM instructions can be conditionally executed. This means that they only have their normal effect on the programmer's model operation, memory and coprocessors if the N, Z, C and V flags in the APSR satisfy a condition specified in the instruction. If the flags do not satisfy the condition, the instruction acts as a NOP, that is, execution advances to the next instruction as normal, including any relevant checks for exceptions being taken, but has no other effect.

Benefits of the conditional execution feature are that it potentially facilitates smaller code size and may improve performance by reducing the number of branch instructions and concomitantly the performance penalties associated with mispredicting them. Therefore, what is needed is a way to efficiently perform conditional instructions, particularly in a fashion that supports high microprocessor clock rates.

BRIEF SUMMARY OF INVENTION

In one aspect, the present invention provides a microprocessor having architectural condition flags that include an architectural carry flag and other architectural condition flags, wherein the microprocessor performs an architectural instruction that instructs the microprocessor to perform a shift operation on a first source operand to generate a first result, to perform a second operation on the first result and a second operand to generate a second result, and to write the second result to a destination register and update the condition flags only if the architectural condition flags satisfy a condition specified in the architectural instruction. The microprocessor includes a register that includes storage for the architectural condition flags and includes storage for a non-architectural carry flag. The microprocessor also includes a hardware instruction translator that receives the architectural instruction and responsively translates the architectural instruction into first and second microinstructions. The microprocessor also includes an execution pipeline that executes the microinstructions received from the hardware instruction translator. In response to the first microinstruction, the execution pipeline performs the shift operation on the first source operand to generate the first result and a carry flag value and updates the non-architectural carry flag with the generated carry flag value. In response to the second microinstruction, the execution pipeline performs the second operation on the first result and the second operand to generate the second result and new condition flag values based on the second result. Further in response to the second microinstruction, if the architectural condition flags satisfy the condition the execution pipeline updates the architectural carry flag with the non-architectural carry flag value and updates at least one of the other architectural condition flags with the corresponding generated new condition flag values, whereas if the architectural condition flags do not satisfy the condition the execution pipeline updates the architectural condition flags with the current value of the architectural condition flags.

In another aspect, the present invention provides a method for a microprocessor, having architectural condition flags that include an architectural carry flag and other architectural condition flags, to perform an architectural instruction that instructs the microprocessor to perform a shift operation on a first source operand to generate a first result, to perform a second operation on the first result and a second operand to generate a second result, and to write the second result to a destination register and update the condition flags only if the architectural condition flags satisfy a condition specified in the architectural instruction. The method includes translating the architectural instruction into first and second microinstructions, wherein the translating is performed by a hardware instruction translator of the microprocessor. The method also includes executing the first and second microinstructions received from the hardware instruction translator, wherein the executing is performed by an execution pipeline of the microprocessor. Executing the first microinstruction includes performing the shift operation on the first source operand to generate the first result and a carry flag value and updating a non-architectural carry flag with the generated carry flag value. Executing the second microinstruction includes performing the second operation on the first result and the second operand to generate the second result and new condition flag values based on the second result. Executing the second microinstruction also includes, if the architectural condition flags satisfy the condition, updating the architectural carry flag with the non-architectural carry flag value and updating at least one of the other architectural condition flags with the corresponding generated new condition flag values, and if the architectural condition flags do not satisfy the condition, updating the architectural condition flags with the current value of the architectural condition flags.

In yet another aspect, the present invention provides a computer program product encoded in at least one computer readable storage medium for use with a computing device, the computer program product comprising computer readable program code embodied in the medium for specifying a microprocessor having architectural condition flags that include an architectural carry flag and other architectural condition flags, wherein the microprocessor performs an architectural instruction that instructs the microprocessor to perform a shift operation on a first source operand to generate a first result, to perform a second operation on the first result and a second operand to generate a second result, and to write the second result to a destination register and update the condition flags only if the architectural condition flags satisfy a condition specified in the architectural instruction. The computer readable program code includes first program code for specifying a register that includes storage for the architectural condition flags and includes storage for a non-architectural carry flag. The computer readable program code also includes second program code for specifying a hardware instruction translator that receives the architectural instruction and responsively translates the architectural instruction into first and second microinstructions. The computer readable program code also includes third program code for specifying an execution pipeline that executes the microinstructions received from the hardware instruction translator. In response to the first microinstruction, the execution pipeline performs the shift operation on the first source operand to generate the first result and a carry flag value and updates the non-architectural carry flag with the generated carry flag value. In response to the second microinstruction, the execution pipeline performs the second operation on the first result and the second operand to generate the second result and new condition flag values based on the second result. Further in response to the second microinstruction, if the architectural condition flags satisfy the condition the execution pipeline updates the architectural carry flag with the non-architectural carry flag value and updates at least one of the other architectural condition flags with the corresponding generated new condition flag values, whereas if the architectural condition flags do not satisfy the condition the execution pipeline updates the architectural condition flags with the current value of the architectural condition flags.

DETAILED DESCRIPTION OF THE INVENTION

Glossary

Figure 1:
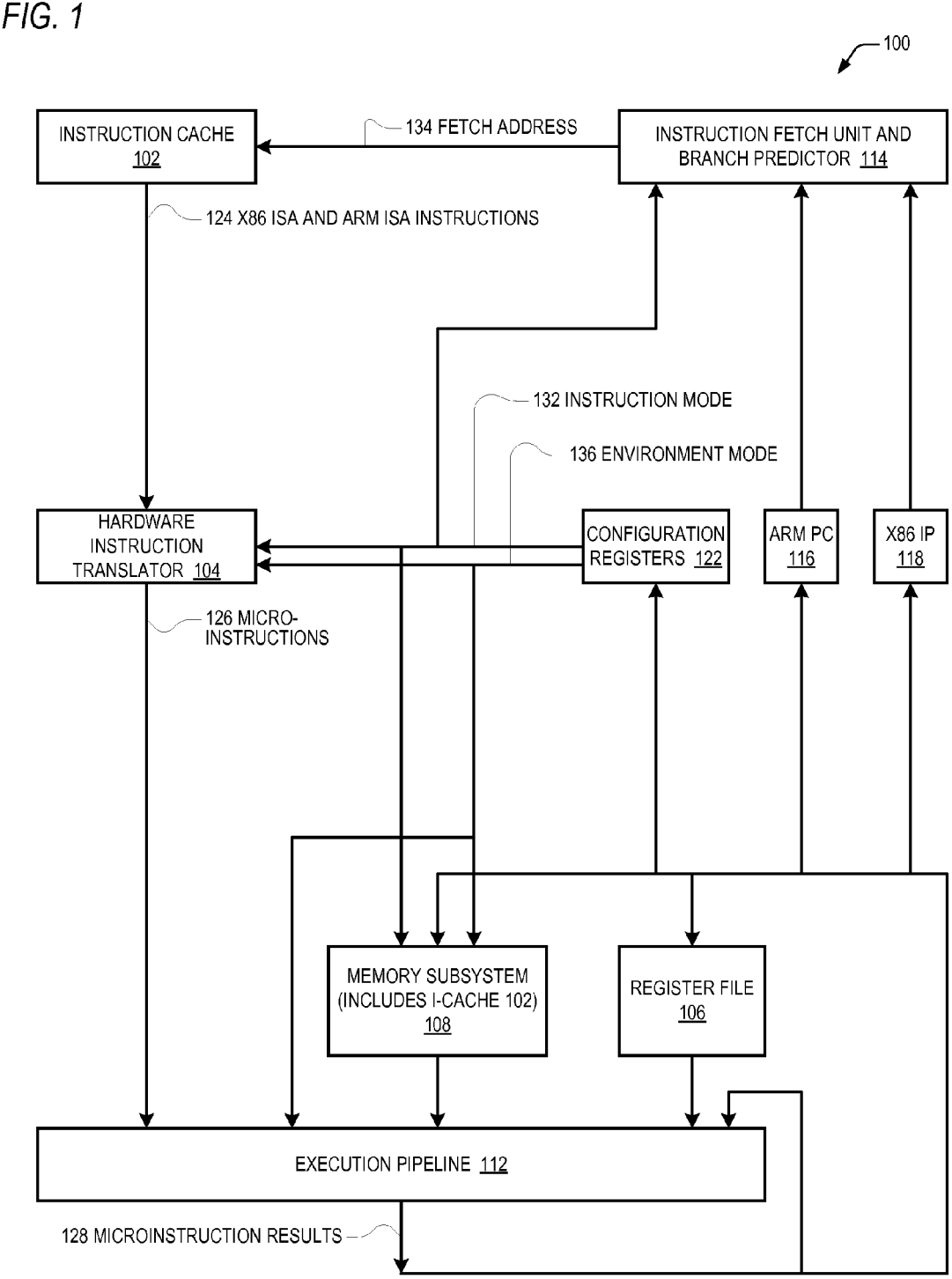
FIG. 1 is a block diagram illustrating a microprocessor that runs x86 ISA and ARM ISA machine language programs according to the present invention.

An instruction set defines the mapping of a set of binary encoded values, which are machine language instructions, to operations the microprocessor performs. (Typically, machine language programs are encoded in binary, although other number systems may be employed, for example, the machine language programs of some older IBM computers were encoded in decimal although they were ultimately represented by collections of physical signals having voltages sensed as binary values.) Illustrative examples of the types of operations machine language instructions may instruct a microprocessor to perform are: add the operand in register 1 to the operand in register 2 and write the result to register 3, subtract the immediate operand specified in the instruction from the operand in memory location 0x12345678 and write the result to register 5, shift the value in register 6 by the number of bits specified in register 7, branch to the instruction 36 bytes after this instruction if the zero flag is set, load the value from memory location 0xABCD0000 into register 8. Thus, the instruction set defines the binary encoded value each machine language instruction must have to cause the microprocessor to perform the desired operation. It should be understood that the fact that the instruction set defines the mapping of binary values to microprocessor operations does not imply that a single binary value maps to a single microprocessor operation. More specifically, in some instruction sets, multiple binary values may map to the same microprocessor operation.

An instruction set architecture (ISA), in the context of a family of microprocessors, comprises: (1) an instruction set, (2) a set of resources (e.g., registers and modes for addressing memory) accessible by the instructions of the instruction set, and (3) a set of exceptions the microprocessor generates in response to processing the instructions of the instruction set (e.g., divide by zero, page fault, memory protection violation). Because a programmer, such as an assembler or compiler writer, who wants to generate a machine language program to run on a microprocessor family requires a definition of its ISA, the manufacturer of the microprocessor family typically defines the ISA in a programmer's manual. For example, at the time of its publication, the Intel 64 and IA-32 Architectures Software Developer's Manual, March 2009 (consisting of five volumes, namely Volume 1: Basic Architecture; Volume 2A: Instruction Set Reference, A-M; Volume 2B: Instruction Set Reference, N-Z; Volume 3A: System Programming Guide; and Volume 3B: System Programming Guide, Part 2), which is hereby incorporated by reference herein in its entirety for all purposes, defined the ISA of the Intel 64 and IA-32 processor architecture, which is commonly referred to as the x86 architecture and which is also referred to herein as x86, x86 ISA, x86 ISA family, x86 family or similar terms. For another example, at the time of its publication, the ARM Architecture Reference Manual, ARM v7-A and ARM v7-R edition Errata markup, 2010, which is hereby incorporated by reference herein in its entirety for all purposes, defined the ISA of the ARM processor architecture, which is also referred to herein as ARM, ARM ISA, ARM ISA family, ARM family or similar terms. Other examples of well-known ISA families are IBM System/360/370/390 and z/Architecture, DEC VAX, Motorola 68k, MIPS, SPARC, PowerPC, and DEC Alpha. The ISA definition covers a family of processors because over the life of the ISA processor family the manufacturer may enhance the ISA of the original processor in the family by, for example, adding new instructions to the instruction set and/or new registers to the architectural register set. To clarify by example, as the x86 ISA evolved it introduced in the Intel Pentium III processor family a set of 128-bit XMM registers as part of the SSE extensions, and x86 ISA machine language programs have been developed to utilize the XMM registers to increase performance, although x86 ISA machine language programs exist that do not utilize the XMM registers of the SSE extensions. Furthermore, other manufacturers have designed and manufactured microprocessors that run x86 ISA machine language programs. For example, Advanced Micro Devices (AMD) and VIA Technologies have added new features, such as the AMD 3DNOW! SIMD vector processing instructions and the VIA Padlock Security Engine random number generator and advanced cryptography engine features, each of which are utilized by some x86 ISA machine language programs but which are not implemented in current Intel microprocessors. To clarify by another example, the ARM ISA originally defined the ARM instruction set state, having 4-byte instructions. However, the ARM ISA evolved to add, for example, the Thumb instruction set state with 2-byte instructions to increase code density and the Jazelle instruction set state to accelerate Java bytecode programs, and ARM ISA machine language programs have been developed to utilize some or all of the other ARM ISA instruction set states, although ARM ISA machine language programs exist that do not utilize the other ARM ISA instruction set states.

A machine language program of an ISA comprises a sequence of instructions of the ISA, i.e., a sequence of binary encoded values that the ISA instruction set maps to the sequence of operations the programmer desires the program to perform. Thus, an x86 ISA machine language program comprises a sequence of x86 ISA instructions; and an ARM ISA machine language program comprises a sequence of ARM ISA instructions. The machine language program instructions reside in memory and are fetched and performed by the microprocessor.

A hardware instruction translator comprises an arrangement of transistors that receives an ISA machine language instruction (e.g., an x86 ISA or ARM ISA machine language instruction) as input and responsively outputs one or more microinstructions directly to an execution pipeline of the microprocessor. The results of the execution of the one or more microinstructions by the execution pipeline are the results defined by the ISA instruction. Thus, the collective execution of the one or more microinstructions by the execution pipeline "implements" the ISA instruction; that is, the collective execution by the execution pipeline of the implementing microinstructions output by the hardware instruction translator performs the operation specified by the ISA instruction on inputs specified by the ISA instruction to produce a result defined by the ISA instruction. Thus, the hardware instruction translator is said to "translate" the ISA instruction into the one or more implementing microinstructions. The present disclosure describes embodiments of a microprocessor that includes a hardware instruction translator that translates x86 ISA instructions and ARM ISA instructions into microinstructions. It should be understood that the hardware instruction translator is not necessarily capable of translating the entire set of instructions defined by the x86 programmer's manual nor the ARM programmer's manual but rather is capable of translating a subset of those instructions, just as the vast majority of x86 ISA and ARM ISA processors support only a subset of the instructions defined by their respective programmer's manuals. More specifically, the subset of instructions defined by the x86 programmer's manual that the hardware instruction translator translates does not necessarily correspond to any existing x86 ISA processor, and the subset of instructions defined by the ARM programmer's manual that the hardware instruction translator translates does not necessarily correspond to any existing ARM ISA processor.

An execution pipeline is a sequence of stages in which each stage includes hardware logic and a hardware register for holding the output of the hardware logic for provision to the next stage in the sequence based on a clock signal of the microprocessor. The execution pipeline may include multiple such sequences of stages, i.e., multiple pipelines. The execution pipeline receives as input microinstructions and responsively performs the operations specified by the microinstructions to output results. The hardware logic of the various pipelines performs the operations specified by the microinstructions that may include, but are not limited to, arithmetic, logical, memory load/store, compare, test, and branch resolution, and performs the operations on data in formats that may include, but are not limited to, integer, floating point, character, BCD, and packed. The execution pipeline executes the microinstructions that implement an ISA instruction (e.g., x86 and ARM) to generate the result defined by the ISA instruction. The execution pipeline is distinct from the hardware instruction translator; more specifically, the hardware instruction translator generates the implementing microinstructions and the execution pipeline executes them; furthermore, the execution pipeline does not generate the implementing microinstructions.

An instruction cache is a random access memory device within a microprocessor into which the microprocessor places instructions of an ISA machine language program (such as x86 ISA and ARM ISA machine language instructions) that were recently fetched from system memory and performed by the microprocessor in the course of running the ISA machine language program. More specifically, the ISA defines an instruction address register that holds the memory address of the next ISA instruction to be performed (defined by the x86 ISA as an instruction pointer (IP) and by the ARM ISA as a program counter (PC), for example), and the microprocessor updates the instruction address register contents as it runs the machine language program to control the flow of the program. The ISA instructions are cached for the purpose of subsequently fetching, based on the instruction address register contents, the ISA instructions more quickly from the instruction cache rather than from system memory the next time the flow of the machine language program is such that the register holds the memory address of an ISA instruction present in the instruction cache. In particular, an instruction cache is accessed based on the memory address held in the instruction address register (e.g., IP or PC), rather than exclusively based on a memory address specified by a load or store instruction. Thus, a dedicated data cache that holds ISA instructions as data—such as may be present in the hardware portion of a system that employs a software translator—that is accessed exclusively based on a load/store address but not by an instruction address register value is not an instruction cache. Furthermore, a unified cache that caches both instructions and data, i.e., that is accessed based on an instruction address register value and on a load/store address, but not exclusively based on a load/store address, is intended to be included in the definition of an instruction cache for purposes of the present disclosure. In this context, a load instruction is an instruction that reads data from memory into the microprocessor, and a store instruction is an instruction that writes data to memory from the microprocessor.

A microinstruction set is the set of instructions (microinstructions) the execution pipeline of the microprocessor can execute.

Description of the Embodiments

The present disclosure describes embodiments of a microprocessor that is capable of running both x86 ISA and ARM ISA machine language programs by hardware translating their respective x86 ISA and ARM ISA instructions into microinstructions that are directly executed by an execution pipeline of the microprocessor. The microinstructions are defined by a microinstruction set of the microarchitecture of the microprocessor distinct from both the x86 ISA and the ARM ISA. As the microprocessor embodiments described herein run x86 and ARM machine language programs, a hardware instruction translator of the microprocessor translates the x86 and ARM instructions into the microinstructions and provides them to the execution pipeline of the microprocessor that executes the microinstructions that implement the x86 and ARM instructions. Advantageously, the microprocessor potentially runs the x86 and ARM machine language programs faster than a system that employs a software translator since the implementing microinstructions are directly provided by the hardware instruction translator to the execution pipeline for execution, unlike a software translator-based system that stores the host instructions to memory before they can be executed by the execution pipeline.

Referring now to FIG. 1, a block diagram illustrating a microprocessor 100 that can run x86 ISA and ARM ISA machine language programs according to the present invention is shown. The microprocessor 100 includes an instruction cache 102; a hardware instruction translator 104 that receives x86 ISA instructions and ARM ISA instructions 124 from the instruction cache 102 and translates them into microinstructions 126; an execution pipeline 112 that receives the implementing microinstructions 126 from the hardware instruction translator 104 executes them to generate microinstruction results 128 that are forwarded back as operands to the execution pipeline 112; a register file 106 and a memory subsystem 108 that each provide operands to the execution pipeline 112 and receive the microinstruction results 128 therefrom; an instruction fetch unit and branch predictor 114 that provides a fetch address 134 to the instruction cache 102; an ARM ISA-defined program counter (PC) register 116 and an x86 ISA-defined instruction pointer (IP) register 118 that are updated by the microinstruction results 128 and whose contents are provided to the instruction fetch unit and branch predictor 114; and configuration registers 122 that provide an instruction mode indicator 132 and an environment mode indicator 136 to the hardware instruction translator 104 and the instruction fetch unit and branch predictor 114 and that are updated by the microinstruction results 128.

As the microprocessor 100 performs x86 ISA and ARM ISA machine language instructions, it fetches the instructions from system memory (not shown) into the microprocessor 100 according to the flow of the program. The microprocessor 100 caches the most recently fetched x86 ISA and ARM ISA machine language instructions in the instruction cache 102. The instruction fetch unit 114 generates a fetch address 134 from which to fetch a block of x86 ISA or ARM ISA instruction bytes from system memory. The instruction cache 102 provides to the hardware instruction translator 104 the block of x86 ISA or ARM ISA instruction bytes 124 at the fetch address 134 if it hits in the instruction cache 102; otherwise, the ISA instructions 124 are fetched from system memory. The instruction fetch unit 114 generates the fetch address 134 based on the values in the ARM PC 116 and x86 IP 118. More specifically, the instruction fetch unit 114 maintains a fetch address in a fetch address register. Each time the instruction fetch unit 114 fetches a new block of ISA instruction bytes, it updates the fetch address by the size of the block and continues sequentially in this fashion until a control flow event occurs. The control flow events include the generation of an exception, the prediction by the branch predictor 114 that a taken branch was present in the fetched block, and an update by the execution pipeline 112 to the ARM PC 116 and x86 IP 118 in response to a taken executed branch instruction that was not predicted taken by the branch predictor 114. In response to a control flow event, the instruction fetch unit 114 updates the fetch address to the exception handler address, predicted target address, or executed target address, respectively. An embodiment is contemplated in which the instruction cache 102 is a unified cache in that it caches both ISA instructions 124 and data. It is noted that in the unified cache embodiments, although the unified cache may be accessed based on a load/store address to read/write data, when the microprocessor 100 fetches ISA instructions 124 from the unified cache, the unified cache is accessed based on the ARM PC 116 and x86 IP 118 values rather than a load/store address. The instruction cache 102 is a random access memory (RAM) device.

The instruction mode indicator 132 is state that indicates whether the microprocessor 100 is currently fetching, formatting/decoding, and translating x86 ISA or ARM ISA instructions 124 into microinstructions 126. Additionally, the execution pipeline 112 and memory subsystem 108 receive the instruction mode indicator 132 which affects the manner of executing the implementing microinstructions 126, albeit for a relatively small subset of the microinstruction set. The x86 IP register 118 holds the memory address of the next x86 ISA instruction 124 to be performed, and the ARM PC register 116 holds the memory address of the next ARM ISA instruction 124 to be performed. To control the flow of the program, the microprocessor 100 updates the x86 IP register 118 and ARM PC register 116 as the microprocessor 100 performs the x86 and ARM machine language programs, respectively, either to the next sequential instruction or to the target address of a branch instruction or to an exception handler address. As the microprocessor 100 performs instructions of x86 ISA and ARM ISA machine language programs, it fetches the ISA instructions of the machine language programs from system memory and places them into the instruction cache 102 replacing less recently fetched and performed instructions. The fetch unit 114 generates the fetch address 134 based on the x86 IP register 118 or ARM PC register 116 value, depending upon whether the instruction mode indicator 132 indicates the microprocessor 100 is currently fetching ISA instructions 124 in x86 or ARM mode. In one embodiment, the x86 IP register 118 and the ARM PC register 116 are implemented as a shared hardware instruction address register that provides its contents to the instruction fetch unit and branch predictor 114 and that is updated by the execution pipeline 112 according to x86 or ARM semantics based on whether the instruction mode indicator 132 indicates x86 or ARM, respectively.

The environment mode indicator 136 is state that indicates whether the microprocessor 100 is to apply x86 ISA or ARM ISA semantics to various execution environment aspects of the microprocessor 100 operation, such as virtual memory, exceptions, cache control, and global execution-time protection. Thus, the instruction mode indicator 132 and environment mode indicator 136 together create multiple modes of execution. In a first mode in which the instruction mode indicator 132 and environment mode indicator 136 both indicate x86 ISA, the microprocessor 100 operates as a normal x86 ISA processor. In a second mode in which the instruction mode indicator 132 and environment mode indicator 136 both indicate ARM ISA, the microprocessor 100 operates as a normal ARM ISA processor. A third mode, in which the instruction mode indicator 132 indicates x86 ISA but the environment mode indicator 136 indicates ARM ISA, may advantageously be used to perform user mode x86 machine language programs under the control of an ARM operating system or hypervisor, for example; conversely, a fourth mode, in which the instruction mode indicator 132 indicates ARM ISA but the environment mode indicator 136 indicates x86 ISA, may advantageously be used to perform user mode ARM machine language programs under the control of an x86 operating system or hypervisor, for example. The instruction mode indicator 132 and environment mode indicator 136 values are initially determined at reset. In one embodiment, the initial values are encoded as microcode constants but may be modified by a blown configuration fuse and/or microcode patch.

In another embodiment, the initial values are provided by an external input to the microprocessor 100. In one embodiment, the environment mode indicator 136 may only be changed after reset by a reset-to-ARM 124 or reset-to-x86 instruction 124 (described below with respect to FIG. 6); that is, the environment mode indicator 136 may not be changed during normal operation of the microprocessor 100 without resetting the microprocessor 100, either by a normal reset or by a reset-to-x86 or reset-to-ARM instruction 124.

The hardware instruction translator 104 receives as input the x86 ISA and ARM ISA machine language instructions 124 and in response to each provides as output one or more microinstructions 126 that implement the x86 or ARM ISA instruction 124. The collective execution of the one or more implementing microinstructions 126 by the execution pipeline 112 implements the x86 or ARM ISA instruction 124. That is, the collective execution performs the operation specified by the x86 or ARM ISA instruction 124 on inputs specified by the x86 or ARM ISA instruction 124 to produce a result defined by the x86 or ARM ISA instruction 124. Thus, the hardware instruction translator 104 translates the x86 or ARM ISA instruction 124 into the one or more implementing microinstructions 126. The hardware instruction translator 104 comprises a collection of transistors arranged in a predetermined manner to translate the x86 ISA and ARM ISA machine language instructions 124 into the implementing microinstructions 126. The hardware instruction translator 104 comprises Boolean logic gates (e.g., of simple instruction translator 204 of FIG. 2) that generate the implementing microinstructions 126. In one embodiment, the hardware instruction translator 104 also comprises a microcode ROM (e.g., element 234 of the complex instruction translator 206 of FIG. 2) that the hardware instruction translator 104 employs to generate implementing microinstructions 126 for complex ISA instructions 124, as described in more detail with respect to FIG. 2. Preferably, the hardware instruction translator 104 is not necessarily capable of translating the entire set of ISA instructions 124 defined by the x86 programmer's manual nor the ARM programmer's manual but rather is capable of translating a subset of those instructions. More specifically, the subset of ISA instructions 124 defined by the x86 programmer's manual that the hardware instruction translator 104 translates does not necessarily correspond to any existing x86 ISA processor developed by Intel, and the subset of ISA instructions 124 defined by the ARM programmer's manual that the hardware instruction translator 104 translates does not necessarily correspond to any existing ISA processor developed by ARM Ltd. The one or more implementing microinstructions 126 that implement an x86 or ARM ISA instruction 124 may be provided to the execution pipeline 112 by the hardware instruction translator 104 all at once or as a sequence. Advantageously, the hardware instruction translator 104 provides the implementing microinstructions 126 directly to the execution pipeline 112 for execution without requiring them to be stored to memory in between. In the embodiment of the microprocessor 100 of FIG. 1, as the microprocessor 100 runs an x86 or ARM machine language program, each time the microprocessor 100 performs an x86 or ARM instruction 124, the hardware instruction translator 104 translates the x86 or ARM machine language instruction 124 into the implementing one or more microinstructions 126. However, the embodiment of FIG. 8 employs a microinstruction cache to potentially avoid re-translation each time the microprocessor 100 performs an x86 or ARM ISA instruction 124. Embodiments of the hardware instruction translator 104 are described in more detail with respect to FIG. 2.

The execution pipeline 112 executes the implementing microinstructions 126 provided by the hardware instruction translator 104. Broadly speaking, the execution pipeline 112 is a general purpose high-speed microinstruction processor, and other portions of the microprocessor 100, such as the hardware instruction translator 104, perform the bulk of the x86/ARM-specific functions, although functions performed by the execution pipeline 112 with x86/ARM-specific knowledge are discussed herein. In one embodiment, the execution pipeline 112 performs register renaming, superscalar issue, and out-of-order execution of the implementing microinstructions 126 received from the hardware instruction translator 104. The execution pipeline 112 is described in more detail with respect to FIG. 4.

The microarchitecture of the microprocessor 100 includes: (1) the microinstruction set; (2) a set of resources accessible by the microinstructions 126 of the microinstruction set, which is a superset of the x86 ISA and ARM ISA resources; and (3) a set of micro-exceptions the microprocessor 100 is defined to generate in response to executing the microinstructions 126, which is a superset of the x86 ISA and ARM ISA exceptions. The microarchitecture is distinct from the x86 ISA and the ARM ISA. More specifically, the microinstruction set is distinct from the x86 ISA and ARM ISA instruction sets in several aspects. First, there is not a one-to-one correspondence between the set of operations that the microinstructions of the microinstruction set may instruct the execution pipeline 112 to perform and the set of operations that the instructions of the x86 ISA and ARM ISA instruction sets may instruct the microprocessor to perform. Although many of the operations may be the same, there may be some operations specifiable by the microinstruction set that are not specifiable by the x86 ISA and/or the ARM ISA instruction sets; conversely, there may be some operations specifiable by the x86 ISA and/or the ARM ISA instruction sets that are not specifiable by the microinstruction set. Second, the microinstructions of the microinstruction set are encoded in a distinct manner from the manner in which the instructions of the x86 ISA and ARM ISA instruction sets are encoded. That is, although many of the same operations (e.g., add, shift, load, return) are specifiable by both the microinstruction set and the x86 ISA and ARM ISA instruction sets, there is not a one-to-one correspondence between the binary opcode value-to-operation mappings of the microinstruction set and the x86 or ARM ISA instruction sets. If there are binary opcode value-to-operation mappings that are the same in the microinstruction set and the x86 or ARM ISA instruction set, they are, generally speaking, by coincidence, and there is nevertheless not a one-to-one correspondence between them. Third, the fields of the microinstructions of the microinstruction set do not have a one-to-one correspondence with the fields of the instructions of the x86 or ARM ISA instruction set.

The microprocessor 100, taken as a whole, can perform x86 ISA and ARM ISA machine language program instructions. However, the execution pipeline 112 cannot execute x86 or ARM ISA machine language instructions themselves; rather, the execution pipeline 112 executes the implementing microinstructions 126 of the microinstruction set of the microarchitecture of the microprocessor 100 into which the x86 ISA and ARM ISA instructions are translated. However, although the microarchitecture is distinct from the x86 ISA and the ARM ISA, alternate embodiments are contemplated in which the microinstruction set and other microarchitecture-specific resources are exposed to the user; that is, in the alternate embodiments the microarchitecture may effectively be a third ISA, in addition to the x86 ISA and ARM ISA, whose machine language programs the microprocessor 100 can perform.

Table 1 below describes some of the fields of a microinstruction 126 of the microinstruction set according to one embodiment of the microprocessor 100.

TABLE 1

| Field | Description |
|---|---|
| opcode | operation to be performed (see instruction list below) |
| destination | specifies destination register of microinstruction result |
| source 1 | specifies source of first input operand (e.g., general purpose register, floating point register, microarchitecture-specific |

TABLE 1-continued

| Field | Description |
|---|---|
| | register, condition flags register, immediate, displacement, useful constants, the next sequential instruction pointer value) |
| source 2 | specifies source of second input operand |
| source 3 | specifies source of third input operand (cannot be GPR or FPR) |
| condition code | condition upon which the operation will be performed if satisfied and not performed if not satisfied |
| operand size | encoded number of bytes of operands used by this microinstruction |
| address size | encoded number of bytes of address generated by this microinstruction |
| top of x87 FP register stack | needed for x87-style floating point instructions |

Table 2 below describes some of the microinstructions in the microinstruction set according to one embodiment of the microprocessor 100.

TABLE 2

| Instruction | Description |
|---|---|
| ALU-type | e.g., add, subtract, rotate, shift, Boolean, multiply, divide, floating-point ALU, media-type ALU (e.g., packed operations) |
| load/store | load from memory into register/store to memory from register |
| conditional jump | jump to target address if condition is satisfied, e.g., zero, greater than, not equal; may specify either ISA flags or microarchitecture-specific (i.e., non-ISA visible) condition flags |
| move | move value from source register to destination register |
| conditional move | move value from source register to destination register if condition is satisfied |
| move to control register | move value from general purpose register to control register |
| move from control register | move value to general purpose register from control register |
| gprefetch | guaranteed cache line prefetch instruction (i.e., not a hint, always prefetches, unless certain exception conditions) |
| grabline | performs zero beat read-invalidate cycle on processor bus to obtain exclusive ownership of cache line without reading data from system memory (since it is known the entire cache line will be written) |
| load pram | load from PRAM (private microarchitecture-specific RAM, i.e., not visible to ISA, described more below) into register |
| store pram | store to PRAM |
| jump condition on/off | jump to target address if "static" condition is satisfied (within relevant timeframe, programmer guarantees there are no older, unretired microinstructions that may change the "static" condition); faster because resolved by complex instruction translator rather than execution pipeline |
| call | call subroutine |
| return | return from subroutine |
| set bit on/off | set/clear bit in register |
| copy bit | copy bit value from source register to destination register |
| branch to next sequential instruction pointer | branch to next sequential x86 or ARM ISA instruction after the x86 or ARM ISA instruction from which this microinstruction was translated |
| fence | wait until all microinstructions have drained from the execution pipeline to execute the microinstruction that comes after this microinstruction |
| indirect jump | unconditional jump through a register value |

The microprocessor 100 also includes some microarchitecture-specific resources, such as microarchitecture-specific general purpose registers, media registers, and segment registers (e.g., used for register renaming or by microcode) and control registers that are not visible by the x86 or ARM ISA, and a private RAM (PRAM) described more below. Additionally, the microarchitecture can generate exceptions, referred to as micro-exceptions, that are not specified by and are not seen by the x86 or ARM ISA, typically to perform a replay of a microinstruction 126 and dependent microinstructions 126, such as in the case of: a load miss in which the execution pipeline 112 assumes a load hit and replays the load microinstruction 126 if it misses; a TLB miss, to replay the microinstruction 126 after the page table walk and TLB fill; a floating point microinstruction 126 that received a denormal operand that was speculated to be normal that needs to be replayed after the execution pipeline 112 normalizes the operand; a load microinstruction 126 that was executed, but after which an older address-colliding store microinstruction 126 was detected, requiring the load microinstruction 126 to be replayed. It should be understood that the fields listed in Table 1, the microinstructions listed in Table 2, and the microarchitecture-specific resources and microarchitecture-specific exceptions just listed are merely given as examples to illustrate the microarchitecture and are by no means exhaustive.

The register file 106 includes hardware registers used by the microinstructions 126 to hold source and/or destination operands. The execution pipeline 112 writes its results 128 to the register file 106 and receives operands for the microinstructions 126 from the register file 106. The hardware registers instantiate the x86 ISA-defined and ARM ISA-defined registers. In one embodiment, many of the general purpose registers defined by the x86 ISA and the ARM ISA share some instances of registers of the register file 106. For example, in one embodiment, the register file 106 instantiates fifteen 32-bit registers that are shared by the ARM ISA registers R0 through R14 and the x86 ISA EAX through R14D registers. Thus, for example, if a first microinstruction 126 writes a value to the ARM R2 register, then a subsequent second microinstruction 126 that reads the x86 ECX register will receive the same value written by the first microinstruction 126, and vice versa. This advantageously enables x86 ISA and ARM ISA machine language programs to communicate quickly through registers. For example, assume an ARM machine language program running under an ARM machine language operating system effects a change in the instruction mode 132 to x86 ISA and control transfer to an x86 machine language routine to perform a function, which may be advantageous because the x86 ISA may support certain instructions that can perform a particular operation faster than in the ARM ISA. The ARM program can provide needed data to the x86 routine in shared registers of the register file 106. Conversely, the x86 routine can provide the results in shared registers of the register file 106 that will be visible to the ARM program upon return to it by the x86 routine. Similarly, an x86 machine language program running under an x86 machine language operating system may effect a change in the instruction mode 132 to ARM ISA and control transfer to an ARM machine language routine; the x86 program can provide needed data to the ARM routine in shared registers of the register file 106, and the ARM routine can provide the results in shared registers of the register file 106 that will be visible to the x86 program upon return to it by the ARM routine. A sixteenth 32-bit register that instantiates the x86 R15D register is not shared by the ARM R15 register since ARM R15 is the ARM PC register 116, which is separately instantiated. Additionally, in one embodiment, the thirty-two 32-bit ARM VFPv3 floating-point registers share 32-bit portions of the x86 sixteen 128-bit XMM0 through XMM15 registers and the sixteen 128-bit Advanced SIMD ("Neon") registers. The register file 106 also instantiates flag registers (namely the x86 EFLAGS register and ARM condition flags register), and the various control and status registers defined by the x86 ISA and ARM ISA. The architectural control and status registers include x86 architectural model specific registers (MSRs) and ARM-reserved coprocessor (8-15) registers. The register file 106 also instantiates non-architectural registers, such as non-architectural general purpose registers used in register renaming and used by microcode 234, as well as non-architectural x86 MSRs and implementation-defined, or vendor-specific, ARM coprocessor registers. The register file 106 is described further with respect to FIG. 5.

The memory subsystem 108 includes a cache memory hierarchy of cache memories (in one embodiment, a level-1 instruction cache 102, level-1 data cache, and unified level-2 cache). The memory subsystem 108 also includes various memory request queues, e.g., load, store, fill, snoop, write-combine buffer. The memory subsystem 108 also includes a memory management unit (MMU) that includes translation lookaside buffers (TLBs), preferably separate instruction and data TLBs. The memory subsystem 108 also includes a table walk engine for obtaining virtual to physical address translations in response to a TLB miss. Although shown separately in FIG. 1, the instruction cache 102 is logically part of the memory subsystem 108. The memory subsystem 108 is configured such that the x86 and ARM machine language programs share a common memory space, which advantageously enables x86 and ARM machine language programs to communicate easily through memory.

The memory subsystem 108 is aware of the instruction mode 132 and environment mode 136 which enables it to perform various operations in the appropriate ISA context. For example, the memory subsystem 108 performs certain memory access violation checks (e.g., limit violation checks) based on whether the instruction mode indicator 132 indicates x86 or ARM ISA. For another example, in response to a change of the environment mode indicator 136, the memory subsystem 108 flushes the TLBs; however, the memory subsystem 108 does not flush the TLBs in response to a change of the instruction mode indicator 132, thereby enabling better performance in the third and fourth modes described above in which one of the instruction mode indicator 132 and environment mode indicator 136 indicates x86 and the other indicates ARM. For another example, in response to a TLB miss, the table walk engine performs a page table walk to populate the TLB using either x86 page tables or ARM page tables depending upon whether the environment mode indicator 136 indicates x86 ISA or ARM ISA. For another example, the memory subsystem 108 examines the architectural state of the appropriate x86 ISA control registers that affect the cache policies (e.g., CR0 CD and NW bits) if the state indicator 136 indicates x86 ISA and examines the architectural state of the appropriate ARM ISA control registers (e.g., SCTLR I and C bits) if the environment mode indicator 136 indicates ARM ISA. For another example, the memory subsystem 108 examines the architectural state of the appropriate x86 ISA control registers that affect the memory management (e.g., CR0 PG bit) if the state indicator 136 indicates x86 ISA and examines the architectural state of the appropriate ARM ISA control registers (e.g., SCTLR M bit) if the environment mode indicator 136 indicates ARM ISA. For another example, the memory subsystem 108 examines the architectural state of the appropriate x86 ISA control registers that affect the alignment checking (e.g., CR0 AM bit) if the state indicator 136 indicates x86 ISA and examines the architectural state of the appropriate ARM ISA control registers (e.g., SCTLR A bit) if the environment mode indicator 136 indicates ARM ISA. For another example, the memory subsystem 108 (as well as the hardware instruction translator 104 for privileged instructions) examines the architectural state of the appropriate x86 ISA control registers that specify the current privilege level (CPL) if the state indicator 136 indicates x86 ISA and examines the architectural state of the appropriate ARM ISA control registers that indicate user or privileged mode if the environment mode indicator 136 indicates ARM ISA. However, in one embodiment, the x86 ISA and ARM ISA share control bits/registers of the microprocessor 100 that have analogous function, rather than the microprocessor 100 instantiating separate control bits/registers for each ISA.

Although shown separately, the configuration registers 122 may be considered part of the register file 106. The configuration registers 122 include a global configuration register that controls operation of the microprocessor 100 in various aspects regarding the x86 ISA and ARM ISA, such as the ability to enable or disable various features. The global configuration register may be used to disable the ability of the microprocessor 100 to perform ARM ISA machine language programs, i.e., to make the microprocessor 100 an x86-only microprocessor 100, including disabling other relevant ARM-specific capabilities such as the launch-x86 and reset-to-x86 instructions 124 and implementation-defined coprocessor registers described herein. The global configuration register may also be used to disable the ability of the microprocessor 100 to perform x86 ISA machine language programs, i.e., to make the microprocessor 100 an ARM-only microprocessor 100, and to disable other relevant capabilities such as the launch-ARM and reset-to-ARM instructions 124 and new non-architectural MSRs described herein. In one embodiment, the microprocessor 100 is manufactured initially with default configuration settings, such as hardcoded values in the microcode 234, which the microcode 234 uses at initialization time to configure the microprocessor 100, namely to write the configuration registers 122. However, some configuration registers 122 are set by hardware rather than by microcode 234. Furthermore, the microprocessor 100 includes fuses, readable by the microcode 234, which may be blown to modify the default configuration values. In one embodiment, microcode 234 reads the fuses and performs an exclusive-OR operation with the default value and the fuse value and uses the result to write to the configuration registers 122. Still further, the modifying effect of the fuses may be reversed by a microcode 234 patch. The global configuration register may also be used, assuming the microprocessor 100 is configured to perform both x86 and ARM programs, to determine whether the microprocessor 100 (or a particular core 100 in a multi-core part, as described with respect to FIG. 7) will boot as an x86 or ARM microprocessor when reset, or in response to an x86-style INIT, as described in more detail below with respect to FIG. 6. The global configuration register also includes bits that provide initial default values for certain architectural control registers, for example, the ARM ISA SCTLT and CPACR registers. In a multi-core embodiment, such as described with respect to FIG. 7, there exists a single global configuration register, although each core is individually configurable, for example, to boot as either an x86 or ARM core, i.e., with the instruction mode indicator 132 and environment mode indicator 136 both set to x86 or ARM, respectively; furthermore, the launch-ARM instruction 126 and launch-x86 instruction 126 may be used to dynamically switch between the x86 and ARM instruction modes 132. In one embodiment, the global configuration register is readable via an x86 RDMSR instruction to a new non-architectural MSR and a portion of the control bits therein are writeable via an x86 WRMSR instruction to the new non-architectural MSR, and the global configuration register is readable via an ARM MRC/MRRC instruction to an ARM coprocessor register mapped to the new non-architectural MSR and the portion of the control bits therein are writeable via an ARM MCR/MCRR instruction to the ARM coprocessor register mapped to the new non-architectural MSR.

The configuration registers 122 also include various control registers that control operation of the microprocessor 100 in various aspects that are non-x86/ARM-specific, also referred to herein as global control registers, non-ISA control registers, non-x86/ARM control registers, generic control registers, and similar terms. In one embodiment, these control registers are accessible via both x86 RDMSR/WRMSR instructions to non-architectural MSRs and ARM MCR/MRC (or MCRR/MRRC) instructions to new implementation-defined coprocessor registers. For example, the microprocessor 100 includes non-x86/ARM-specific control registers that determine fine-grained cache control, i.e., finer-grained than provided by the x86 ISA and ARM ISA control registers.

In one embodiment, the microprocessor 100 provides ARM ISA machine language programs access to the x86 ISA MSRs via implementation-defined ARM ISA coprocessor registers that are mapped directly to the corresponding x86 MSRs. The MSR address is specified in the ARM ISA R1 register. The data is read from or written to the ARM ISA register specified by the MRC/MRRC/MCR/MCRR instruction. In one embodiment, a subset of the MSRs are password protected, i.e., the instruction attempting to access the MSR must provide a password; in this embodiment, the password is specified in the ARM R7:R6 registers. If the access would cause an x86 general protection fault, the microprocessor 100 causes an ARM ISA UND exception. In one embodiment, ARM coprocessor 4 (address: 0, 7, 15, 0) is used to access the corresponding x86 MSRs.

The microprocessor 100 also includes an interrupt controller (not shown) coupled to the execution pipeline 112. In one embodiment, the interrupt controller is an x86-style advanced programmable interrupt controller (APIC) that maps x86 ISA interrupts into ARM ISA interrupts. In one embodiment, the x86 INTR maps to an ARM IRQ Interrupt; the x86 NMI maps to an ARM IRQ Interrupt; the x86 INIT causes an INIT-reset sequence from which the microprocessor 100 started in whichever ISA (x86 or ARM) it originally started out of a hardware reset; the x86 SMI maps to an ARM FIQ Interrupt; and the x86 STPCLK, A20, Thermal, PREQ, and Rebranch are not mapped to ARM interrupts. ARM machine language programs are enabled to access the APIC functions via new implementation-defined ARM coprocessor registers. In one embodiment, the APIC register address is specified in the ARM R0 register, and the APIC register addresses are the same as the x86 addresses. In one embodiment, ARM coprocessor 6 (address: 0, 7, nn, 0, where nn is 15 for accessing the APIC, and 12-14 for accessing the bus interface unit to perform 8-bit, 16-bit, and 32-bit IN/OUT cycles on the processor bus) is used for privileged mode functions typically employed by operating systems. The microprocessor 100 also includes a bus interface unit (not shown), coupled to the memory subsystem 108 and execution pipeline 112, for interfacing the microprocessor 100 to a processor bus. In one embodiment, the processor bus is conformant with one of the various Intel Pentium family microprocessor buses. ARM machine language programs are enabled to access the bus interface unit functions via new implementation-defined ARM coprocessor registers in order to generate I/O cycles on the processor bus, i.e., IN and OUT bus transfers to a specified address in I/O space, which are needed to communicate with a chipset of a system, e.g., to generate an SMI acknowledgement special cycle, or I/O cycles associated with C-state transitions. In one embodiment, the I/O address is specified in the ARM R0 register. In one embodiment, the microprocessor 100 also includes power management capabilities, such as the well-known P-state and C-state management. ARM machine language programs are enabled to perform power management via new implementation-defined ARM coprocessor registers. In one embodiment, the microprocessor 100 also includes an encryption unit (not shown) in the execution pipeline 112. In one embodiment, the encryption unit is substantially similar to the encryption unit of VIA microprocessors that include the Padlock capability. ARM machine language programs are enabled to access the encryption unit functions, such as encryption instructions, via new implementation-defined ARM coprocessor registers. In one embodiment ARM coprocessor 5 is used for user mode functions typically employed by user mode application programs, such as those that may use the encryption unit feature.

As the microprocessor 100 runs x86 ISA and ARM ISA machine language programs, the hardware instruction translator 104 performs the hardware translation each time the microprocessor 100 performs an x86 or ARM ISA instruction 124. It is noted that, in contrast, a software translator-based system may be able to improve its performance by re-using a translation in many cases rather than re-translating a previously translated machine language instruction. Furthermore, the embodiment of FIG. 8 employs a microinstruction cache to potentially avoid re-translation each time the microprocessor 100 performs an x86 or ARM ISA instruction 124. Each approach may have performance advantages depending upon the program characteristics and the particular circumstances in which the program is run.

The branch predictor 114 caches history information about previously performed both x86 and ARM branch instructions. The branch predictor 114 predicts the presence and target address of both x86 and ARM branch instructions 124 within a cache line as it is fetched from the instruction cache 102 based on the cached history. In one embodiment, the cached history includes the memory address of the branch instruction 124, the branch target address, a direction (taken/not taken) indicator, type of branch instruction, start byte within the cache line of the branch instruction, and an indicator of whether the instruction wraps across multiple cache lines. In one embodiment, the branch predictor 114 is enhanced to predict the direction of ARM ISA conditional non-branch instructions, as described in U.S. Provisional Application No. 61/473,067, filed Apr. 7, 2011, entitled APPARATUS AND METHOD FOR USING BRANCH PREDICTION TO EFFICIENTLY EXECUTE CONDITIONAL NON-BRANCH INSTRUCTIONS. In one embodiment, the hardware instruction translator 104 also includes a static branch predictor that predicts a direction and branch target address for both x86 and ARM branch instructions based on the opcode, condition code type, backward/forward, and so forth.

Various embodiments are contemplated that implement different combinations of features defined by the x86 ISA and ARM ISA. For example, in one embodiment, the microprocessor 100 implements the ARM, Thumb, ThumbEE, and Jazelle instruction set states, but provides a trivial implementation of the Jazelle extension; and implements the following instruction set extensions: Thumb-2, VFPv3-D32, Advanced SIMD ("Neon"), multiprocessing, and VMSA; and does not implement the following extensions: security extensions, fast context switch extension, ARM debug features (however, x86 debug functions are accessible by ARM programs via ARM MCR/MRC instructions to new implementation-defined coprocessor registers), performance monitoring counters (however, x86 performance counters are accessible by ARM programs via the new implementation-defined coprocessor registers). For another example, in one embodiment, the microprocessor 100 treats the ARM SETEND instruction as a NOP and only supports the Little-endian data format. For another example, in one embodiment, the microprocessor 100 does not implement the x86 SSE 4.2 capabilities.

Embodiments are contemplated in which the microprocessor 100 is an enhancement of a commercially available microprocessor, namely a VIA Nano™ Processor manufactured by VIA Technologies, Inc., of Taipei, Taiwan, which is capable of running x86 ISA machine language programs but not ARM ISA machine language programs. The Nano microprocessor includes a high performance register-renaming, superscalar instruction issue, out-of-order execution pipeline and a hardware translator that translates x86 ISA instructions into microinstructions for execution by the execution pipeline. The Nano hardware instruction translator may be substantially enhanced as described herein to translate ARM ISA machine language instructions, in addition to x86 machine language instructions, into the microinstructions executable by the execution pipeline. The enhancements to the hardware instruction translator may include enhancements to both the simple instruction translator and to the complex instruction translator, including the microcode. Additionally, new microinstructions may be added to the microinstruction set to support the translation of ARM ISA machine language instructions into the microinstructions, and the execution pipeline may be enhanced to execute the new microinstructions. Furthermore, the Nano register file and memory subsystem may be substantially enhanced as described herein to support the ARM ISA, including sharing of certain registers. The branch prediction units may also be enhanced as described herein to accommodate ARM branch instruction prediction in addition to x86 branches. Advantageously, a relatively modest amount of modification is required to the execution pipeline of the Nano microprocessor to accommodate the ARM ISA instructions since it is already largely ISA-agnostic. Enhancements to the execution pipeline may include the manner in which condition code flags are generated and used, the semantics used to update and report the instruction pointer register, the access privilege protection method, and various memory management-related functions, such as access violation checks, paging and TLB use, and cache policies, which are listed only as illustrative examples, and some of which are described more below. Finally, as mentioned above, various features defined in the x86 ISA and ARM ISA may not be supported in the Nano-enhancement embodiments, such as x86 SSE 4.2 and ARM security extensions, fast context switch extension, debug, and performance counter features, which are listed only as illustrative examples, and some of which are described more below. The enhancement of the Nano processor to support running ARM ISA machine language programs is an example of an embodiment that makes synergistic use of design, testing, and manufacturing resources to potentially bring to market in a timely fashion a single integrated circuit design that can run both x86 and ARM machine language programs, which represent the vast majority of existing machine language programs. In particular, embodiments of the microprocessor 100 design described herein may be configured as an x86 microprocessor, an ARM microprocessor, or a microprocessor that can concurrently run both x86 ISA and ARM ISA machine language programs. The ability to concurrently run both x86 ISA and ARM ISA machine language programs may be achieved through dynamic switching between the x86 and ARM instruction modes 132 on a single microprocessor 100 (or core 100—see FIG. 7), through configuring one or more cores 100 in a multi-core microprocessor 100 (as described with respect to FIG. 7) as an ARM core and one or more cores as an x86 core, or through a combination of the two, i.e., dynamic switching between the x86 and ARM instruction modes 132 on each of the multiple cores 100. Furthermore, historically, ARM ISA cores have been designed as intellectual property cores to be incorporated into applications by various third-party vendors, such as SOC and/or embedded applications. Therefore, the ARM ISA does not specify a standardized processor bus to interface the ARM core to the rest of the system, such as a chipset or other peripheral devices. Advantageously, the Nano processor already includes a high speed x86-style processor bus interface to memory and peripherals and a memory coherency structure that may be employed synergistically by the microprocessor 100 to support running ARM ISA machine language programs in an x86 PC-style system environment.

Figure 2:
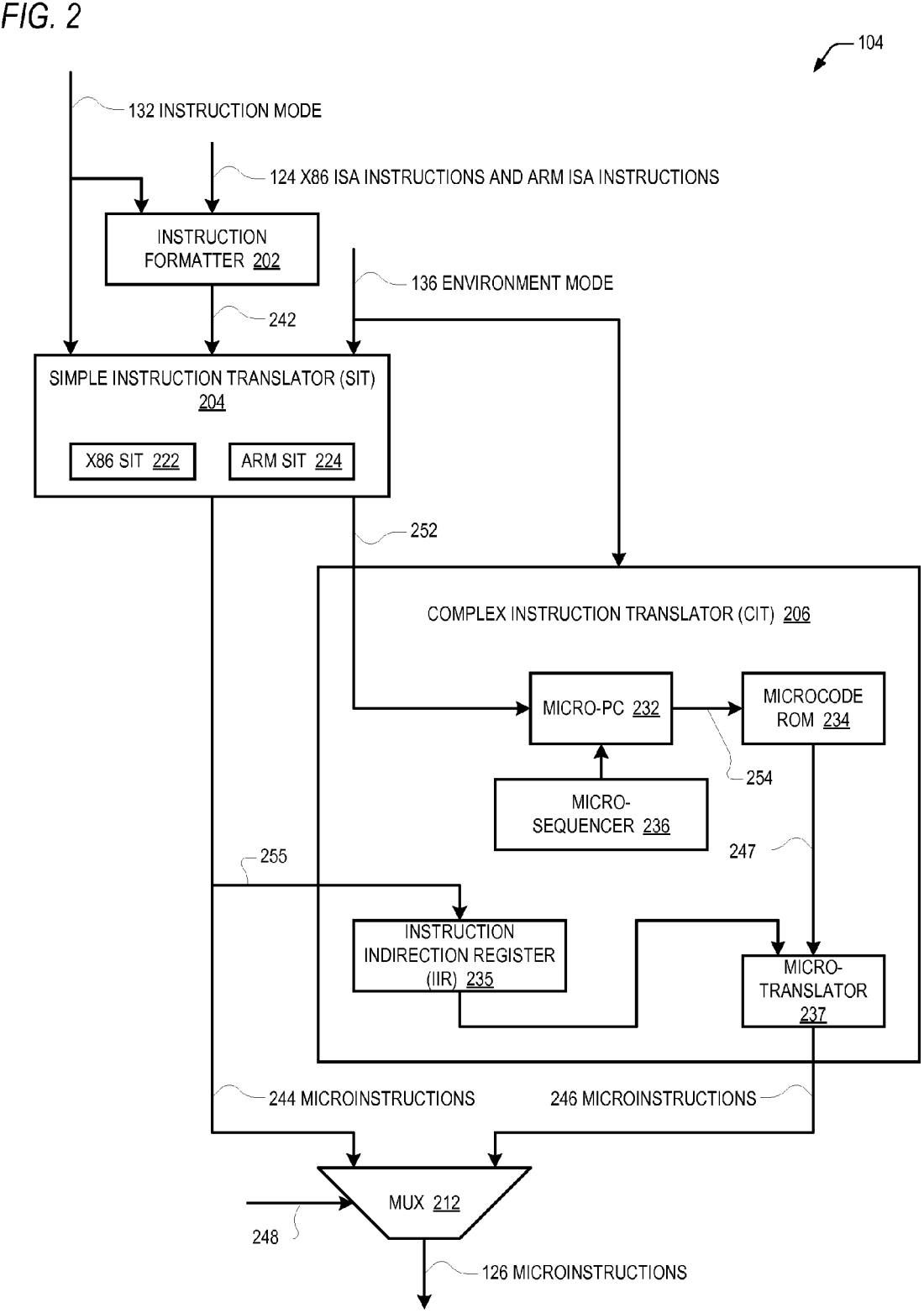
FIG. 2 is a block diagram illustrating in more detail the hardware instruction translator of FIG. 1.

Referring now to FIG. 2, a block diagram illustrating in more detail the hardware instruction translator 104 of FIG. 1 is shown. The hardware instruction translator 104 comprises hardware, more specifically a collection of transistors. The hardware instruction translator 104 includes an instruction formatter 202 that receives the instruction mode indicator 132 and the blocks of x86 ISA and ARM ISA instruction bytes 124 from the instruction cache 102 of FIG. 1 and outputs formatted x86 ISA and ARM ISA instructions 242; a simple instruction translator (SIT) 204 that receives the instruction mode indicator 132 and environment mode indicator 136 and outputs implementing microinstructions 244 and a microcode address 252; a complex instruction translator (CIT) 206 (also referred to as a microcode unit) that receives the microcode address 252 and the environment mode indicator 136 and provides implementing microinstructions 246; and a mux 212 that receives microinstructions 244 from the simple instruction translator 204 on one input and that receives the microinstructions 246 from the complex instruction translator 206 on the other input and that provides the implementing microinstructions 126 to the execution pipeline 112 of FIG. 1. The instruction formatter 202 is described in more detail with respect to FIG. 3. The simple instruction translator 204 includes an x86 SIT 222 and an ARM SIT 224. The complex instruction translator 206 includes a micro-program counter (micro-PC) 232 that receives the microcode address 252, a microcode read only memory (ROM) 234 that receives a ROM address 254 from the micro-PC 232, a microsequencer 236 that updates the micro-PC 232, an instruction indirection register (IIR) 235, and a microtranslator 237 that generates the implementing microinstructions 246 output by the complex instruction translator 206. Both the implementing microinstructions 244 generated by the simple instruction translator 204 and the implementing microinstructions 246 generated by the complex instruction translator 206 are microinstructions 126 of the microinstruction set of the microarchitecture of the microprocessor 100 and which are directly executable by the execution pipeline 112.

The mux 212 is controlled by a select input 248. Normally, the mux 212 selects the microinstructions from the simple instruction translator 204; however, when the simple instruction translator 204 encounters a complex x86 or ARM ISA instruction 242 and transfers control, or traps, to the complex instruction translator 206, the simple instruction translator 204 controls the select input 248 to cause the mux 212 to select microinstructions 246 from the complex instruction translator 206. When the RAT 402 (of FIG. 4) encounters a microinstruction 126 with a special bit set to indicate it is the last microinstruction 126 in the sequence implementing the complex ISA instruction 242, the RAT 402 controls the select input 248 to cause the mux 212 to return to selecting microinstructions 244 from the simple instruction translator 204. Additionally, the reorder buffer 422 controls the select input 248 to cause the mux 212 to select microinstructions 246 from the complex instruction translator 206 when the reorder buffer 422 (see FIG. 4) is ready to retire a microinstruction 126 whose status requires such, for example if the status indicates the microinstruction 126 has caused an exception condition.

The simple instruction translator 204 receives the ISA instructions 242 and decodes them as x86 ISA instructions if the instruction mode indicator 132 indicate x86 and decodes them as ARM ISA instructions if the instruction mode indicator 132 indicates ARM. The simple instruction translator 204 also determines whether the ISA instructions 242 are simple or complex ISA instructions. A simple ISA instruction 242 is one for which the simple instruction translator 204 can emit all the implementing microinstructions 126 that implement the ISA instruction 242; that is, the complex instruction translator 206 does not provide any of the implementing microinstructions 126 for a simple ISA instruction 124. In contrast, a complex ISA instruction 124 requires the complex instruction translator 206 to provide at least some, if not all, of the implementing microinstructions 126. In one embodiment, for a subset of the instructions 124 of the ARM and x86 ISA instruction sets, the simple instruction translator 204 emits a portion of the microinstructions 244 that implement the x86/ARM ISA instruction 126 and then transfers control to the complex instruction translator 206 which subsequently emits the remainder of the microinstructions 246 that implement the x86/ARM ISA instruction 126. The mux 212 is controlled to first provide the implementing microinstructions 244 from the simple instruction translator 204 as microinstructions 126 to the execution pipeline 112 and second to provide the implementing microinstructions 246 from the complex instruction translator 206 as microinstructions 126 to the execution pipeline 112. The simple instruction translator 204 knows the starting microcode ROM 234 address of the various microcode routines employed by the hardware instruction translator 104 to generate the implementing microinstructions 126 for various complex ISA instructions 124, and when the simple instruction translator 204 decodes a complex ISA instruction 242, it provides the relevant microcode routine address 252 to the micro-PC 232 of the complex instruction translator 206. The simple instruction translator 204 emits all the microinstructions 244 needed to implement a relatively large percentage of the instructions 124 of the ARM and x86 ISA instruction sets, particularly ISA instructions 124 that tend to be performed by x86 ISA and ARM ISA machine language programs with a high frequency, and only a relatively small percentage requires the complex instruction translator 206 to provide implementing microinstructions 246. According to one embodiment, examples of x86 instructions that are primarily implemented by the complex instruction translator 206 are the RDMSR/WRMSR, CPUID, complex mathematical instructions (e.g., FSQRT and transcendental instructions), and IRET instructions; and examples of ARM instructions that are primarily implemented by the complex instruction translator 206 are the MCR, MRC, MSR, MRS, SRS, and RFE instructions. The preceding list is by no means exhaustive, but provides an indication of the type of ISA instructions implemented by the complex instruction translator 206.

When the instruction mode indicator 132 indicates x86, the x86 SIT 222 decodes the x86 ISA instructions 242 and translates them into the implementing microinstructions 244; when the instruction mode indicator 132 indicates ARM, the ARM SIT 224 decodes the ARM ISA instructions 242 and translates them into the implementing microinstructions 244. In one embodiment, the simple instruction translator 204 is a block of Boolean logic gates synthesized using well-known synthesis tools. In one embodiment, the x86 SIT 222 and the ARM SIT 224 are separate blocks of Boolean logic gates; however, in another embodiment, the x86 SIT 222 and the ARM SIT 224 are a single block of Boolean logic gates. In one embodiment, the simple instruction translator 204 translates up to three ISA instructions 242 and provides up to six implementing microinstructions 244 to the execution pipeline 112 per clock cycle. In one embodiment, the simple instruction translator 204 comprises three sub-translators (not shown) that each translate a single formatted ISA instruction 242: the first sub-translator is capable of translating a formatted ISA instruction 242 that requires no more than three implementing microinstructions 126; the second sub-translator is capable of translating a formatted ISA instruction 242 that requires no more than two implementing microinstructions 126; and the third sub-translator is capable of translating a formatted ISA instruction 242 that requires no more than one implementing microinstruction 126. In one embodiment, the simple instruction translator 204 includes a hardware state machine that enables it to output multiple microinstructions 244 that implement an ISA instruction 242 over multiple clock cycles.

In one embodiment, the simple instruction translator 204 also performs various exception checks based on the instruction mode indicator 132 and/or environment mode indicator 136. For example, if the instruction mode indicator 132 indicates x86 and the x86 SIT 222 decodes an ISA instruction 124 that is invalid for the x86 ISA, then the simple instruction translator 204 generates an x86 invalid opcode exception; similarly, if the instruction mode indicator 132 indicates ARM and the ARM SIT 224 decodes an ISA instruction 124 that is invalid for the ARM ISA, then the simple instruction translator 204 generates an ARM undefined instruction exception. For another example, if the environment mode indicator 136 indicates the x86 ISA, then the simple instruction translator 204 checks to see whether each x86 ISA instruction 242 it encounters requires a particular privilege level and, if so, checks whether the CPL satisfies the required privilege level for the x86 ISA instruction 242 and generates an exception if not; similarly, if the environment mode indicator 136 indicates the ARM ISA, then the simple instruction translator 204 checks to see whether each formatted ARM ISA instruction 242 is a privileged mode instruction and, if so, checks whether the current mode is a privileged mode and generates an exception if the current mode is user mode. The complex instruction translator 206 performs a similar function for certain complex ISA instructions 242.

The complex instruction translator 206 outputs a sequence of implementing microinstructions 246 to the mux 212. The microcode ROM 234 stores ROM instructions 247 of microcode routines. The microcode ROM 234 outputs the ROM instructions 247 in response to the address of the next ROM instruction 247 to be fetched from the microcode ROM 234, which is held by the micro-PC 232. Typically, the micro-PC 232 receives its initial value 252 from the simple instruction translator 204 in response to the simple instruction translator 204 decoding a complex ISA instruction 242. In other cases, such as in response to a reset or exception, the micro-PC 232 receives the address of the reset microcode routine address or appropriate microcode exception handler address, respectively. The microsequencer 236 updates the micro-PC 232 normally by the size of a ROM instruction 247 to sequence through microcode routines and alternatively to a target address generated by the execution pipeline 112 in response to execution of a control type microinstruction 126, such as a branch instruction, to effect branches to non-sequential locations in the microcode ROM 234. The microcode ROM 234 is manufactured within the semiconductor die of the microprocessor 100.

In addition to the microinstructions 244 that implement a simple ISA instruction 124 or a portion of a complex ISA instruction 124, the simple instruction translator 204 also generates ISA instruction information 255 that is written to the instruction indirection register (IIR) 235. The ISA instruction information 255 stored in the IIR 235 includes information about the ISA instruction 124 being translated, for example, information identifying the source and destination registers specified by the ISA instruction 124 and the form of the ISA instruction 124, such as whether the ISA instruction 124 operates on an operand in memory or in an architectural register 106 of the microprocessor 100. This enables the microcode routines to be generic, i.e., without having to have a different microcode routine for each different source and/or destination architectural register 106. In particular, the simple instruction translator 204 is knowledgeable of the register file 106, including which registers are shared registers 504, and translates the register information provided in the x86 ISA and ARM ISA instructions 124 to the appropriate register in the register file 106 via the ISA instruction information 255. The ISA instruction information 255 also includes a displacement field, an immediate field, a constant field, rename information for each source operand as well as for the microinstruction 126 itself, information to indicate the first and last microinstruction 126 in the sequence of microinstructions 126 that implement the ISA instruction 124, and other bits of useful information gleaned from the decode of the ISA instruction 124 by the hardware instruction translator 104.

The microtranslator 237 receives the ROM instructions 247 from the microcode ROM 234 and the contents of the IIR 235. In response, the microtranslator 237 generates implementing microinstructions 246. The microtranslator 237 translates certain ROM instructions 247 into different sequences of microinstructions 246 depending upon the information received from the IIR 235, such as depending upon the form of the ISA instruction 124 and the source and/or destination architectural register 106 combinations specified by them. In many cases, much of the ISA instruction information 255 is merged with the ROM instruction 247 to generate the implementing microinstructions 246. In one embodiment, each ROM instruction 247 is approximately 40 bits wide and each microinstruction 246 is approximately 200 bits wide. In one embodiment, the microtranslator 237 is capable of generating up to three microinstructions 246 from a ROM instruction 247. The microtranslator 237 comprises Boolean logic gates that generate the implementing microinstructions 246.

An advantage provided by the microtranslator 237 is that the size of the microcode ROM 234 may be reduced since it does not need to store the ISA instruction information 255 provided by the IIR 235 since the simple instruction translator 204 generates the ISA instruction information 255. Furthermore, the microcode ROM 234 routines may include fewer conditional branch instructions because it does not need to include a separate routine for each different ISA instruction form and for each source and/or destination architectural register 106 combination. For example, if the complex ISA instruction 124 is a memory form, the simple instruction translator 204 may generate a prolog of microinstructions 244 that includes microinstructions 244 to load the source operand from memory into a temporary register 106, and the microtranslator 237 may generate a microinstruction 246 to store the result from the temporary register to memory; whereas, if the complex ISA instruction 124 is a register form, the prolog may move the source operand from the source register specified by the ISA instruction 124 to the temporary register 106, and the microtranslator 237 may generate a microinstruction 246 to move the result from a temporary register to the architectural destination register 106 specified by the IIR 235. In one embodiment, the microtranslator 237 is similar in many respects to the microtranslator 237 described in U.S. patent application Ser. No. 12/766,244, filed on Apr. 23, 2010, which is hereby incorporated by reference in its entirety for all purposes, but which is modified to translate ARM ISA instructions 124 in addition to x86 ISA instructions 124.

It is noted that the micro-PC 232 is distinct from the ARM PC 116 and the x86 IP 118; that is, the micro-PC 232 does not hold the address of ISA instructions 124, and the addresses held in the micro-PC 232 are not within the system memory address space. It is further noted that the microinstructions 246 are produced by the hardware instruction translator 104 and provided directly to the execution pipeline 112 for execution rather than being results 128 of the execution pipeline 112.

Figure 3:
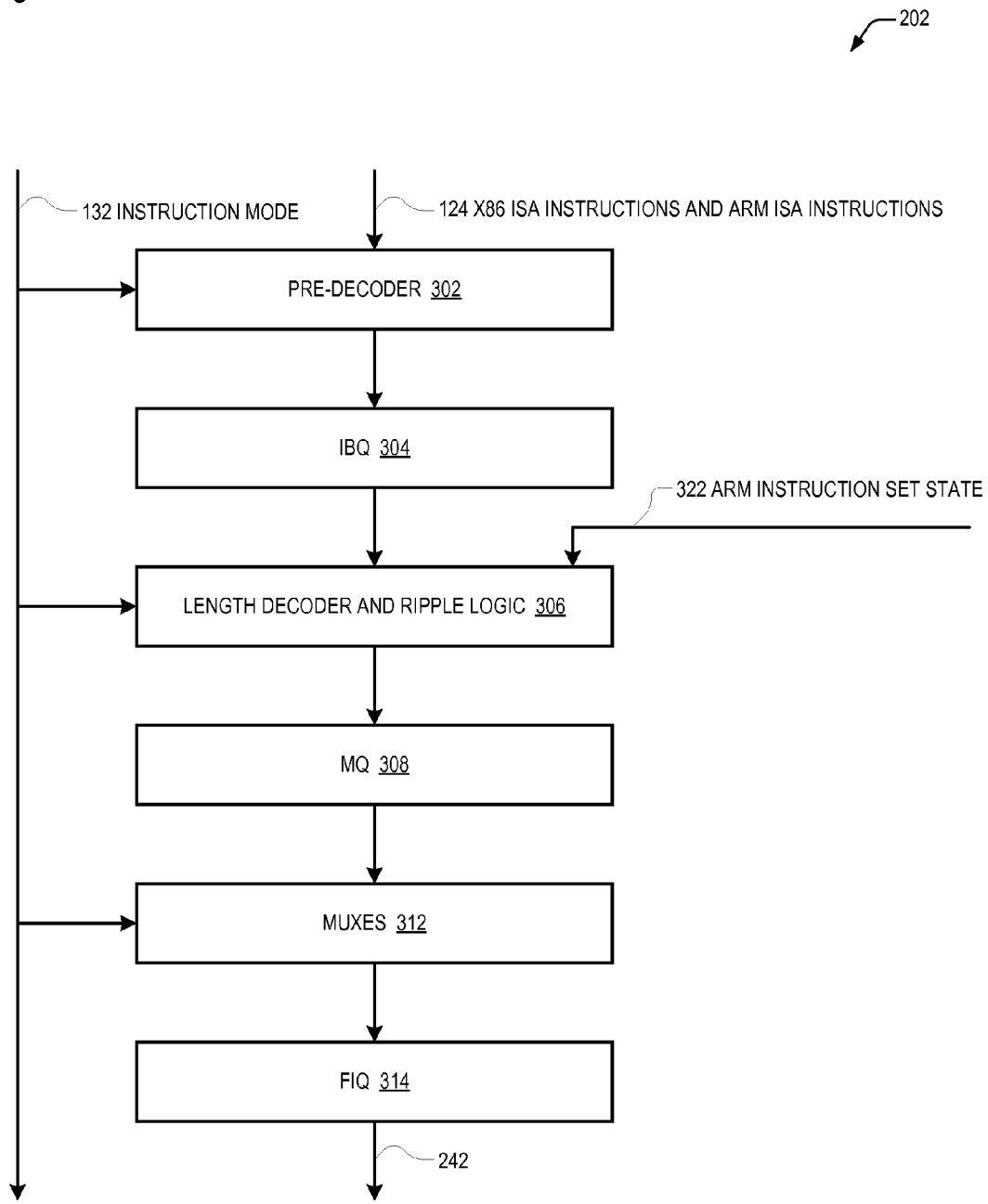
FIG. 3 is a block diagram illustrating in more detail the instruction formatter of FIG. 2.

Referring now to FIG. 3, a block diagram illustrating in more detail the instruction formatter 202 of FIG. 2 is shown. The instruction formatter 202 receives a block of the x86 ISA and ARM ISA instruction bytes 124 from the instruction cache 102 of FIG. 1. By virtue of the variable length nature of x86 ISA instructions, an x86 instruction 124 may begin in any byte within a block of instruction bytes 124. The task of determining the length and location of an x86 ISA instruction within a cache block is further complicated by the fact that the x86 ISA allows prefix bytes and the length may be affected by current address length and operand length default values. Furthermore, ARM ISA instructions are either 2-byte or 4-byte length instructions and are 2-byte or 4-byte aligned, depending upon the current ARM instruction set state 322 and the opcode of the ARM ISA instruction 124. Therefore, the instruction formatter 202 extracts distinct x86 ISA and ARM ISA instructions from the stream of instruction bytes 124 made up of the blocks received from the instruction cache 102. That is, the instruction formatter 202 formats the stream of x86 ISA and ARM ISA instruction bytes, which greatly simplifies the already difficult task of the simple instruction translator 204 of FIG. 2 to decode and translate the ISA instructions 124.

The instruction formatter 202 includes a pre-decoder 302 that pre-decodes the instruction bytes 124 as x86 instruction bytes if the instruction mode indicator 132 indicates x86 and pre-decodes the instruction bytes 124 as ARM instruction bytes if the instruction mode indicator 132 indicates ARM to generate pre-decode information. An instruction byte queue (IBQ) 304 receives the block of ISA instruction bytes 124 and associated pre-decode information generated by the pre-decoder 302.

An array of length decoders and ripple logic 306 receives the contents of the bottom entry of the IBQ 304, namely a block of ISA instruction bytes 124 and associated pre-decode information. The length decoders and ripple logic 306 also receives the instruction mode indicator 132 and the ARM ISA instruction set state 322. In one embodiment, the ARM ISA instruction set state 322 comprises the J and T bits of the ARM ISA CPSR register. In response to its inputs, the length decoders and ripple logic 306 generates decode information including the length of x86 and ARM instructions in the block of ISA instruction bytes 124, x86 prefix information, and indicators associated with each of the ISA instruction bytes 124 indicating whether the byte is the start byte of an ISA instruction 124, the end byte of an ISA instruction 124, and/or a valid byte of an ISA instruction 124. A mux queue (MQ) 308 receives a block of the ISA instruction bytes 126, its associated pre-decode information generated by the pre-decoder 302, and the associated decode information generated by the length decoders and ripple logic 306.

Control logic (not shown) examines the contents of the bottom MQ 308 entries and controls muxes 312 to extract distinct, or formatted, ISA instructions and associated pre-decode and decode information, which are provided to a formatted instruction queue (FIQ) 314. The FIQ 314 buffers the formatted ISA instructions 242 and related information for provision to the simple instruction translator 204 of FIG. 2. In one embodiment, the muxes 312 extract up to three formatted ISA instructions and related information per clock cycle.

In one embodiment, the instruction formatter 202 is similar in many ways to the XIBQ, instruction formatter, and FIQ collectively as described in U.S. patent application Ser. Nos. 12/571,997; 12/572,002; 12/572,045; 12/572,024; 12/572,052; 12/572,058, each filed on Oct. 1, 2009, which are hereby incorporated by reference herein for all purposes. However, the XIBQ, instruction formatter, and FIQ of the above patent applications are modified to format ARM ISA instructions 124 in addition to x86 ISA instructions 124. The length decoder 306 is modified to decode ARM ISA instructions 124 to generate their length and start, end, and valid byte indicators. In particular, if the instruction mode indicator 132 indicates ARM ISA, the length decoder 306 examines the current ARM instruction set state 322 and the opcode of the ARM ISA instruction 124 to determine whether the ARM instruction 124 is a 2-byte or 4-byte length instruction. In one embodiment, the length decoder 306 includes separate length decoders for generating the length of x86 ISA instructions 124 and for generating the length of ARM ISA instructions 124, and tri-state outputs of the separate length decoders are wire-ORed together for provision to the ripple logic 306. In one embodiment, the formatted instruction queue (FIQ) 314 comprises separate queues for holding separate portions of the formatted instructions 242. In one embodiment, the instruction formatter 202 provides the simple instruction translator 204 up to three formatted ISA instructions 242 per clock cycle.

Figure 4:
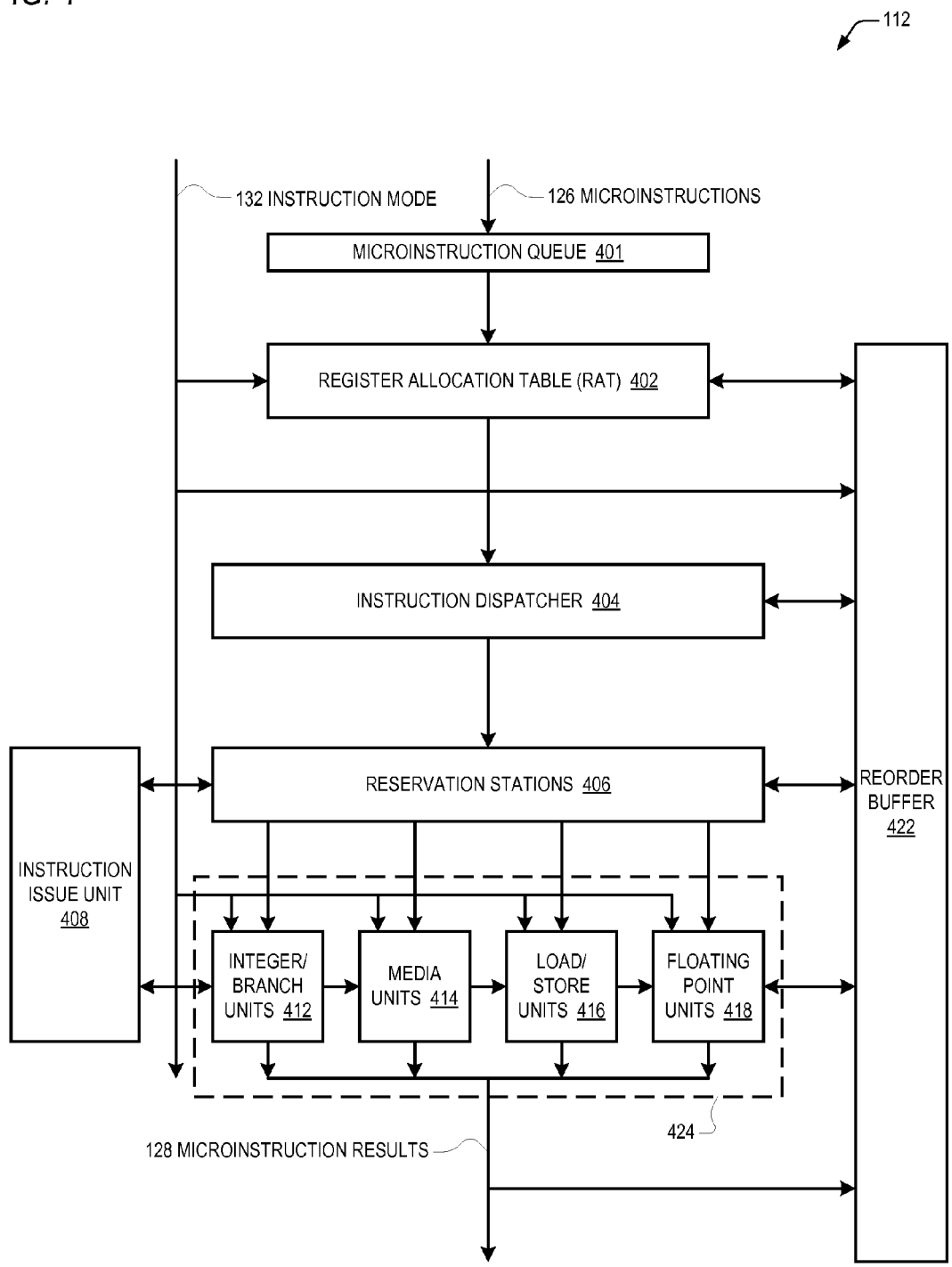
FIG. 4 is a block diagram illustrating in more detail the execution pipeline of FIG. 1.

Referring now to FIG. 4, a block diagram illustrating in more detail the execution pipeline 112 of FIG. 1 is shown. The execution pipeline 112 is coupled to receive the implementing microinstructions 126 directly from the hardware instruction translator 104 of FIG. 2. The execution pipeline 112 includes a microinstruction queue 401 that receives the microinstructions 126; a register allocation table (RAT) 402 that receives the microinstructions from the microinstruction queue 401; an instruction dispatcher 404 coupled to the RAT 402; reservation stations 406 coupled to the instruction dispatcher 404; an instruction issue unit 408 coupled to the reservation stations 406; a reorder buffer (ROB) 422 coupled to the RAT 402, instruction dispatcher 404, and reservation stations 406, and execution units 424 coupled to the reservation stations 406, instruction issue unit 408, and ROB 422. The RAT 402 and execution units 424 receive the instruction mode indicator 132.

The microinstruction queue 401 operates as a buffer in circumstances where the rate at which the hardware instruction translator 104 generates the implementing microinstructions 126 differs from the rate at which the execution pipeline 112 executes them. In one embodiment, the microinstruction queue 401 comprises an M-to-N compressible microinstruction queue that enables the execution pipeline 112 to receive up to M (in one embodiment M is six) microinstructions 126 from the hardware instruction translator 104 in a given clock cycle and yet store the received microinstructions 126 in an N-wide queue (in one embodiment N is three) structure in order to provide up to N microinstructions 126 per clock cycle to the RAT 402, which is capable of processing up to N microinstructions 126 per clock cycle. The microinstruction queue 401 is compressible in that it does not leave holes among the entries of the queue, but instead sequentially fills empty entries of the queue with the microinstructions 126 as they are received from the hardware instruction translator 104 regardless of the particular clock cycles in which the microinstructions 126 are received. This advantageously enables high utilization of the execution units 424 (of FIG. 4) in order to achieve high instruction throughput while providing advantages over a non-compressible M-wide or N-wide instruction queue. More specifically, a non-compressible N-wide queue would require the hardware instruction translator 104, in particular the simple instruction translator 204, to re-translate in a subsequent clock cycle one or more ISA instructions 124 that it already translated in a previous clock cycle because the non-compressible N-wide queue could not receive more than N microinstructions 126 per clock cycle, and the re-translation wastes power; whereas, a non-compressible M-wide queue, although not requiring the simple instruction translator 204 to re-translate, would create holes among the queue entries, which is wasteful and would require more rows of entries and thus a larger and more power-consuming queue in order to accomplish comparable buffering capability.

The RAT 402 receives the microinstructions 126 from the microinstruction queue 401 and generates dependency information regarding the pending microinstructions 126 within the microprocessor 100 and performs register renaming to increase the microinstruction parallelism to take advantage of the superscalar, out-of-order execution ability of the execution pipeline 112. If the ISA instructions 124 indicates x86, then the RAT 402 generates the dependency information and performs the register renaming with respect to the x86 ISA registers 106 of the microprocessor 100; whereas, if the ISA instructions 124 indicates ARM, then the RAT 402 generates the dependency information and performs the register renaming with respect to the ARM ISA registers 106 of the microprocessor 100; however, as mentioned above, some of the registers 106 may be shared by the x86 ISA and ARM ISA. The RAT 402 also allocates an entry in the ROB 422 for each microinstruction 126 in program order so that the ROB 422 can retire the microinstructions 126 and their associated x86 ISA and ARM ISA instructions 124 in program order, even though the microinstructions 126 may execute out of program order with respect to the x86 ISA and ARM ISA instructions 124 they implement. The ROB 422 comprises a circular queue of entries, each for storing information related to a pending microinstruction 126. The information includes, among other things, microinstruction 126 execution status, a tag that identifies the x86 or ARM ISA instruction 124 from which the microinstruction 126 was translated, and storage for storing the results of the microinstruction 126.

The instruction dispatcher 404 receives the register-renamed microinstructions 126 and dependency information from the RAT 402 and, based on the type of instruction and availability of the execution units 424, dispatches the microinstructions 126 and their associated dependency information to the reservation station 406 associated with the appropriate execution unit 424 that will execute the microinstruction 126.

The instruction issue unit 408, for each microinstruction 126 waiting in a reservation station 406, detects that the associated execution unit 424 is available and the dependencies are satisfied (e.g., the source operands are available) and issues the microinstruction 126 to the execution unit 424 for execution. As mentioned, the instruction issue unit 408 can issue the microinstructions 126 for execution out of program order and in a superscalar fashion.

In one embodiment, the execution units 424 include integer/branch units 412, media units 414, load/store units 416, and floating point units 418. The execution units 424 execute the microinstructions 126 to generate results 128 that are provided to the ROB 422. Although the execution units 424 are largely agnostic of whether the microinstructions 126 they are executing were translated from an x86 or ARM ISA instruction 124, the execution units 424 use the instruction mode indicator 132 and environment mode indicator 136 to execute a relatively small subset of the microinstructions 126. For example, the execution pipeline 112 handles the generation of flags slightly differently based on whether the instruction mode indicator 132 indicates the x86 ISA or the ARM ISA and updates the x86 EFLAGS register or ARM condition code flags in the PSR depending upon whether the instruction mode indicator 132 indicates the x86 ISA or the ARM ISA. For another example, the execution pipeline 112 samples the instruction mode indicator 132 to decide whether to update the 86 IP 118 or the ARM PC 116, or common instruction address register, and whether to use x86 or ARM semantics to do so. Once a microinstruction 126 becomes the oldest completed microinstruction 126 in the microprocessor 100 (i.e., at the head of the ROB 422 queue and having a completed status) and all other microinstructions 126 that implement the associated ISA instruction 124 are complete, the ROB 422 retires the ISA instruction 124 and frees up the entries associated with the implementing microinstructions 126. In one embodiment, the microprocessor 100 can retire up to three ISA instructions 124 per clock cycle. Advantageously, the execution pipeline 112 is a high performance, general purpose execution engine that executes microinstructions 126 of the microarchitecture of the microprocessor 100 that supports both x86 ISA and ARM ISA instructions 124.

Figure 5:
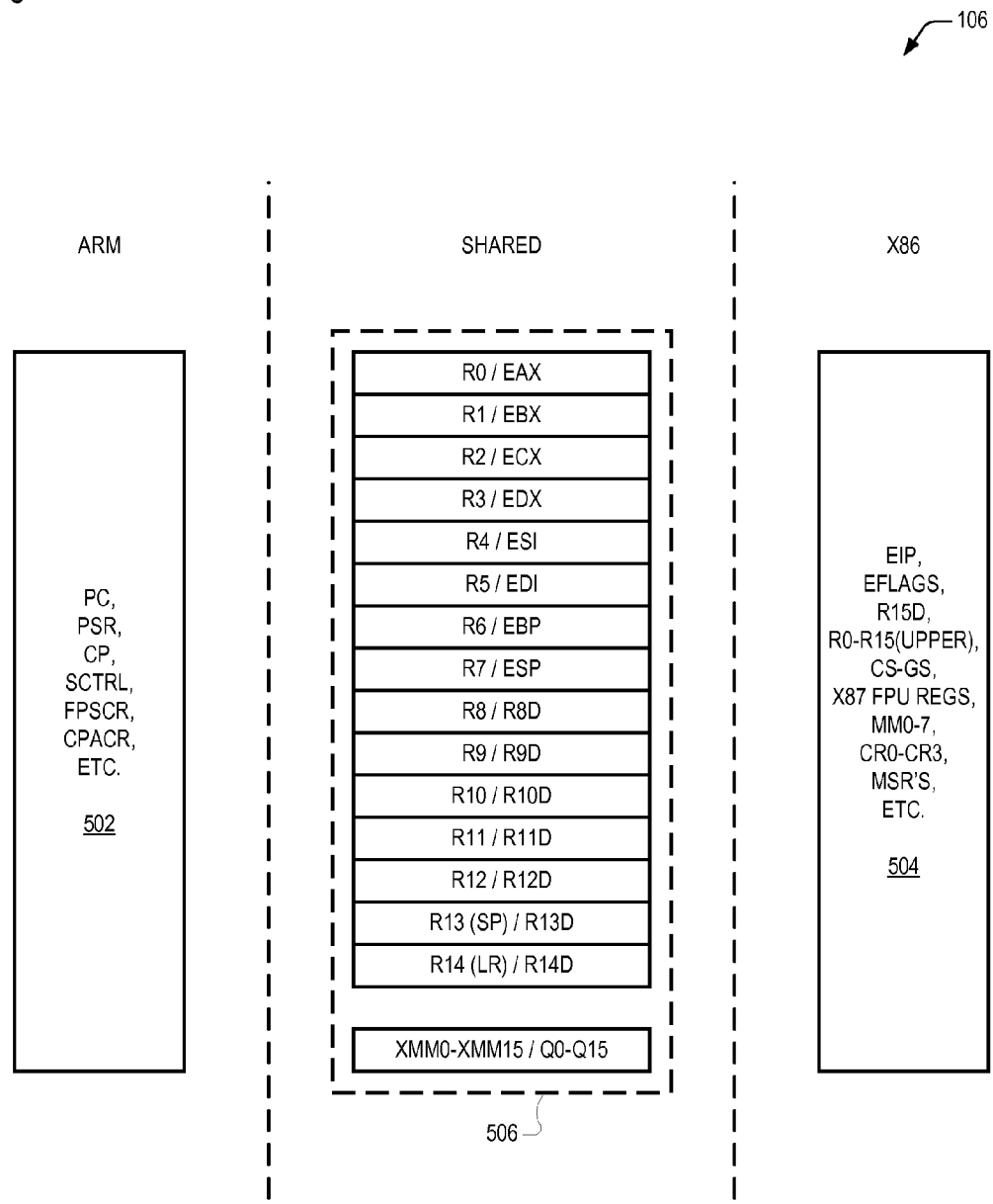
FIG. 5 is a block diagram illustrating in more detail the register file of FIG. 1.

Referring now to FIG. 5, a block diagram illustrating in more detail the register file 106 of FIG. 1 is shown. Preferably register file 106 is implemented as separate physical blocks of registers. In one embodiment, the general purpose registers are implemented in one physical register file having a plurality of read ports and write ports; whereas, other registers may be physically located apart from the general purpose register file and proximate functional blocks which access them and may have fewer read/write ports than the general purpose register file. In one embodiment, some of the non-general purpose registers, particularly those that do not directly control hardware of the microprocessor 100 but simply store values used by microcode 234 (e.g., some x86 MSR or ARM coprocessor registers), are implemented in a private random access memory (PRAM) accessible by the microcode 234 but invisible to the x86 ISA and ARM ISA programmer, i.e., not within the ISA system memory address space.

Broadly speaking, the register file 106 is separated logically into three categories, as shown in FIG. 5, namely the ARM-specific registers 502, the x86-specific register 504, and the shared registers 506. In one embodiment, the shared registers 506 include fifteen 32-bit registers that are shared by the ARM ISA registers R0 through R14 and the x86 ISA EAX through R14D registers as well as sixteen 128-bit registers shared by the x86 ISA XMM0 through XMM15 registers and the ARM ISA Advanced SIMD (Neon) registers, a portion of which are also overlapped by the thirty-two 32-bit ARM VFPv3 floating-point registers. As mentioned above with respect to FIG. 1, the sharing of the general purpose registers implies that a value written to a shared register by an x86 ISA instruction 124 will be seen by an ARM ISA instruction 124 that subsequently reads the shared register, and vice versa. This advantageously enables x86 ISA and ARM ISA routines to communicate with one another through registers. Additionally, as mentioned above, certain bits of architectural control registers of the x86 ISA and ARM ISA are also instantiated as shared registers 506. As mentioned above, in one embodiment, the x86 MSRs may be accessed by ARM ISA instructions 124 via an implementation-defined coprocessor register, and are thus shared by the x86 ISA and ARM ISA. The shared registers 506 may also include non-architectural registers, for example non-architectural equivalents of the condition flags, that are also renamed by the RAT 402. The hardware instruction translator 104 is aware of which registers are shared by the x86 ISA and ARM ISA so that it may generate the implementing microinstructions 126 that access the correct registers.

The ARM-specific registers 502 include the other registers defined by the ARM ISA that are not included in the shared registers 506, and the x86-specific registers 504 include the other registers defined by the x86 ISA that are not included in the shared registers 506. Examples of the ARM-specific registers 502 include the ARM PC 116, CPSR, SCTRL, FPSCR, CPACR, coprocessor registers, banked general purpose registers and SPSRs of the various exception modes, and so forth. The foregoing is not intended as an exhaustive list of the ARM-specific registers 502, but is merely provided as an illustrative example. Examples of the x86-specific registers 504 include the x86 EIP 118, EFLAGS, R15D, upper 32 bits of the 64-bit R0-R15 registers (i.e., the portion not in the shared registers 506), segment registers (SS, CS, DS, ES, FS, GS), x87 FPU registers, MMX registers, control registers (e.g., CR0-CR3, CR8), and so forth. The foregoing is not intended as an exhaustive list of the x86-specific registers 504, but is merely provided as an illustrative example.

In one embodiment, the microprocessor 100 includes new implementation-defined ARM coprocessor registers that may be accessed when the instruction mode indicator 132 indicates the ARM ISA in order to perform x86 ISA-related operations, including but not limited to: the ability to reset the microprocessor 100 to an x86 ISA processor (reset-to-x86 instruction); the ability to initialize the x86-specific state of the microprocessor 100, switch the instruction mode indicator 132 to x86, and begin fetching x86 instructions 124 at a specified x86 target address (launch-x86 instruction); the ability to access the global configuration register discussed above; the ability to access x86-specific registers (e.g., EFLAGS), in which the x86 register to be accessed is identified in the ARM R0 register, power management (e.g., P-state and C-state transitions), processor bus functions (e.g., I/O cycles), interrupt controller access, and encryption acceleration functionality access, as discussed above. Furthermore, in one embodiment, the microprocessor 100 includes new x86 non-architectural MSRs that may be accessed when the instruction mode indicator 132 indicates the x86 ISA in order to perform ARM ISA-related operations, including but not limited to: the ability to reset the microprocessor 100 to an ARM ISA processor (reset-to-ARM instruction); the ability to initialize the ARM-specific state of the microprocessor 100, switch the instruction mode indicator 132 to ARM, and begin fetching ARM instructions 124 at a specified ARM target address (launch-ARM instruction); the ability to access the global configuration register discussed above; the ability to access ARM-specific registers (e.g., the CPSR), in which the ARM register to be accessed is identified in the EAX register.

Figure 6A:
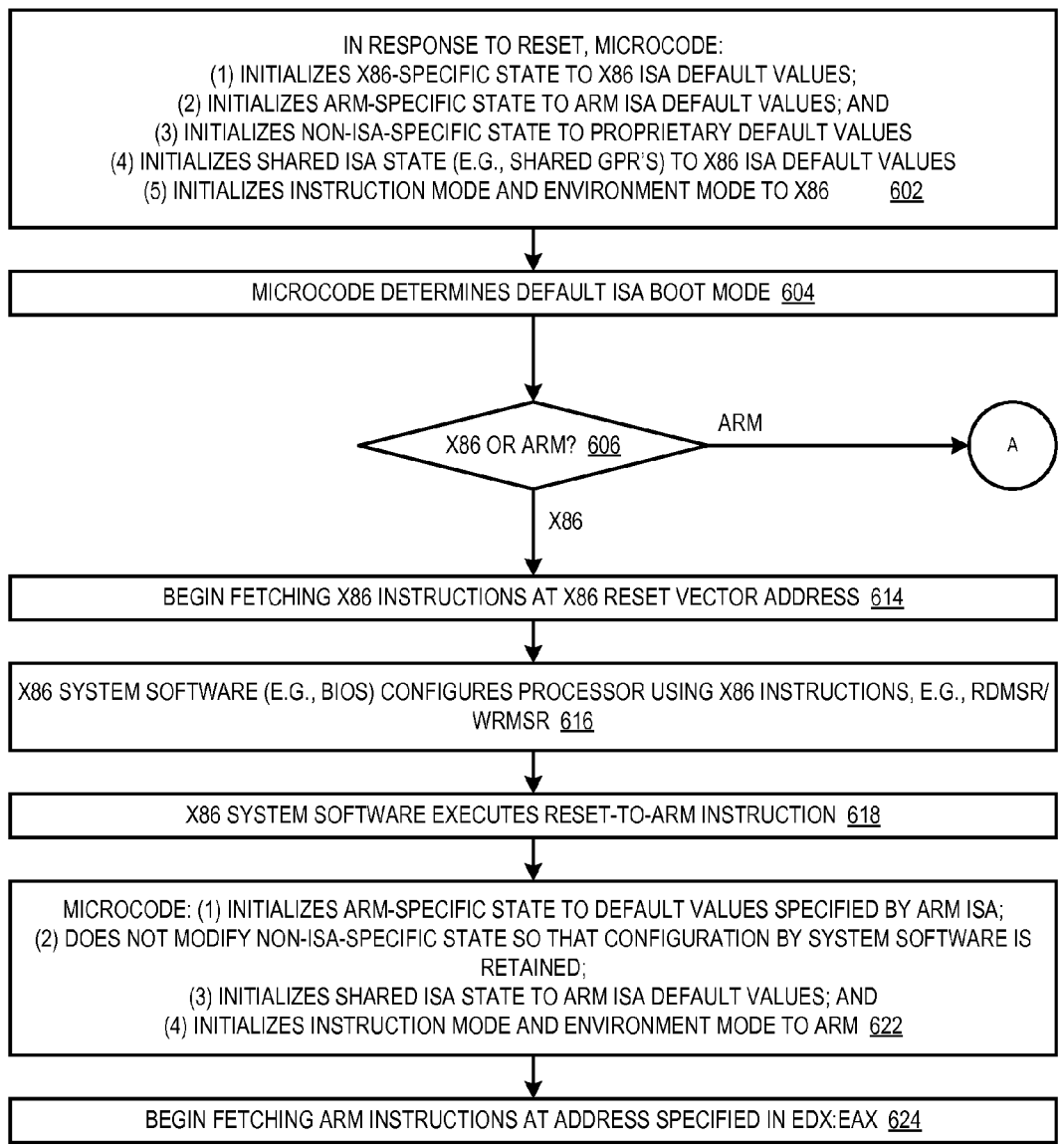
FIGS. 6A and 6B, referred to collectively as FIG. 6, is a flowchart illustrating operation of the microprocessor of FIG. 1.
Figure 6B:
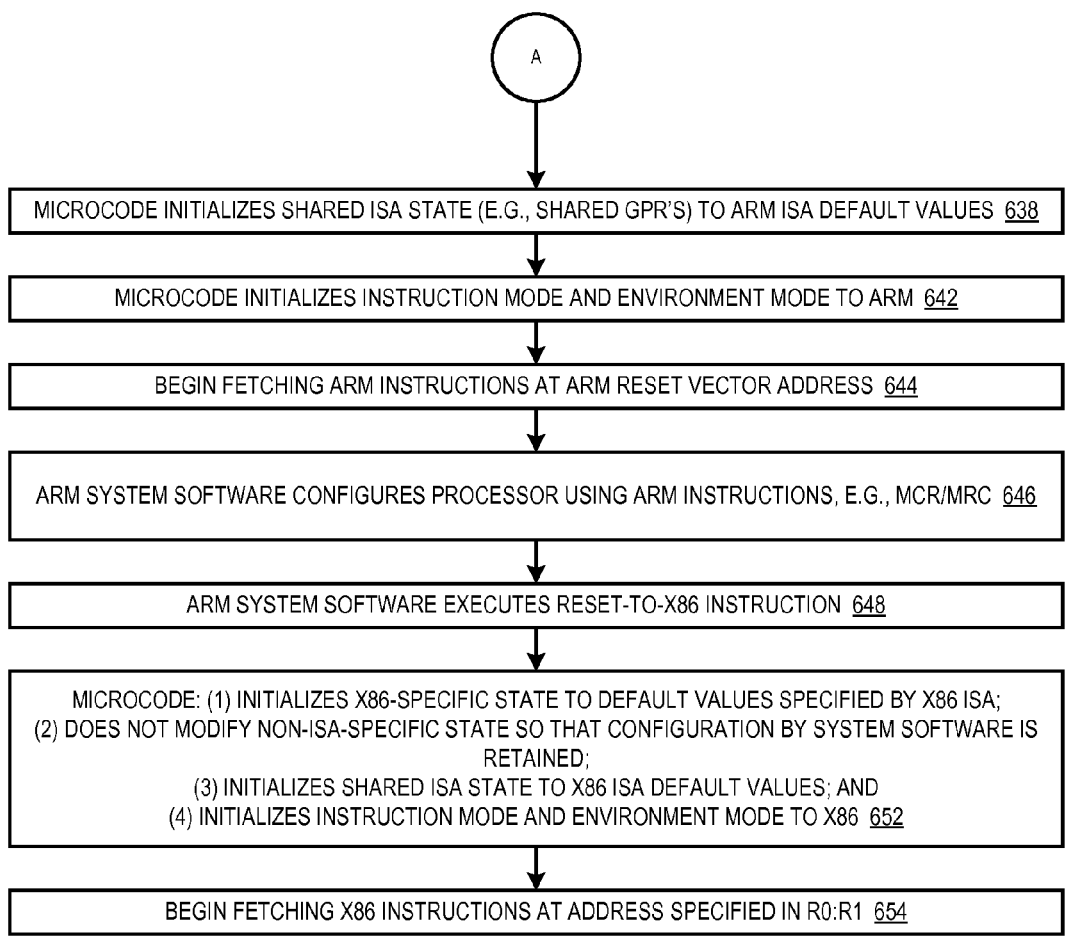

Referring now to FIG. 6, comprising FIGS. 6A and 6B, a flowchart illustrating operation of the microprocessor 100 of FIG. 1 is shown. Flow begins at block 602.

At block 602, the microprocessor 100 is reset. The reset may be signaled on the reset input to the microprocessor 100. Additionally, in an embodiment in which the processor bus is an x86 style processor bus, the reset may be signaled by an x86-style INIT. In response to the reset, the reset routines in the microcode 234 are invoked. The reset microcode: (1) initializes the x86-specific state 504 to the default values specified by the x86 ISA; (2) initializes the ARM-specific state 502 to the default values specified by the ARM ISA; (3) initializes the non-ISA-specific state of the microprocessor 100 to the default values specified by the microprocessor 100 manufacturer; (4) initializes the shared ISA state 506, e.g., the GPRs, to the default values specified by the x86 ISA; and (5) sets the instruction mode indicator 132 and environment mode indicator 136 to indicate the x86 ISA. In an alternate embodiment, instead of actions (4) and (5) above, the reset microcode initializes the shared ISA state 506 to the default values specified by the ARM ISA and sets the instruction mode indicator 132 and environment mode indicator 136 to indicate the ARM ISA. In such an embodiment, the actions at blocks 638 and 642 would not need to be performed, and before block 614 the reset microcode would initialize the shared ISA state 506 to the default values specified by the x86 ISA and set the instruction mode indicator 132 and environment mode indicator 136 to indicate the x86 ISA. Flow proceeds to block 604.

At block 604, the reset microcode determines whether the microprocessor 100 is configured to boot as an x86 processor or as an ARM processor. In one embodiment, as described above, the default ISA boot mode is hardcoded in microcode but may be modified by blowing a configuration fuse and/or by a microcode patch. In another embodiment, the default ISA boot mode is provided as an external input to the microprocessor 100, such as an external input pin. Flow proceeds to decision block 606. At decision block 606, if the default ISA boot mode is x86, flow proceeds to block 614; whereas, if the default ISA boot mode is ARM, flow proceeds to block 638.

At block 614, the reset microcode causes the microprocessor 100 to begin fetching x86 instructions 124 at the reset vector address specified by the x86 ISA. Flow proceeds to block 616.

At block 616, the x86 system software, e.g., BIOS, configures the microprocessor 100 using, for example, x86 ISA RDMSR and WRMSR instructions 124. Flow proceeds to block 618.

At block 618, the x86 system software does a reset-to-ARM instruction 124. The reset-to-ARM instruction causes the microprocessor 100 to reset and to come out of the reset as an ARM processor. However, because no x86-specific state 504 and no non-ISA-specific configuration state is changed by the reset-to-ARM instruction 126, it advantageously enables x86 system firmware to perform the initial configuration of the microprocessor 100 and then reboot the microprocessor 100 as an ARM processor while keeping intact the non-ARM configuration of the microprocessor 100 performed by the x86 system software. This enables "thin" micro-boot code to boot an ARM operating system without requiring the micro-boot code to know the complexities of how to configure the microprocessor 100. In one embodiment, the reset-to-ARM instruction is an x86 WRMSR instruction to a new non-architectural MSR. Flow proceeds to block 622.

At block 622, the simple instruction translator 204 traps to the reset microcode in response to the complex reset-to-ARM instruction 124. The reset microcode initializes the ARM-specific state 502 to the default values specified by the ARM ISA. However, the reset microcode does not modify the non-ISA-specific state of the microprocessor 100, which advantageously preserves the configuration performed at block 616. Additionally, the reset microcode initializes the shared ISA state 506 to the default values specified by the ARM ISA. Finally, the reset microcode sets the instruction mode indicator 132 and environment mode indicator 136 to indicate the ARM ISA. Flow proceeds to block 624.

At block 624, the reset microcode causes the microprocessor 100 to begin fetching ARM instructions 124 at the address specified in the x86 ISA EDX:EAX registers. Flow ends at block 624.

At block 638, the reset microcode initializes the shared ISA state 506, e.g., the GPRs, to the default values specified by the ARM ISA. Flow proceeds to block 642.

At block 642, the reset microcode sets the instruction mode indicator 132 and environment mode indicator 136 to indicate the ARM ISA. Flow proceeds to block 644.

At block 644, the reset microcode causes the microprocessor 100 to begin fetching ARM instructions 124 at the reset vector address specified by the ARM ISA. The ARM ISA defines two reset vector addresses selected by an input. In one embodiment, the microprocessor 100 includes an external input to select between the two ARM ISA-defined reset vector addresses. In another embodiment, the microcode 234 includes a default selection between the two ARM ISA-defined reset vector addresses, which may be modified by a blown fuse and/or microcode patch. Flow proceeds to block 646.

At block 646, the ARM system software configures the microprocessor 100 using, for example, ARM ISA MCR and MRC instructions 124. Flow proceeds to block 648.

At block 648, the ARM system software does a reset-to-x86 instruction 124. The reset-to-x86 instruction causes the microprocessor 100 to reset and to come out of the reset as an x86 processor. However, because no ARM-specific state 502 and no non-ISA-specific configuration state is changed by the reset-to-x86 instruction 126, it advantageously enables ARM system firmware to perform the initial configuration of the microprocessor 100 and then reboot the microprocessor 100 as an x86 processor while keeping intact the non-x86 configuration of the microprocessor 100 performed by the ARM system software. This enables "thin" micro-boot code to boot an x86 operating system without requiring the micro-boot code to know the complexities of how to configure the microprocessor 100. In one embodiment, the reset-to-x86 instruction is an ARM MRC/MRCC instruction to a new implementation-defined coprocessor register. Flow proceeds to block 652.

At block 652, the simple instruction translator 204 traps to the reset microcode in response to the complex reset-to-x86 instruction 124. The reset microcode initializes the x86-specific state 504 to the default values specified by the x86 ISA. However, the reset microcode does not modify the non-ISA-specific state of the microprocessor 100, which advantageously preserves the configuration performed at block 646. Additionally, the reset microcode initializes the shared ISA state 506 to the default values specified by the x86 ISA. Finally, the reset microcode sets the instruction mode indicator 132 and environment mode indicator 136 to indicate the x86 ISA. Flow proceeds to block 654.

At block 654, the reset microcode causes the microprocessor 100 to begin fetching x86 instructions 124 at the address specified in the ARM ISA R1:R0 registers. Flow ends at block 654.

Figure 7:
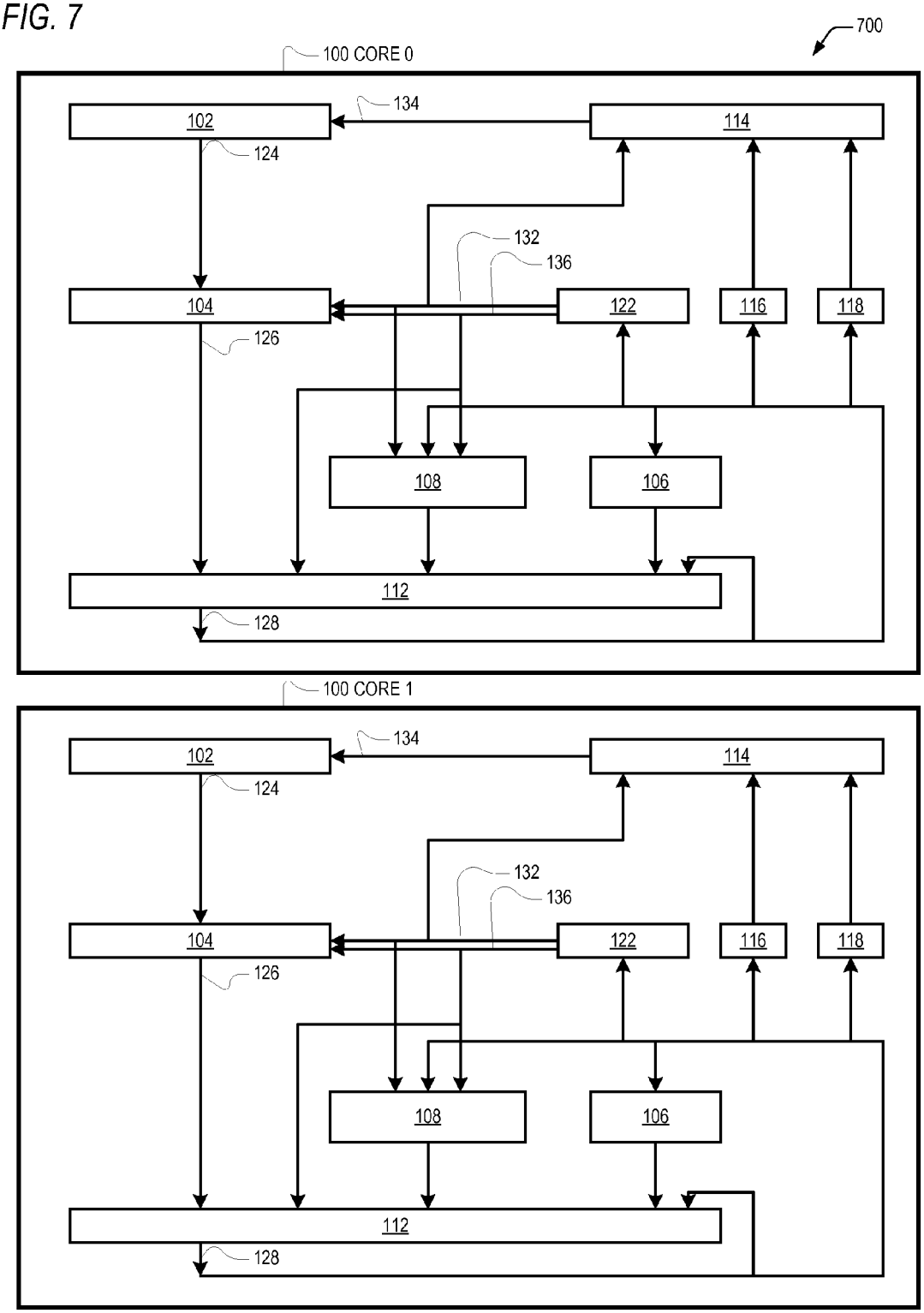
FIG. 7 is a block diagram illustrating a dual-core microprocessor according to the present invention.

Referring now to FIG. 7, a block diagram illustrating a dual-core microprocessor 700 according to the present invention is shown. The dual-core microprocessor 700 includes two processing cores 100 in which each core 100 includes the elements of the microprocessor 100 of FIG. 1 such that it can perform both x86 ISA and ARM ISA machine language programs. The cores 100 may be configured such that both cores 100 are running x86 ISA programs, both cores 100 are running ARM ISA programs, or one core 100 is running x86 ISA programs while the other core 100 is running ARM ISA programs, and the mix between these three configurations may change dynamically during operation of the microprocessor 700. As discussed above with respect to FIG. 6, each core 100 has a default value for its instruction mode indicator 132 and environment mode indicator 136, which may be inverted by a fuse and/or microcode patch, such that each core 100 may individually come out of reset as an x86 or an ARM processor. Although the embodiment of FIG. 7 includes two cores 100, in other embodiments the microprocessor 700 includes more than two cores 100, each capable of running both x86 ISA and ARM ISA machine language programs.

Figure 8:
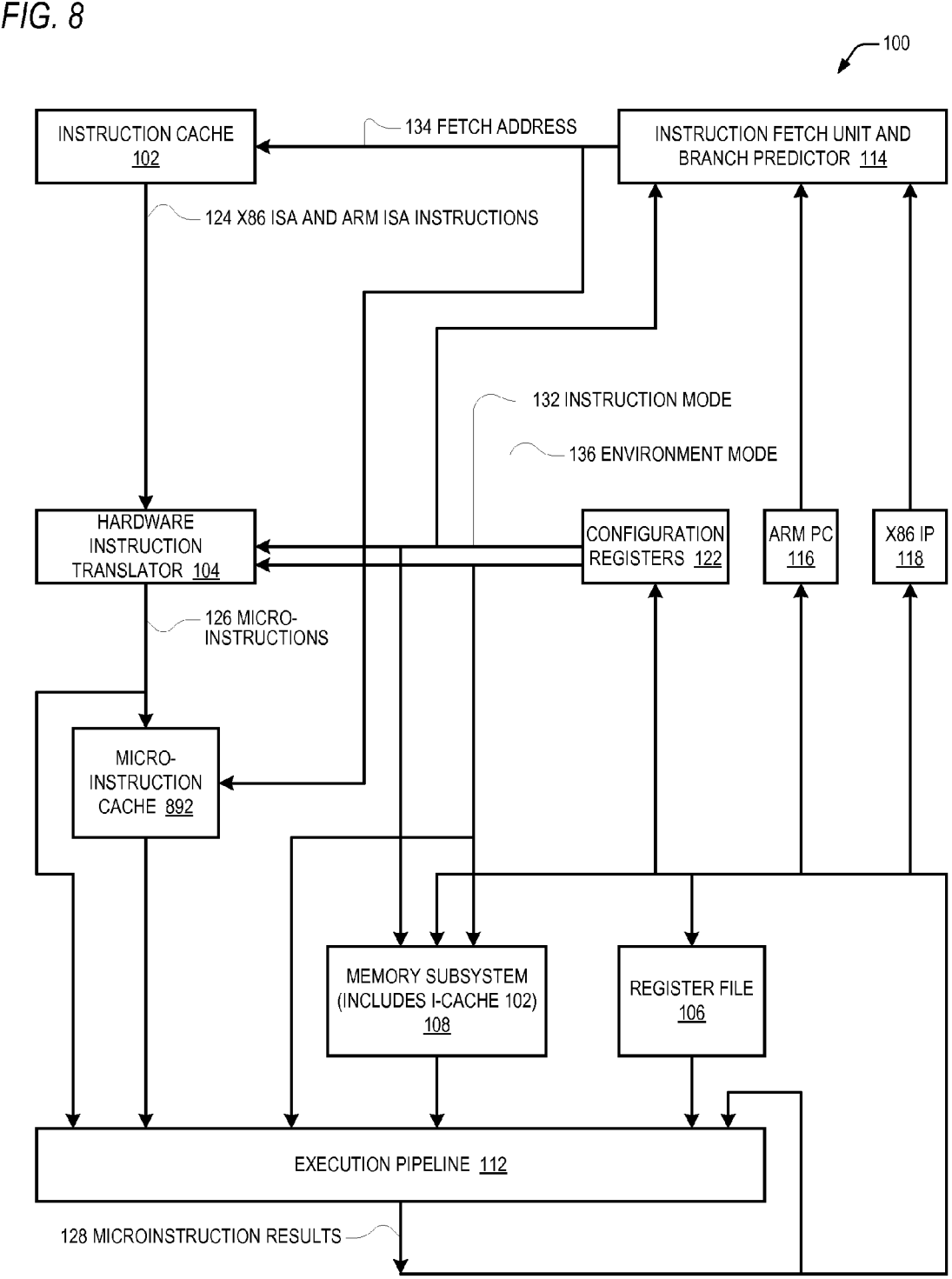
FIG. 8 is a block diagram illustrating a microprocessor that runs x86 ISA and ARM ISA machine language programs according to an alternate embodiment of the present invention.

Referring now to FIG. 8, a block diagram illustrating a microprocessor 100 that can perform x86 ISA and ARM ISA machine language programs according to an alternate embodiment of the present invention is shown. The microprocessor 100 of FIG. 8 is similar to the microprocessor 100 of FIG. 1 and like-numbered elements are similar. However, the microprocessor 100 of FIG. 8 also includes a microinstruction cache 892. The microinstruction cache 892 caches microinstructions 126 generated by the hardware instruction translator 104 that are provided directly to the execution pipeline 112. The microinstruction cache 892 is indexed by the fetch address 134 generated by the instruction fetch unit 114. If the fetch address 134 hits in the microinstruction cache 892, then a mux (not shown) within the execution pipeline 112 selects the microinstructions 126 from the microinstruction cache 892 rather than from the hardware instruction translator 104; otherwise, the mux selects the microinstructions 126 provided directly from the hardware instruction translator 104. The operation of a microinstruction cache, also commonly referred to as a trace cache, is well-known in the art of microprocessor design. An advantage provided by the microinstruction cache 892 is that the time required to fetch the microinstructions 126 from the microinstruction cache 892 is typically less than the time required to fetch the ISA instructions 124 from the instruction cache 102 and translate them into the microinstructions 126 by the hardware instruction translator 104. In the embodiment of FIG. 8, as the microprocessor 100 runs an x86 or ARM ISA machine language program, the hardware instruction translator 104 may not need to perform the hardware translation each time it performs an x86 or ARM ISA instruction 124, namely if the implementing microinstructions 126 are already present in the microinstruction cache 892.

Advantageously, embodiments of a microprocessor are described herein that can run both x86 ISA and ARM ISA machine language programs by including a hardware instruction translator that translates both x86 ISA and ARM ISA instructions into microinstructions of a microinstruction set distinct from the x86 ISA and ARM ISA instruction sets, which microinstructions are executable by a common execution pipeline of the microprocessor to which the implementing microinstructions are provided. An advantage of embodiments of the microprocessor described herein is that, by synergistically utilizing the largely ISA-agnostic execution pipeline to execute microinstructions that are hardware translated from both x86 ISA and ARM ISA instructions, the design and manufacture of the microprocessor may require fewer resources than two separately designed and manufactured microprocessors, i.e., one that can perform x86 ISA machine language programs and one that can perform ARM ISA machine language programs. Additionally, embodiments of the microprocessor, particularly those which employ a superscalar out-of-order execution pipeline, potentially provide a higher performance ARM ISA processor than currently exists. Furthermore, embodiments of the microprocessor potentially provide higher x86 and ARM performance than a system that employs a software translator. Finally, the microprocessor may be included in a system on which both x86 and ARM machine language programs can be run concurrently with high performance due to its ability to concurrently run both x86 ISA and ARM ISA machine language programs.

Conditional ALU Instructions

It may be desirable for a microprocessor to include in its instruction set the ability for instructions to be conditionally executed. That is, the instruction may specify a condition (e.g., zero, or negative, or greater than) which if satisfied by condition flags is executed by the microprocessor and which if not satisfied by condition flags is not executed. As mentioned above, the ARM ISA provides this capability, not just for branch instructions, but for a large portion of the instructions of its instruction set. The conditionally executed instructions may specify source operands supplied from general purpose registers to generate a result to be written to a general purpose destination register. U.S. Pat. No. 7,647,480, whose assignee is ARM Limited, of Cambridge, Great Britain, describes a data processing apparatus that handles conditional instructions. Generally speaking, a pipelined processing unit executes a conditional instruction to produce a result data value which represents either the result of the computation specified by the conditional instruction if the condition is satisfied, or the current data value stored in the destination register if the condition is not satisfied. Two possible solutions for accomplishing this are described.

In the first solution, each conditional instruction in the instruction set is constrained to specify a register that is both a source register and a destination register. This way, the conditional instruction only consumes two read ports of the register file, namely to supply the current destination register value as a source operand and to supply the other source operand. Thus, the first solution reduces the minimum number of register file read ports required to support execution of the conditional instruction by the pipelined processing unit.

A second solution removes the constraint of the first solution such that conditional instructions could specify separately the destination register and the source registers. The second solution requires an additional read port on the register file in order to be able to read the required operand data values (i.e., the source operands and the destination operand from the register file) for the conditional instruction in a single cycle. The first solution rather than the second solution is the subject of the invention of U.S. Pat. No. 7,647,480 because the second solution has the disadvantages of not only requiring the cost of an additional read port for the register file, but also requires a greater number of bits to specify the conditional instruction and increased complexity of the data path. More specifically, the data path would need logic to be provided for the three input paths from the register file and would potentially need forwarding logic to couple into each of the three paths.

Advantageously, embodiments are described herein that enable the conditional instructions to specify source operand registers that are distinct from the destination register and which does not require an additional read port on the register file. Generally speaking, according to embodiments described herein, the hardware instruction translator 104 of the microprocessor 100 of FIG. 1 translates a conditionally executed ISA instruction 124 into a sequence of one or more microinstructions 126 for execution by the execution pipeline 112. The execution unit 424 that executes the last microinstruction 126 of the sequence receives the original value of the destination register specified by the conditional instruction 124 along with a means to determine whether the condition is satisfied. A previous microinstruction 126, or the last microinstruction 126 itself, performs an operation on the source operands to generate a result. If the condition is not satisfied, the execution unit 424 that executes the last microinstruction 126 of the sequence writes the original value back to the destination register rather than writing the result value to the destination register.

As used herein, a conditional ALU instruction is an ISA instruction 124 that instructs the microprocessor 100 to perform an arithmetic or logical operation (ALU operation) on one or more source operands to generate a result and to write the result to a destination register. Other types of conditional instructions 124 may be supported in the ISA instruction sets of the microprocessor 100, such as conditional branch instructions 124 or conditional load/store instructions 124, which are distinguished from the conditional ALU instruction 124 type.

The number and types of microinstructions 126 in the sequence emitted by the hardware instruction translator 104 in response to encountering the conditional ALU instruction 124 is primarily a function of two characteristics. The first characteristic is whether the conditional ALU instruction 124 specifies that one of the source operands has a pre-shift operation applied to it. In one embodiment, the pre-shift operations include those described in the ARM Architecture Reference Manual at pages A8-10 through A8-12, for example. If the conditional ALU instruction 124 specifies a pre-shift operation, the hardware instruction translator 104 generates a shift microinstruction 126 (denoted SHF in FIG. 10 et seq.) as the first microinstruction 126 in the sequence. The shift microinstruction 126 performs the pre-shift to generate a shifted result that is written to a temporary register for potential use by a subsequent microinstruction 126 in the sequence. The second characteristic is whether the destination register specified by the conditional ALU instruction 124 is also one of the source operand registers. If so, the hardware instruction translator 104 makes an optimization to translate the conditional ALU instruction 124 into one less microinstruction 126 than a version of the conditional ALU instruction 124 that does not specify the destination register as one of the source operand registers, as described primarily with respect to FIGS. 21 through 28.

Furthermore, the conditional ALU instruction 124 specifies a condition that must be satisfied by the architectural condition flags in order for the conditional ALU instruction 124 to be performed by the microprocessor 100. The conditional ALU instruction 124 may specify that the architectural condition flags are to be updated based on the result of the ALU operation and/or a pre-shift-generated carry flag. However, the architectural condition flags are not to be updated if the condition is not satisfied. Accomplishing this is complicated by the fact that the hardware instruction translator 104 translates the conditional ALU instruction 124 into a sequence of microinstructions 126. More specifically, if the condition is satisfied, at least one of the microinstructions 126 must write the new condition flag values; however, the old values of the condition flags may be needed by microinstructions 126 in the sequence to determine whether the condition specified by the conditional ALU instruction 124 is satisfied and/or to perform the ALU operation. Advantageously, embodiments are described in which the microprocessor 100 employs techniques to ensure that it does not update the condition flags if the condition is not satisfied, and yet updates the condition flags with the correct values if the condition is satisfied, including with the pre-shift-generated carry flag value.

Embodiments of the microprocessor 100 are described in which the register file 106 of FIG. 1 that holds the general purpose registers includes only enough read ports for the register file 106 to provide at most two source operands to the execution units 424 that execute the microinstructions 126 that implement the conditional ALU instructions 124. As described above with respect to FIG. 1, embodiments are contemplated in which the microprocessor 100 is an enhancement of a commercially available microprocessor. The register file that holds the general purpose registers of the commercially available microprocessor includes only enough read ports for the register file to provide at most two source operands to the execution units that execute the microinstructions 126 that are described herein that implement the conditional ALU instructions 124. Thus, the embodiments described herein are particularly advantageous for synergistic adaptation of the commercially available microprocessor microarchitecture. As also described above with respect to FIG. 1, the commercially available microprocessor was originally designed for the x86 ISA in which conditional execution of instructions is not a dominant feature and, because it is accumulator-based, generally requires one of the source operands to be the destination operand, and therefore does not seem to justify the additional read port.

An advantage of the embodiments described herein is that although in some cases there is a two clock cycle execution latency associated with the execution of two microinstructions into which the conditional ALU instruction 124 is translated, and in some cases there is a three clock cycle execution latency associated with the execution of three microinstructions into which the conditional ALU instruction 124 is translated, the operations performed by each of the microinstructions is relatively simple, which lends itself to a pipelined implementation that is capable of supporting relatively high core clock rates.

Although embodiments are described in which the microprocessor 100 is capable of performing instructions of both the ARM ISA and the x86 ISA, the embodiments are not so limited. Rather, embodiments are contemplated in which the microprocessor performs instructions of only a single ISA. Furthermore, although embodiments are described in which the microprocessor 100 translates ARM ISA conditional ALU instructions into microinstructions 126 as described herein, embodiments are contemplated in which the microprocessor performs instructions of an ISA other than the ARM but which includes conditional ALU instructions in its instruction set.

Figure 9:
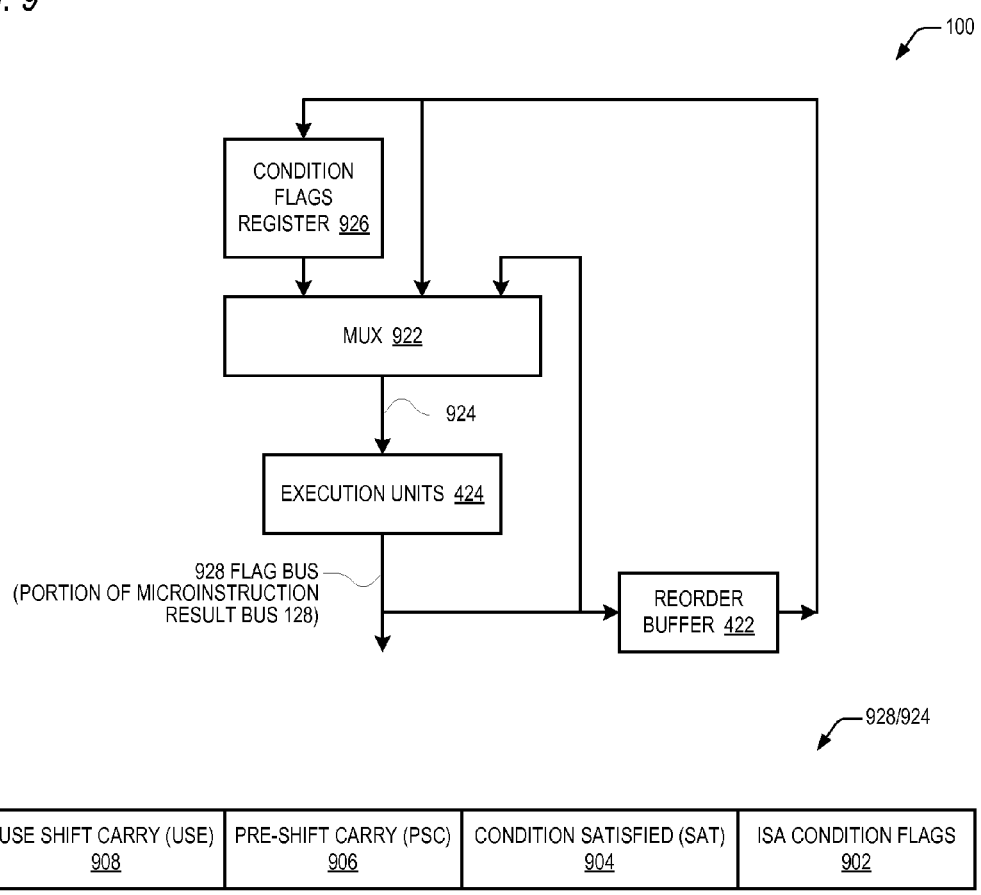
FIG. 9 is a block a diagram illustrating in more detail portions of the microprocessor of FIG. 1.

Referring now to FIG. 9, a block a diagram illustrating in more detail portions of the microprocessor 100 of FIG. 1 is shown. The microprocessor 100 includes an architectural condition flags register 926 of the register files 106 of FIG. 1, and the execution units 424 and the ROB 422 of FIG. 4. The condition flags register 926 stores the architectural condition flags. In one embodiment, when the instruction mode indicator 132 indicates the ARM ISA, the condition flags register 926 is storing values according to the semantics of the ARM ISA condition flags, and when the instruction mode indicator 132 indicates the x86 ISA, the condition flags register 926 is storing values according to the semantics of the x86 ISA condition flags, i.e., the x86 EFLAGS. As described above with respect to FIG. 5, preferably the register file 106 is implemented as separate physical blocks of registers; in particular, the condition flags register 926 may be implemented as a physical register file separate from, for example, the physical register file for the general purpose registers. Thus, even though the condition flags are provided to the execution units 424 for execution of the microinstructions 126, as discussed below, the read ports of the condition flags register file may be distinct from the read ports of the general purpose register file.

The condition flags register 926 outputs its condition flags value to one data input of a three-input mux 922. The mux 922 also receives on a second data input the condition flag results from the appropriate entry of the ROB 422. The mux 922 also receives on a third data input condition flag results from a flag bus 928. The mux 922 selects the appropriate data input to provide as an output 924 to the execution unit 424 to execute a microinstruction 126 that reads the condition flags, as discussed in more detail below. Although a single flag bus 928 is described, according to one embodiment, each execution unit 424 that is capable of generating condition flags has its own flag bus 928, and each execution unit 424 capable of reading the condition flags has its own condition flag input 924. Thus, the various execution units 424 are enabled to concurrently execute different microinstructions 126 that read and/or write the condition flags.

The flag bus 928, which is a portion of the result bus 128 of FIG. 1, conveys condition flag results that are output by the execution units 424. The condition flag results are written to the ROB 422, more particularly to the entry in the ROB 422 allocated to the microinstruction 126 being executed by the execution unit 424 executing the microinstruction 126 and whose results are conveyed on the flag bus 928. The condition flag results are also forwarded by the flag bus 928 to the third data input of the mux 922.

Also shown in FIG. 9 is a block diagram illustrating the condition flag values output on the flag bus 928 by the execution units 424 and the condition flag values 924 received by the execution units 424 from the mux 922. The condition flag values 928/924 include ISA condition flags 902, a condition satisfied (SAT) bit 904, a pre-shift carry (PSC) bit 906, and a use shift carry (USE) bit 908. When the instruction mode indicator 132 indicates the ARM ISA, the ISA condition flags 902 include the ARM carry flag (C), zero flag (Z), overflow flag (V), and negative flag (N). When the instruction mode indicator 132 indicates the x86 ISA, the ISA condition flags 902 include the x86 EFLAGS carry flag (CF), zero flag (ZF), overflow flag (OF), sign flag (SF), parity flag (PF) and auxiliary flag (AF). The condition flags register 926 includes storage for the ISA condition flags 902, SAT bit 904, PSC bit 906, and USE bit 908. In one embodiment, the condition flags register 926 shares storage for the x86 ISA and ARM ISA carry flag, zero flag, overflow flag, and negative/sign flag.

Each microinstruction 126 indicates, in addition to its basic operation (e.g., add, load/store, shift, Boolean AND, branch), whether the microinstruction 126 is to perform one or more of three additional operations: (1) read the condition flags 926 (denoted RDFLAGS in FIG. 10 et seq.), (2) write the condition flags 926 (denoted WRFLAGS in FIG. 10 et seq.), and (3) generate a carry flag value and write it to the PSC bit 906 of the condition flags 926 (denoted WRCARRY in FIG. 10 et seq.). In one embodiment, the microinstruction 126 includes respective bits to indicate the three additional operations. In another embodiment, the microinstruction 126 indicates the three additional operations via the opcode of the microinstruction 126; that is, alternative opcodes exist for the microinstruction 126 types that are capable of performing one or more of the three additional operations.

If an execution unit 424 executes a conditional ALU microinstruction 126 (denoted variously ALUOP CC, CUALUOP CC, NCUALUOP CC in FIG. 10 et seq.) that instructs it to write the condition flags 926 (denoted by WRFLAGS) and the condition flags 924 read by the execution unit 424 satisfy the condition specified by the microinstruction 126, then the execution unit 424 sets the SAT bit 904 to one; otherwise, the execution unit 424 clears the SAT bit 904 to zero. To further clarify, if an execution unit 424 executes any microinstruction 126 that instructs it to write the condition flags 926 and the microinstruction 126 is other than a conditional ALU microinstruction 126, then the execution unit 424 clears the SAT bit 904 to zero. As discussed below, some conditional microinstructions 126 specify a condition based on the ISA condition flags 902 (denoted XMOV CC in FIG. 10 et seq.) and some conditional microinstructions 126 specify a condition based on the SAT bit 904 (denoted CMOV in FIG. 10 et seq.).

If an execution unit 424 executes a shift microinstruction 126 that instructs it to write the carry flag (denoted by WRCARRY), then the execution unit 424 sets the USE bit 908 to one and writes to the PSC bit 906 the carry value generated by the shift microinstruction 126; otherwise, the execution unit 424 clears the USE bit 908 to zero. To further clarify, if an execution unit 424 executes any microinstruction 126 that instructs it to write the condition flags 926 and the microinstruction 126 is other than a shift microinstruction 126, then the execution unit 424 clears the USE bit 908 to zero. The USE bit 908 is consumed by a subsequent conditional ALU microinstruction 126 to determine whether to update the architectural carry flag 902 with the PSC bit 906 value or with a carry flag value generated based on an ALU operation performed by the conditional ALU microinstruction 126, as described more below. In an alternate embodiment, described more below, the USE bit 908 does not exist and instead the hardware instruction translator 104 translator directly generates a functional equivalent of the USE bit 908 as an indicator within the conditional ALU microinstruction 126.

Figure 10:
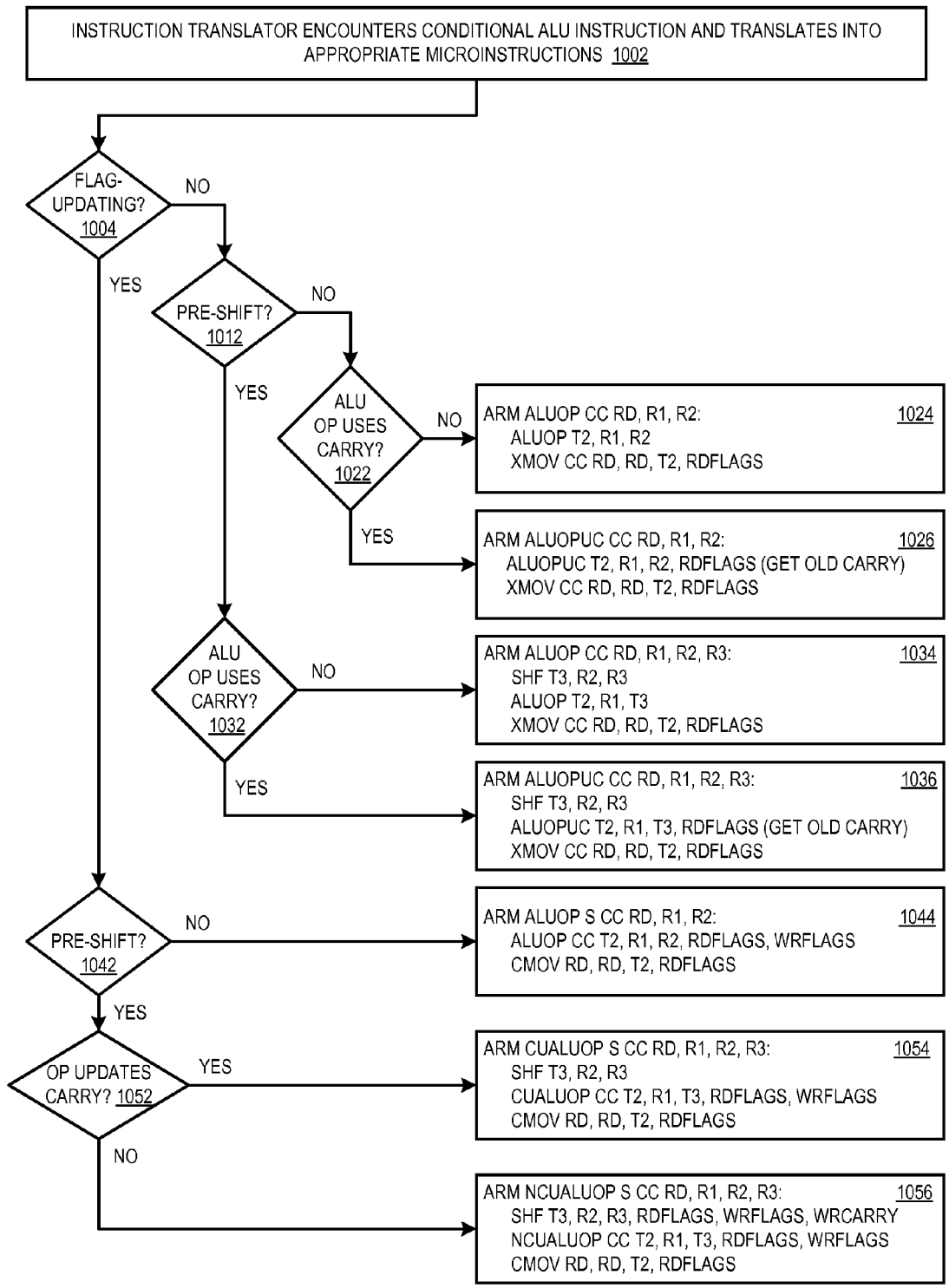
FIG. 10 is a flowchart illustrating operation of the hardware instruction translator of FIG. 1 to translate conditional ALU instructions.

Referring now to FIG. 10, a flowchart illustrating operation of the hardware instruction translator 104 of FIG. 1 to translate conditional ALU instructions 124 according to the present invention is shown. Generally, FIG. 10 illustrates the manner in which the hardware instruction translator 104 decodes the conditional ALU instruction 124 to determine its type in order to translate it into the appropriate sequence of microinstructions 126 for execution by the execution pipeline 112. More specifically, the hardware instruction translator 104 determines whether the conditional ALU instruction 124 updates the architectural condition flags 902, performs a pre-shift on a source operand, uses the carry flag as an input to the ALU operation, and whether the ALU operation is a carry-updating or non-carry-updating operation, which as discussed in more detail below denotes whether the ALU operation updates only a subset of the architectural condition flags 902 or all of the architectural condition flags 902. Flow begins at block 1002.

At block 1002, the hardware instruction translator 104 encounters a conditional ALU instruction 124, decodes it, and translates it into the appropriate sequence of microinstructions 126 such as those described with respect to blocks 1024, 1026, 1034, 1036, 1044, 1054 and 1056. A conditional ALU instruction 124 is an ISA instruction 124 that instructs the microprocessor 100 to perform an arithmetic or logical operation (ALU operation) on one or more source operands to generate a result and to write the result to a destination register. Some types of the ALU operation specified by the conditional ALU instruction 124 use the architectural carry flag 902 as input (e.g., add with carry), although most do not. The conditional ALU instruction 124 also specifies a condition with respect to the architectural condition flags 902 of the ISA. If the architectural condition flags 902 satisfy the condition specified, the microprocessor 100 performs the conditional ALU instruction 124, i.e., performs the ALU operation and writes the result to the destination register. Otherwise, the microprocessor 100 treats the conditional ALU instruction 124 as a no-op instruction; more specifically, the microprocessor 100 does not change the value in the destination register. Additionally, the conditional ALU instruction 124 may specify that the architectural condition flags 902 are to be updated based on the result of the ALU operation, or the conditional ALU instruction 124 may specify that the architectural condition flags 902 are not to be updated. However, even if the conditional ALU instruction 124 specifies that the architectural condition flags 902 are to be updated, if the architectural condition flags 902 do not satisfy the condition specified, then the microprocessor 100 does not change the value in the architectural condition flags 902. Finally, the conditional ALU instruction 124 may additionally specify that one of the source operands of the ALU operation be pre-shifted, as described in more detail herein, such as with respect to block 1012. In one embodiment, the set of conditional ALU instructions 124 translated by the hardware instruction translator 104 are ARM ISA instructions. More specifically, in one embodiment, the ARM ISA Data-processing instructions and multiply instructions are translated by the hardware instruction translator 104 as described with respect to FIG. 10. In one embodiment, these include, but are not limited to, the AND, EOR, SUB, RSB, ADD, ADC, SBC, RSC, TST, TEQ, CMP, CMN, ORR, ORN, MOV, LSL, LSR, ASR, RRX, ROR, BIC, MVN, MUL, MLA, and MLS instructions. In each of blocks 1024, 1026, 1034, 1036, 1044, 1054 and 1056, for illustration purposes, the relevant type of ARM ISA conditional ALU instruction 124 is shown on the first line, and the microinstructions 126 into which the hardware instruction translator 104 translates the conditional ALU instruction 124 are shown on the following lines. The "CC" suffix indicates that the instruction 124 is a conditional instruction. Additionally, type of ALU operation is shown and illustrative examples of source and destination operands specified. The programmer may specify a destination register that happens to be the same as a register that provides one of the source operands; in this situation, the hardware instruction translator 104 is configured to take advantage of this situation and optimize the sequence of microinstructions 126 into which it translates the conditional ALU instruction 124, which is described with respect to FIG. 21. Flow proceeds to decision block 1004.

At decision block 1004, the hardware instruction translator 104 determines whether the conditional ALU instruction 124 specifies that the architectural condition flags 902 are to be updated by the conditional ALU instruction 124. That is, in some situations the programmer may choose a version of the conditional ALU instruction 124 that updates the architectural condition flags 902 based on the result of the ALU operation, and in other situations the programmer may choose a version of the conditional ALU instruction 124 that does not update the architectural condition flags 902 regardless of the result of the ALU operation. In the ARM ISA assembly language, an "S" suffix to the instruction mnemonic indicates the architectural condition flags 902 are to be updated, and this convention is followed in FIG. 10 et seq. For example, block 1044 denotes the ARM ISA conditional ALU instruction 124 as "ALUOP S" to indicate the architectural condition flags 902 are to be updated, whereas block 1024 denotes the ARM ISA conditional ALU instruction 124 as simply "ALUOP" (i.e., with the "S") to indicate the architectural condition flags 902 are not to be updated. If the conditional ALU instruction 124 specifies that the architectural condition flags 902 are to be updated, flow proceeds to decision block 1042; otherwise, flow proceeds to decision block 1012.

At decision block 1012, the hardware instruction translator 104 determines whether the conditional ALU instruction 124 is of the type that specifies a pre-shift of one of the ALU operation operands. The pre-shift may be of an immediate field to generate a constant source operand, or the pre-shift may be of a source operand supplied from a register. The pre-shift amount may be specified as a constant in the conditional ALU instruction 124. Additionally, in the case of a register-shifted operand, the pre-shift amount may be specified as a value in a register. In the case of the ARM ISA, a pre-shift of an immediate value by an immediate shift amount to generate a constant source operand is referred to as a modified immediate constant. The pre-shift operation generates a carry flag value. For some types of ALU operations the architectural carry flag 902 is updated with the carry flag value generated by the shift operation, whereas for some types of ALU operations the architectural carry flag 902 is updated with the carry flag value generated by the ALU operation. However, the carry flag value generated by the pre-shift is not used to determine whether the condition specified by the conditional ALU instruction 124 is satisfied; rather, the current architectural carry flag 902 value is used. It is noted that, for example, the ARM ISA MUL, ASR, LSL, LSR, ROR, and RRX instructions cannot specify a pre-shift operation and are therefore processed as described with respect to blocks 1024, 1026 or 1044. Additionally, the versions of the MOV and MVN instructions that specify a modified immediate constant operand may specify a pre-shift operation, whereas the versions of the MOV and MVN instructions that do not specify a modified immediate constant operand, i.e., that specify a register operand, may not specify a pre-shift operation and are therefore processed as described with respect to blocks 1024, 1026 or 1044. As mentioned above, the pre-shift may be of an immediate field to generate a constant source operand, or the pre-shift may be of a source operand supplied from a register. If the conditional ALU instruction 124 specifies a pre-shift, flow proceeds to decision block 1032; otherwise, flow proceeds to decision block 1022.

At decision block 1022, the hardware instruction translator 104 determines whether the conditional ALU instruction 124 specifies an ALU operation that uses the carry flag. Examples of ARM ISA instructions 124 that use the carry flag are the add with carry (ADC), reverse subtract with carry (RSC), and subtract with carry (SBC) instructions as well as instructions that specify a shifted register operand in which the shift operation uses the carry flag, namely the RRX shift type. If the conditional ALU instruction 124 specifies an ALU operation that uses the carry flag, flow proceeds to block 1026; otherwise, flow proceeds to block 1024.

At block 1024, the hardware instruction translator 104 translates the non-flag-updating, non-pre-shifting, non-carry-using conditional ALU instruction 124 into first and second microinstructions 126, namely: (1) an ALU operation microinstruction 126 (denoted ALUOP); and (2) a conditional move microinstruction 126 (denoted XMOV). In the example of block 1024, the conditional ALU instruction 124 specifies a first source register (R1) and a second source register (R2), an ALU operation (denoted ALUOP) to be performed on R1 and R2 to generate a result, and a destination register (RD) to which the result is conditionally written. The ALUOP microinstruction 126 specifies the same ALU operation and source operands specified by the conditional ALU instruction 124. The ALUOP microinstruction 126 performs the ALU operation on the two source operands and writes the result to a temporary register (denoted T2). The XMOV microinstruction 126 specifies the same condition specified by the conditional ALU instruction 124. The XMOV microinstruction 126 receives the value of the temporary register written by the ALUOP microinstruction 126 and receives the old, or current, value of the destination register (RD). The XMOV microinstruction 126 receives the condition flags 924 and determines whether they satisfy the condition. If the condition is satisfied, the XMOV microinstruction 126 writes the temporary register value to the destination register (RD), and otherwise writes the old destination register value back to the destination register. It is noted that although two source register operands are specified in the example, one of the source operands may be a constant operand specified in an immediate field of the conditional ALU instruction 124 rather than provided from a register. The execution of the microinstructions 126 is described in more detail with respect to FIG. 20. Use of the term "old" in FIG. 10 et seq. to refer to the flag or destination register values, unless otherwise indicated, refers to the values received by the execution unit 424 when it executes the microinstruction 126. These values may also be referred to as the current values. In the case of the destination register, the old, or current, value is received from either the forwarding result bus 128 of FIG. 1, the ROB 422, or the architectural register file 106. In the case of the flags, as described with respect to FIG. 9, the old, or current, value is received from either the forwarding flag bus 928, the ROB 422, or the architectural condition flags register 926. Flow ends at block 1024.

At block 1026, the hardware instruction translator 104 translates the non-flag-updating, non-pre-shifting, carry-using conditional ALU instruction 124 into first and second microinstructions 126, namely: (1) a carry-using ALU operation microinstruction 126 (denoted ALUOPUC); and (2) a conditional move microinstruction 126 (denoted XMOV). In the example of block 1026, the conditional ALU instruction 124 is similar to that of block 1024, except that the ALU operation it specifies uses the carry flag. The two microinstructions 126 are similar to those described with respect to block 1024; however, the ALUOPUC microinstruction 126 also receives the condition flags 924 in order to obtain the current value of the carry flag for use in the carry-using ALU operation. The execution of the microinstructions 126 is described in more detail with respect to FIG. 19. Flow ends at block 1026.

At decision block 1032, the hardware instruction translator 104 determines whether the conditional ALU instruction 124 specifies an ALU operation that uses the carry flag. If the ALU operation uses the carry flag, flow proceeds to block 1036; otherwise, flow proceeds to block 1034.

At block 1034, the hardware instruction translator 104 translates the non-flag-updating, pre-shifting, non-carry-using conditional ALU instruction 124 into first, second and third microinstructions 126, namely: (1) a shift microinstruction 126 (denoted SHF); (2) an ALU operation microinstruction 126; and (3) a conditional move microinstruction 126. In the example of block 1034, the conditional ALU instruction 124 is similar to that described with respect to block 1024; however, the conditional ALU instruction 124 also specifies a pre-shift operation on the second source operand (R2) by a shift amount which, in the example of block 1034, is held in a third source register (R3) specified by the conditional ALU instruction 124. However, if the conditional ALU instruction 124 is of the type that specifies the shift amount as a constant within the instruction 124, then the third source register is not used. The list of possible pre-shift operations the conditional ALU instruction 124 may specify include, but are not limited to, a logical shift left (LSL), logical shift right (LSR), arithmetic shift right (ASR), rotate right (ROR), and rotate right with extend (RRX). In one embodiment, the hardware instruction translator 104 emits a shift microinstruction 126 to ensure that the carry value is generated according to the semantics of the ARM ISA, particularly as described in the ARM Architecture Reference Manual with respect to the individual ARM instruction descriptions and at pages A8-10 through A8-12, and A5-10 through A5-11, for example. The shift microinstruction 126 specifies the same pre-shift operation specified by the conditional ALU instruction 124. The shift microinstruction 126 also specifies the same R2 and R3 source operands specified by the conditional ALU instruction 124. The shift microinstruction 126 performs the pre-shift operation by the shift amount on the second source operand R2 and writes the result to a temporary register (denoted T3). Although in the case of block 1034 the carry flag value generated by the shift microinstruction 126 is not used since the conditional ALU instruction 124 specifies that the architectural condition flags 902 are not updated, in the case of block 1056, for example, the carry flag value generated by the shift microinstruction 126 is used as discussed in more detail below. Furthermore, the pre-shift operation may require the old carry flag to be rotated into the resulting shifted value; for example, the RRX pre-shift operation shifts the carry flag into the most significant bit of the result. In such situations, although not shown in FIG. 10 (except in block 1056), the shift microinstruction 126 will also read the condition flags 924 to get the current carry flag value. The ALUOP microinstruction 126 is similar to that described with respect to block 1024; however, it receives the value of T3 rather than R2 and performs the ALU operation on R1 and T3 to generate the result written to T2. The XMOV microinstruction 126 is similar to that described with respect to block 1024. The execution of the microinstructions 126 is described in more detail with respect to FIG. 18. Flow ends at block 1034.

At block 1036, the hardware instruction translator 104 translates the non-flag-updating, pre-shifting, carry-using conditional ALU instruction 124 into first, second and third microinstructions 126, namely: (1) a shift microinstruction 126; (2) a carry-using ALU operation microinstruction 126; and (3) a conditional move microinstruction 126. In the example of block 1036, the conditional ALU instruction 124 is similar to that of block 1034, except that the ALU operation it specifies uses the carry flag. The three microinstructions 126 are similar to those described with respect to block 1034; however, the ALUOPUC microinstruction 126 also receives the condition flags 924 in order to obtain the current value of the carry flag for use in the carry-using ALU operation. The execution of the microinstructions 126 is described in more detail with respect to FIG. 17. Flow ends at block 1036.

At decision block 1042, the hardware instruction translator 104 determines whether the conditional ALU instruction 124 is of the type that specifies a pre-shift of one of the ALU operation operands. If the conditional ALU instruction 124 specifies a pre-shift, flow proceeds to decision block 1052; otherwise, flow proceeds to block 1044.

At block 1044, the hardware instruction translator 104 translates the flag-updating, non-pre-shifting conditional ALU instruction 124 into first and second microinstructions 126, namely: (1) a conditional ALU operation microinstruction 126 (denoted ALUOP CC); and (2) a conditional move microinstruction 126 (denoted CMOV). In the example of block 1044, the conditional ALU instruction 124 is similar to the conditional ALU instruction 124 of block 1024 except that it updates the architectural condition flags 902. The conditional ALU microinstruction 126 specifies the same condition and source operands specified by the conditional ALU instruction 124. The conditional ALU operation microinstruction 126 performs the ALU operation on the two source operands, and writes the result to a temporary register (denoted T2). Additionally, the conditional ALU operation microinstruction 126 receives the architectural condition flags 902 and determines whether they satisfy the condition. Furthermore, the conditional ALU operation microinstruction 126 writes the condition flags register 926. More specifically, the conditional ALU operation microinstruction 126 writes the SAT bit 904 to indicate whether the architectural condition flags 902 satisfy the condition. Furthermore, if the condition was not satisfied, the conditional ALU operation microinstruction 126 writes the old condition flag values to the architectural condition flags 902; whereas, if the condition was satisfied, the conditional ALU operation microinstruction 126 updates the architectural condition flags 902 based on the result of the ALU operation. The update values of the architectural condition flags 902 are dependent upon the type of ALU operation. That is, for some types of ALU operations, all of the architectural condition flags 902 are updated with new values based on the result of the ALU operation; whereas, for some types of ALU operations, some of the architectural condition flags 902 (in one embodiment the Z and N flags) are updated with new values based on the result of the ALU operation, but the old values are retained for others of the architectural condition flags 902 (in one embodiment the V and C flags). The updating of the architectural condition flags 902 is described in more detail with respect to FIG. 14. The CMOV microinstruction 126 receives the value of the temporary register (T2) written by the ALUOP microinstruction 126 and receives the old, or current, value of the destination register (RD). The CMOV microinstruction 126 receives the condition flags 924 and examines the SAT bit 904 to determine whether the conditional ALU operation microinstruction 126 indicated that the architectural condition flags 902 satisfy the condition. If the condition is satisfied, the CMOV microinstruction 126 writes the temporary register value to the destination register, and otherwise writes the old destination register value back to the destination register. The execution of the microinstructions 126 is described in more detail with respect to FIG. 14. It is noted that the ALU operation performed by the conditional ALU operation microinstruction 126 generated at block 1044 (and at blocks 1054 and 1056) may be an ALU operation that uses the carry flag (similar to those described with respect to blocks 1026 and 1036), and since the microinstruction 126 reads the flags (as indicated by the RDFLAGS indicator) the execution unit 424 has the carry flag to perform the carry-using ALU operation. Flow ends at block 1044.

At decision block 1052, the hardware instruction translator 104 determines whether the conditional ALU instruction 124 specifies an ALU operation that is of the type that updates the architectural carry flag 902. It is necessary for the hardware instruction translator 104 to make this distinction because the carry flag value generated by the pre-shift must be used to update the architectural carry flag 902, rather than the carry flag value generated based on the ALU operation, if the ALU operation does not update the architectural carry flag 902. In one embodiment, the ARM ISA instructions 124 that specify an ALU operation that does not update the architectural carry flag 902, and which may specify a pre-shift operation, include, but are not limited to, AND, BIC, EOR, ORN, ORR, TEQ and TST, as well as MOV/MVN instructions 124 that specify a modified immediate constant with a non-zero rotation value. If the ALU operation updates the architectural carry flag 902, flow proceeds to block 1054; otherwise, flow proceeds to block 1056.

At block 1054, the hardware instruction translator 104 translates the flag-updating, pre-shifting, carry-updating conditional ALU instruction 124 into first, second and third microinstructions 126, namely: (1) a shift microinstruction 126; (2) a conditional carry-updating ALU operation microinstruction 126 (denoted CUALUOP CC); and (3) a conditional move microinstruction 126. In the example of block 1054, the conditional ALU instruction 124 is similar to that described with respect to block 1034; however, the conditional ALU instruction 124 also specifies that the architectural condition flags 902 are to be updated. The shift microinstruction 126 is similar to that described with respect to block 1034. The conditional carry-updating ALU operation microinstruction 126 specifies the same condition specified by the conditional ALU instruction 124. The conditional carry-updating ALU operation microinstruction 126 performs the ALU operation on R1 and T3 and writes the result to a temporary register (denoted T2). Additionally, the conditional carry-updating ALU operation microinstruction 126 receives the architectural condition flags 902 and determines whether they satisfy the condition. Furthermore, the conditional carry-updating ALU operation microinstruction 126 writes the condition flags register 926. More specifically, the conditional carry-updating ALU operation microinstruction 126 writes the SAT bit 904 to indicate whether the architectural condition flags 902 satisfy the condition. Furthermore, if the condition was not satisfied, the conditional carry-updating ALU operation microinstruction 126 writes the old condition flag values to the architectural condition flags 902; whereas, if the condition was satisfied, the conditional carry-updating ALU operation microinstruction 126 updates the architectural condition flags 902 based on the result of the ALU operation. The updating of the architectural condition flags 902 is described in more detail with respect to FIG. 16. The CMOV microinstruction 126 is similar to that described with respect to block 1044. Flow ends at block 1054.

At block 1056, the hardware instruction translator 104 translates the flag-updating, pre-shifting, non-carry-updating conditional ALU instruction 124 into first, second and third microinstructions 126, namely: (1) a shift microinstruction 126; (2) a conditional non-carry-updating ALU operation microinstruction 126 (denoted NCUALUOP CC); and (3) a conditional move microinstruction 126. In the example of block 1056, the conditional ALU instruction 124 is similar to that described with respect to block 1054; however, the conditional ALU instruction 124 specifies a non-carry-updating ALU operation. Consequently, the architectural carry flag 902 is updated with the pre-shift carry flag value if the condition is satisfied. The shift microinstruction 126 is similar to that described with respect to block 1034; however, the shift microinstruction 126 reads and writes the condition flags register 926. More specifically, the shift microinstruction 126: (1) writes the carry flag value generated by the pre-shift operation to the PSC bit 906; (2) sets the USE bit 908 to instruct the conditional non-carry-updating ALU operation microinstruction 126 to use the PSC 906 to update the architectural carry flag 902; and (3) writes the old architectural condition flags 902 back to the condition flags register 926, so that the conditional non-carry-updating ALU operation microinstruction 126 can evaluate the old value of the architectural condition flags 902 to determine whether they satisfy the condition. The conditional non-carry-updating ALU operation microinstruction 126 specifies the same condition specified by the conditional ALU instruction 124. The conditional non-carry-updating ALU operation microinstruction 126 performs the ALU operation on R1 and T3 and writes the result to a temporary register (denoted T2). Additionally, the conditional non-carry-updating ALU operation microinstruction 126 receives the architectural condition flags 902 and determines whether they satisfy the condition. Furthermore, the conditional non-carry-updating ALU operation microinstruction 126 writes the condition flags register 926. More specifically, the conditional non-carry-updating ALU operation microinstruction 126 writes the SAT bit 904 to indicate whether the architectural condition flags 902 satisfy the condition. Furthermore, if the condition was not satisfied, the conditional non-carry-updating ALU operation microinstruction 126 writes the old condition flag values to the architectural condition flags 902; whereas, if the condition was satisfied, the conditional non-carry-updating ALU operation microinstruction 126 updates the architectural condition flags 902 based on the result of the ALU operation. More specifically, the architectural overflow (V) flag 902 is written with the old overflow flag value 924. Additionally, the architectural carry flag 902 is updated with the pre-shift carry flag value in the PSC bit 906 if the USE bit 908 so indicates, and otherwise is updated with the old carry flag value 924. The updating of the architectural condition flags 902 is described in more detail with respect to FIG. 15. The CMOV microinstruction 126 is similar to that described with respect to block 1044. In an alternate embodiment, as described above and below, the USE bit 908 does not exist and instead the hardware instruction translator 104 translator directly generates a functional equivalent of the USE bit 908 as an indicator within the NCUALUOP microinstruction 126, which the execution unit 424 examines to determine whether to update the architectural carry flag 902 with the pre-shift carry flag value in the PSC bit 906 or with the old carry flag value 924. Flow ends at block 1056.

Embodiments are contemplated in which the hardware instruction translator 104 is configured to generate and provide a modified immediate constant rather than emitting a shift microinstruction 126 to do so In this embodiment, processing is similar to that described with respect to blocks 1024, 1026 and 1044, rather than blocks 1034, 1036 and 1054/1056, respectively. Furthermore, in this embodiment, the hardware instruction translator 104 also generates and provides the carry flag value from the pre-shift for use by the conditional ALU operation microinstruction 126 in updating the architectural carry flag 902.

Figure 11:
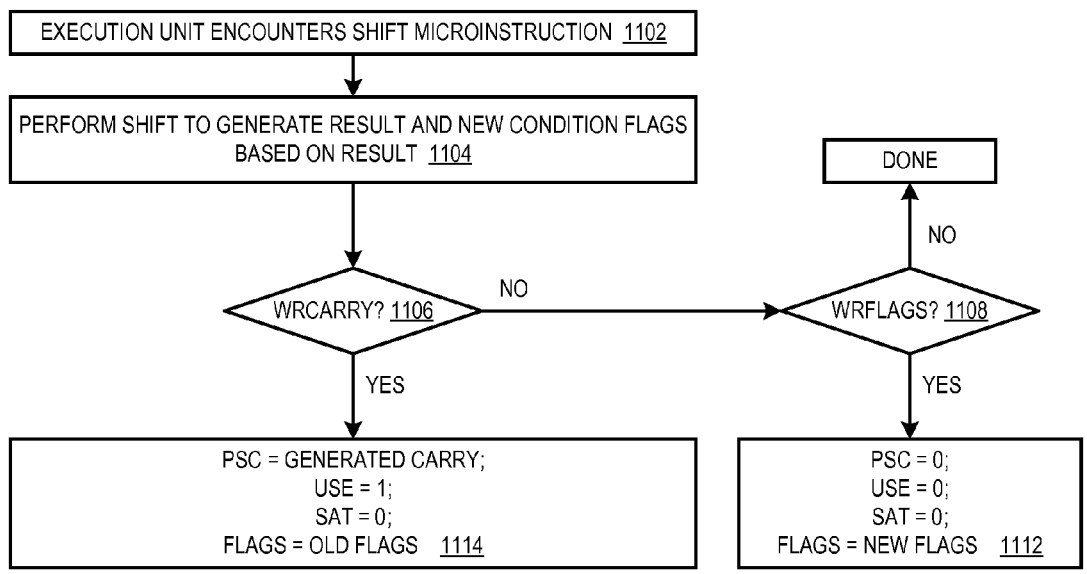
FIG. 11 is a flowchart illustrating operation of the execution units of FIG. 4 to execute a shift microinstruction.

Referring now to FIG. 11, a flowchart illustrating operation of the execution units 424 of FIG. 4 to execute a shift microinstruction 126 according to the present invention is shown. Flow begins at block 1102.

At block 1102, one of the execution units 424 of FIG. 4 receives a shift microinstruction 126, such as those described with respect to FIG. 10 that were generated by the hardware instruction translator 104 in response to encountering a conditional ALU instruction 124. The execution unit 424 also receives the source operands specified by the microinstruction 126, including the condition flag values 924, which may or may not be used by the microinstruction 126. Flow proceeds to block 1104.

At block 1104, the execution unit 424 performs the shift operation specified by the shift microinstruction 126 on the operands specified by the shift microinstruction 126 to generate a result and outputs the result on the result bus 128. In one embodiment, the shift operation may include, but is not limited to, a logical shift left (LSL), logical shift right (LSR), arithmetic shift right (ASR), rotate right (ROR), and rotate right with extend (RRX). Additionally, the execution unit 424 generates new condition flag values based on the result of the shift operation. More specifically, the execution unit 424 generates a carry flag value based on the result of the shift operation. In one embodiment: in the case of an LSL shift operation, the carry flag value is bit N of an extended value that is M least significant bit zeroes concatenated with the operand being left-shifted, where N is the number of bits in the original operand and M is the specified positive shift amount; in the case of an LSR shift operation, the carry flag value is bit (M−1) of an extended value that is the original operand zero-extended by (M+N) bits, where M is the specified positive shift amount and N is the number of bits in the original operand; in the case of an ASR shift operation, the carry flag value is bit (M−1) of an extended value that is the original operand sign-extended by (M+N) bits, where M is the specified positive shift amount and N is the number of bits in the original operand; in the case of a ROR shift operation, the carry flag value is bit (N−1) of the result of the operand being rotated right by the specified non-zero shift amount mod N, where N is the number of bits in the original operand; and in the case of a RRX shift operation, the carry flag value is bit zero of the original operand. Flow proceeds to decision block 1106.

At decision block 1106, the execution unit 424 determines whether the shift microinstruction 126 emitted by the hardware instruction translator 104 indicates that the execution unit 424 should write the carry flag, as indicated by WRCARRY in block 1056 of FIG. 10, for example. More specifically, the shift microinstruction 126 indicates whether the PSC bit 906 on the flag bus output 928 should be written with the carry flag value generated by the shift operation and the USE bit 908 should be set, which will enable the subsequent conditional non-carry-updating ALU operation microinstruction 126 to conditionally write the PSC bit 906 value to the architectural carry flag 902. If the execution unit 424 should write the carry flag, flow proceeds to block 1114; otherwise, flow proceeds to decision block 1108.

At decision block 1108, the execution unit 424 determines whether the shift microinstruction 126 emitted by the hardware instruction translator 104 indicates that the execution unit 424 should write the condition flags (denoted WRFLAGS). Although none of the shift microinstructions 126 of FIG. 10 indicate the execution unit 424 should write the condition flags when the shift microinstruction 126 does not indicate it should write the PSC bit 906 (denoted WRCARRY), the hardware instruction translator 104 might generate such a shift microinstruction 126 when translating other ISA instructions 124. If the execution unit 424 should write the condition flags, flow proceeds to block 1112; otherwise, flow ends.

At block 1112, the execution unit 424 outputs values on the flag bus 928 to clear the PSC 906, USE 908, and SAT 904 bits to zero, and write the architectural condition flags 902 with the new architectural condition flags 902 value generated at block 1104. Flow ends at block 1114.

At block 1114, the execution unit 424 outputs values on the flag bus 928 to write the PSC bit 906 with the carry flag value generated at block 1112, set the USE bit 908 to one, clear the SAT bit 904 to zero, and write the architectural condition flags 902 with the old architectural condition flags 902 value received at block 1102. Flow ends at block 1114.

Figure 12:
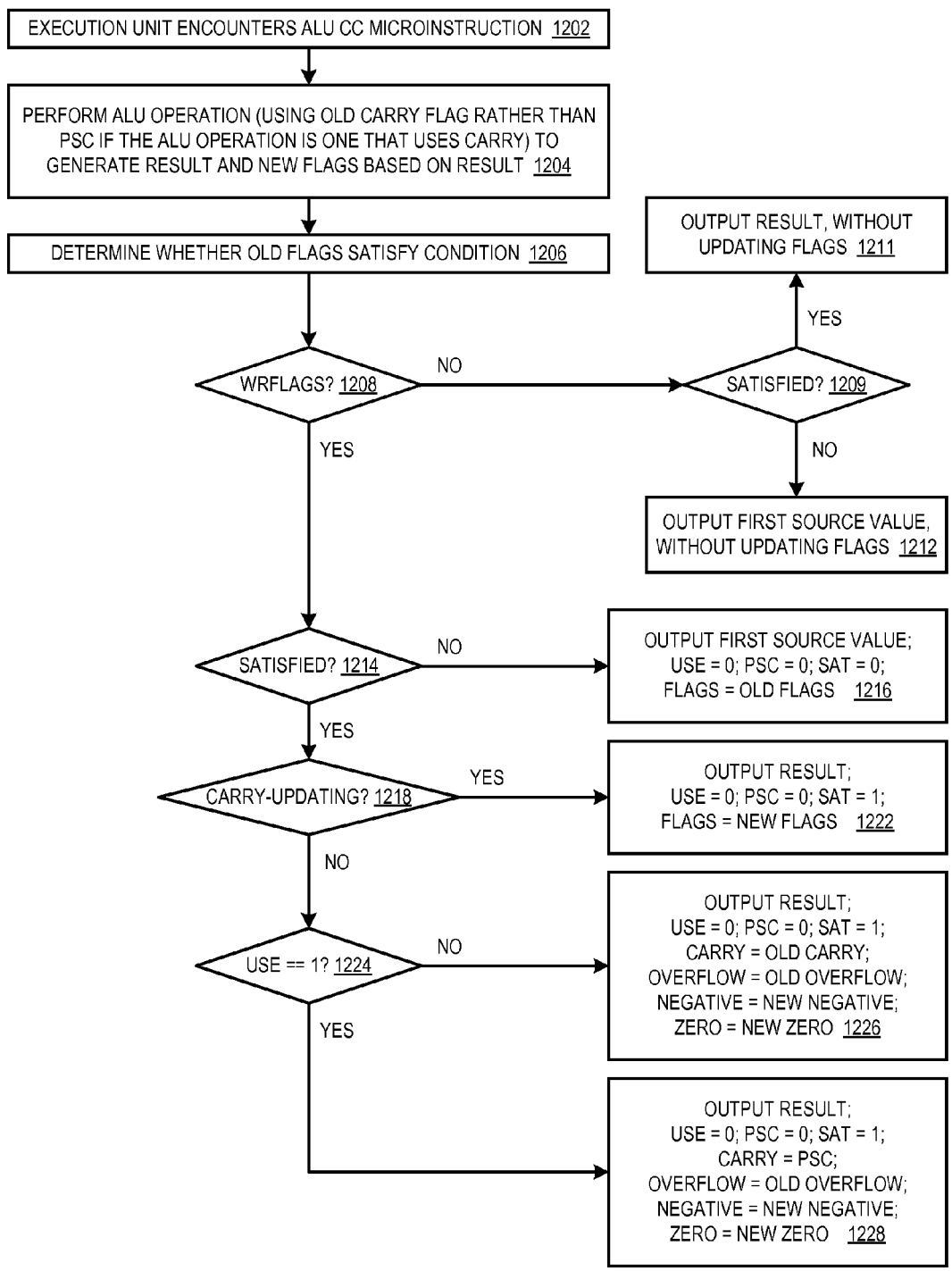
FIG. 12 is a flowchart illustrating operation of the execution units of FIG. 4 to execute a conditional ALU microinstruction.

Referring now to FIG. 12, a flowchart illustrating operation of the execution units 424 of FIG. 4 to execute a conditional ALU microinstruction 126 according to the present invention is shown. Flow begins at block 1202.

At block 1202, one of the execution units 424 of FIG. 4 receives a conditional ALU microinstruction 126, such as those described with respect to FIG. 10 that were generated by the hardware instruction translator 104 in response to encountering a conditional ALU instruction 124. The execution unit 424 also receives the source operands specified by the microinstruction 126, including the condition flag values 924, which may or may not be used by the microinstruction 126. It should be understood that the execution units 424 also execute unconditional ALU microinstructions 126, such as those described with respect to FIG. 10 that were generated by the hardware instruction translator 104 in response to encountering a conditional ALU instruction 124, according to a process similar to that described with respect to FIG. 12, excluding the actions performed at blocks 1209, 1212, 1214 and 1216. Furthermore, the execution unit 424 that executes the conditional ALU microinstruction 126 can be the same as or different from the execution unit 424 that executes the associated shift microinstruction 126 and/or XMOV/CMOV microinstruction 126. Flow proceeds to decision block 1204.

At block 1204, the execution unit 424 performs the ALU operation specified by the conditional ALU microinstruction 126 on the operands specified by the conditional ALU microinstruction 126 to generate a result and outputs the result on the result bus 128. Additionally, the execution unit 424 generates new architectural condition flag 902 values based on the result of the ALU operation. If the ALU operation is one that uses the carry flag, the execution unit 424 uses the old value of the received architectural carry flag 924 rather than the new carry flag value generated by the ALU operation. Flow proceeds to block 1206.

At block 1206, the execution unit 424 determines whether the architectural condition flags 924 received at block 1202 satisfy the specified condition. The determination is subsequently used at blocks 1212 and 1214. Flow proceeds to decision block 1208.

At decision block 1208, the execution unit 424 determines whether the conditional ALU microinstruction 126 instructs the execution unit 424 to write the condition flags register 926, as indicated by WRFLAGS in various blocks of FIG. 10, for example. If so, flow proceeds to decision block 1214; otherwise, flow proceeds to decision block 1209.

At decision block 1209, if it was determined at block 1206 that the condition was satisfied, flow proceeds to block 1211; otherwise, flow proceeds to block 1212.

At block 1211, the execution unit 424 outputs on the result bus 128 the result generated at block 1204, since the condition was satisfied. However, the conditional ALU microinstruction 126 does not update the condition flags register 926 since the conditional ALU microinstruction 126 specified to not update the architectural condition flags 902. As described above, the result and condition flag values output on the result bus 128/928 by the execution units 424 are forwarded to the other execution units 424 of the execution pipeline 112 and are also written to the ROB 422 entry associated with the conditional ALU microinstruction 126. It should be understood that even though the microinstruction 126 specified to not update the architectural condition flags 902, the execution unit 424 still outputs some value onto the flag result bus 928 that is written to the ROB 422 entry associated with the conditional ALU microinstruction 126, but which will not be retired to the destination register 106 and/or condition flags register 926. That is, the determination as to whether the values written to the ROB 422 entry are ultimately retired to is made by the retire unit of the execution pipeline 112 based on the type of microinstruction 126, the occurrence of exception, branch misprediction, or other invalidating event, rather than by the execution unit 424 itself. Flow ends at block 1211.

At block 1212, the execution unit 424 outputs on the result bus 128 the first source operand. It is noted that when the condition is not satisfied, the first source operand output is not used in the case of the various conditional ALU microinstructions 126 described with respect to FIG. 10, for example. More specifically, the XMOV and CMOV microinstructions 126 of FIG. 10 will write back the old destination register value rather than the T2 register value. However, as described more with respect to FIG. 21 et seq., in translating other forms of conditional ALU instructions 124, namely same-source-destination conditional ALU instructions 124 (or other ISA instructions 124), the hardware instruction translator 104 may advantageously generate conditional ALU microinstruction 126 in which the first source operand is the destination register specified by the ISA instruction 124 such that the original destination register value is written back if the condition is not satisfied. As described at block 1211, the conditional ALU microinstruction 126 does not update the condition flags register 926 since the conditional ALU microinstruction 126 specified to not update the architectural condition flags 902. Flow ends at block 1212.

At decision block 1214, if it was determined at block 1206 that the condition was satisfied, flow proceeds to decision block 1218; otherwise, flow proceeds to block 1216.

At block 1216, the execution unit 424 outputs the first source operand, clears the USE 908, PSC 906, and SAT 904 bits to zero, and outputs the old architectural condition flags 924 value received at block 1202 onto the flag bus 928, which advantageously aids in collectively performing the conditional ALU instruction 124 as a no-op instruction (i.e., to not perform the conditional ALU instruction 124) by not modifying the value of the architectural condition flags 902. Flow ends at block 1216.

At decision block 1218, the execution unit 424 determines whether the conditional ALU microinstruction 126 specifies a carry-updating ALU operation. In one embodiment, the execution unit 424 decodes the opcode of the conditional ALU microinstruction 126 to make this determination. In an alternate embodiment, the hardware instruction translator 104 determines whether the ALU operation is carry-updating at block 1052 of FIG. 10 and provides an indicator of such to the execution unit 424. In one embodiment, the non-carry-updating ALU operations include, but are not limited to, those specified by the AND, BIC, EOR, ORN, ORR, TEQ, TST, MUL, MOV, MVN, ASR, LSL, LSR, ROR, and RRX ARM ISA instructions 124. If the ALU operation is carry-updating, flow proceeds to block 1222; otherwise, flow proceeds to decision block 1224.

At block 1222, the execution unit 424 outputs the result generated at block 1204, clears the USE 908 and PSC 906 bits to zero, sets the SAT bit 904 to one, and outputs the new architectural condition flags value generated at block 1204 onto the flag bus 928. It is noted that conditional ALU microinstructions 126 that do not update the overflow flag and that specify a carry-updating ALU operation, such as the ASR, LSL, LSR, ROR, and RRX operations, are processed slightly differently than described with respect to block 1222. In particular, the execution unit 424 outputs the old V flag value rather than the new V flag value. Flow ends at block 1222.

At decision block 1224, the execution unit 424 examines the USE bit 908. If the USE bit 908 is set to one, flow proceeds to block 1228; otherwise, flow proceeds to block 1226. In an alternate embodiment, as described above and below, the USE bit 908 does not exist and instead the execution unit 424 examines the indicator within the conditional ALU microinstruction 126 to determine whether to update the architectural carry flag 902 with the pre-shift carry flag value in the PSC bit 906 or with the old carry flag value 924.

At block 1226, the execution unit 424 outputs the result generated at block 1204, clears the USE 908 and PSC 906 bits to zero, sets the SAT bit 904 to one, and outputs the architectural condition flags onto the flag bus 928 as follows: the C flag and V flag are written with the old C flag and V flag values, respectively, received at block 1202; the N flag and Z flag are written with the new N flag and Z flag values, respectively, generated at block 1204. Flow ends at block 1226.

At block 1228, the execution unit 424 outputs the result generated at block 1204, clears the USE 908 and PSC 906 bits to zero, sets the SAT bit 904 to one, and outputs the architectural condition flags onto the flag bus 928 as follows: the C flag is written with the PSC bit 906 value received at block 1202; the V flag is written with the old V flag value received at block 1202; the N flag and Z flag are written with the new N flag and Z flag values, respectively, generated at block 1204. Flow ends at block 1228.

In one embodiment, the execution unit 424 executes the conditional ALU microinstruction 126 differently with respect to the values output on the flag bus 928 depending upon whether the instruction mode indicator 132 indicates x86 or ARM. More specifically, if the instruction mode indicator 132 indicates x86, the execution unit 424 does not make a distinction between whether the ALU operation type is carry-updating or non-carry-updating, does not consider the USE bit 908, and updates the condition code flags in accordance with x86 semantics.

Figure 13:
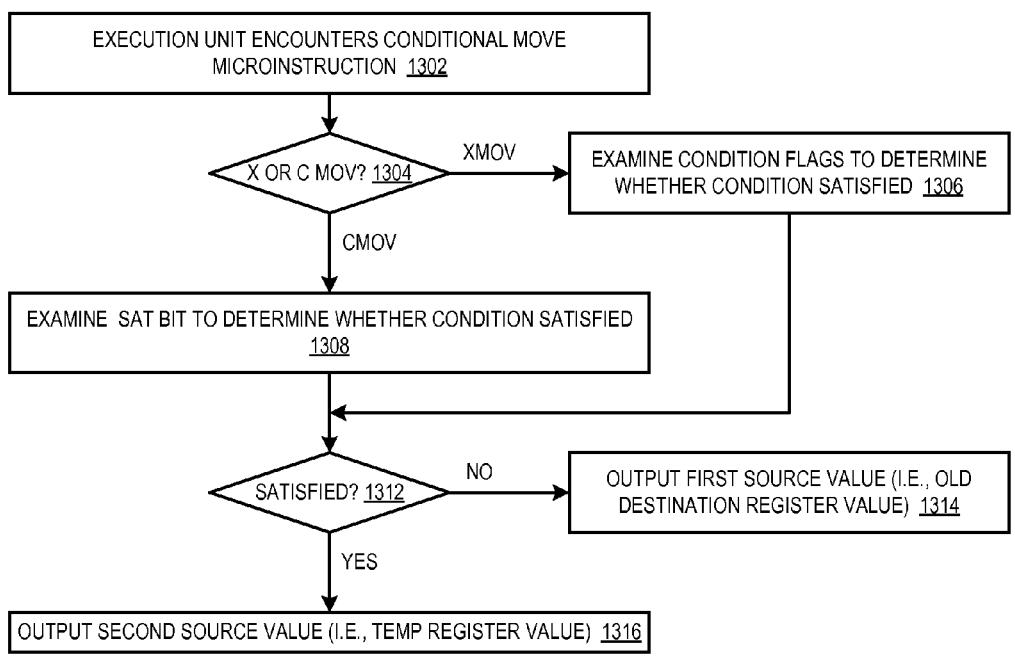
FIG. 13 is a flowchart illustrating operation of the execution units of FIG. 4 to execute a conditional move microinstruction.

Referring now to FIG. 13, a flowchart illustrating operation of the execution units 424 of FIG. 4 to execute a conditional move microinstruction 126 according to the present invention is shown. Flow begins at block 1302.

At block 1302, one of the execution units 424 of FIG. 4 receives a conditional move microinstruction 126, such as those described with respect to FIG. 10 that were generated by the hardware instruction translator 104 in response to encountering a conditional ALU instruction 124, denoted CMOV or XMOV. The execution unit 424 also receives the source operands specified by the microinstruction 126, including the condition flag values 924, which may or may not be used by the microinstruction 126. Flow proceeds to decision block 1304.

At decision block 1304, the execution unit 424 decodes the microinstruction 126 to determine whether it is an XMOV microinstruction 126 or a CMOV microinstruction 126. If CMOV 126, flow proceeds to block 1308; otherwise, flow proceeds to block 1306.

At block 1306, the execution unit 424 examines the architectural condition flags 902 received at block 1302 and determines whether the condition is satisfied. Flow proceeds to block 1312.

At block 1308, the execution unit 424 examines the SAT bit 904 received at block 1302 and determines from it whether the condition is satisfied, as previously determined by a corresponding conditional ALU microinstruction 126 that wrote the SAT bit 904, such as those described in blocks 1044, 1054, and 1056 of FIG. 10. Flow proceeds to decision block 1312.

At decision block 1312, if the condition determined at the appropriate block 1306 or 1308 was satisfied, flow proceeds to block 1316; otherwise, flow proceeds to block 1314.

At block 1314, the execution unit 424 outputs on the result bus 128 the first source operand value. In the context of FIG. 10, the first source operand value is the old destination register value, which advantageously aids in collectively performing the conditional ALU instruction 124 as a no-op instruction (i.e., to not perform the conditional ALU instruction 124) by not modifying the value of the destination register since the specified condition was not satisfied. Flow ends at block 1314.

At block 1316, the execution unit 424 outputs on the result bus 128 the second source operand value. In the context of FIG. 10, the second source operand value is the temporary register value written by the associated conditional ALU microinstruction 126, which advantageously aids in collectively performing the conditional ALU instruction 124 by writing the result to the destination register since the specified condition was satisfied. Flow ends at block 1316.

Figure 14:
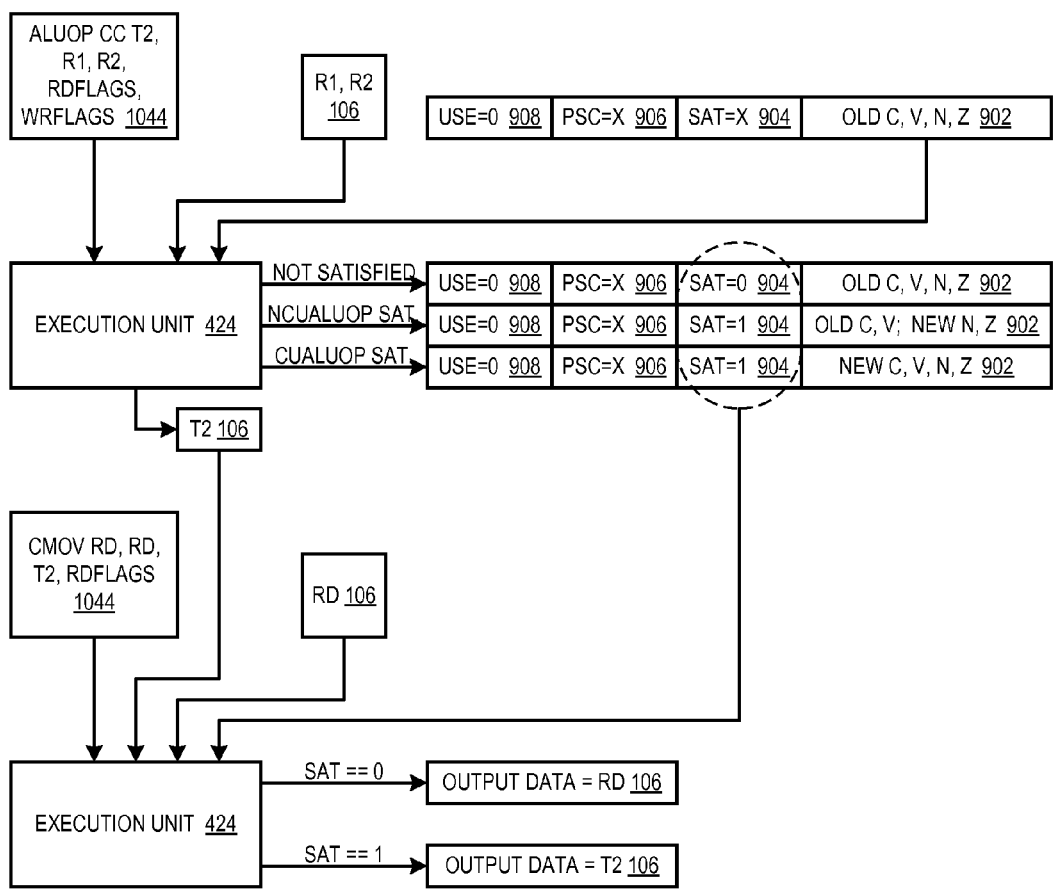
FIGS. 14 through 20 are block diagrams illustrating operation of the execution pipeline 112 of FIG. 1 to execute a conditional ALU instruction of various types translated according to FIG. 10.

Referring now to FIG. 14, a block diagram illustrating operation of the execution pipeline 112 of FIG. 1 to execute a conditional ALU instruction 124 according to the present invention is shown. More specifically, the conditional ALU instruction 124 is a flag-updating, non-pre-shifting, conditional ALU operation ISA instruction 124 which the hardware instruction translator 104 translates into the microinstructions 126 of block 1044 of FIG. 10. The RAT 402 of FIG. 4 generates dependencies for the CMOV microinstruction 126 on the T2 register and condition flags register 926 values written by the conditional ALUOP microinstruction 126, among others. The instruction dispatcher 404 dispatches the microinstructions 126 to the appropriate reservation stations 406 of FIG. 4. The instruction issue unit 408 determines that a microinstruction 126 is ready to be issued from its reservation station 406 to the corresponding execution unit 424 for execution when all of the source operand values are available to the microinstruction 126 (either from the forwarding bus 128, the ROB 422, or the register file 106). The microinstructions 126 are executed according to the description of FIGS. 12 and 13.

The execution unit 424 receives the conditional ALUOP microinstruction 126 of block 1044 from the reservation station 406, the source operand values from registers R1 and R2 of the register file 106 of FIG. 1, and the condition flags 924 from the condition flags register 926 of FIG. 9 (or from the forwarding bus 128 and/or ROB 422) according to block 1202 of FIG. 12. The execution unit 424 performs the ALU operation on R1 and R2 (and the received C flag 902 if the ALU operation is a carry-using operation) to generate a result to be written to temporary register T2 according to block 1204. Additionally: (1) if the architectural condition flags 902 do not satisfy the specified condition (denoted NOT SATISFIED in FIG. 14), the execution unit 424 generates the new condition flags 928 values according to block 1216 of FIG. 12 for writing to the condition flags register 926; (2) if the architectural condition flags 902 satisfy the specified condition and the ALU operation is non-carry-updating (denoted NCUALUOP SAT. in FIG. 14), the execution unit 424 generates the new condition flags 928 values according to block 1226 of FIG. 12 for writing to the condition flags register 926; and (3) if the architectural condition flags 902 satisfy the specified condition and the ALU operation is carry-updating (denoted CUALUOP SAT. in FIG. 14), the execution unit 424 generates the new condition flags 928 values according to block 1222 of FIG. 12 for writing to the condition flags register 926. The T2 value and condition flags 928 are provided on forwarding bus 128 for consumption by the CMOV microinstruction 126, are written to the ROB 422 entry for consumption by the CMOV microinstruction 126 if not from the forwarding bus 128, and are eventually retired to their appropriate architectural state, barring the occurrence of an exception, branch misprediction, or other invalidating event, for consumption by the CMOV microinstruction 126 if not from the forwarding bus 128 or ROB 422 entry. In particular, the mux 922 of FIG. 9 operates to select the appropriate source of the condition flags 924 for the execution unit 424.

The execution unit 424 receives the CMOV microinstruction 126 of block 1044, the source operand values T2 and RD, and the condition flags 924 according to block 1302 of FIG. 13. The execution unit 424 outputs as its result the value of the T2 source operand if the SAT bit 904 is set and outputs the value of the RD source operand if the SAT bit 904 is clear, according to blocks 1316 and 1314, respectively, of FIG. 13. The result value is provided on forwarding bus 128 for consumption by subsequent microinstructions 126, is written to the ROB 422 entry, and is eventually retired to its appropriate architectural state barring the occurrence of an exception, branch misprediction, or other invalidating event.

As discussed above with respect to block 1222, flag-updating conditional ALU instructions 124 that specify a carry-updating ALU operation that does not update the overflow flag, such as the ARM ISA ASR, LSL, LSR, ROR, and RRX instructions 124, are processed slightly differently than shown in FIG. 14. In particular, the execution unit 424 outputs the old V flag value rather than the new V flag value. Finally, as mentioned above, flag-updating ARM ISA MUL, and MOV/MVN (register) instructions 124 are non-carry-updating and cannot specify a pre-shift operation and are therefore processed as described with respect to block 1044, and more specifically as described with respect to block 1226 of FIG. 12.

As may be observed from the above, advantageously, the ALU operation microinstruction 126 indicates to the CMOV microinstruction 126 via the SAT bit 904 whether the old condition flags 902 satisfy the specified condition, which enables the ALU operation microinstruction 126 to clobber the old value of the condition flags 902, if the condition is satisfied, with the appropriate values generated based on the result of the ALU operation.

Figure 15:
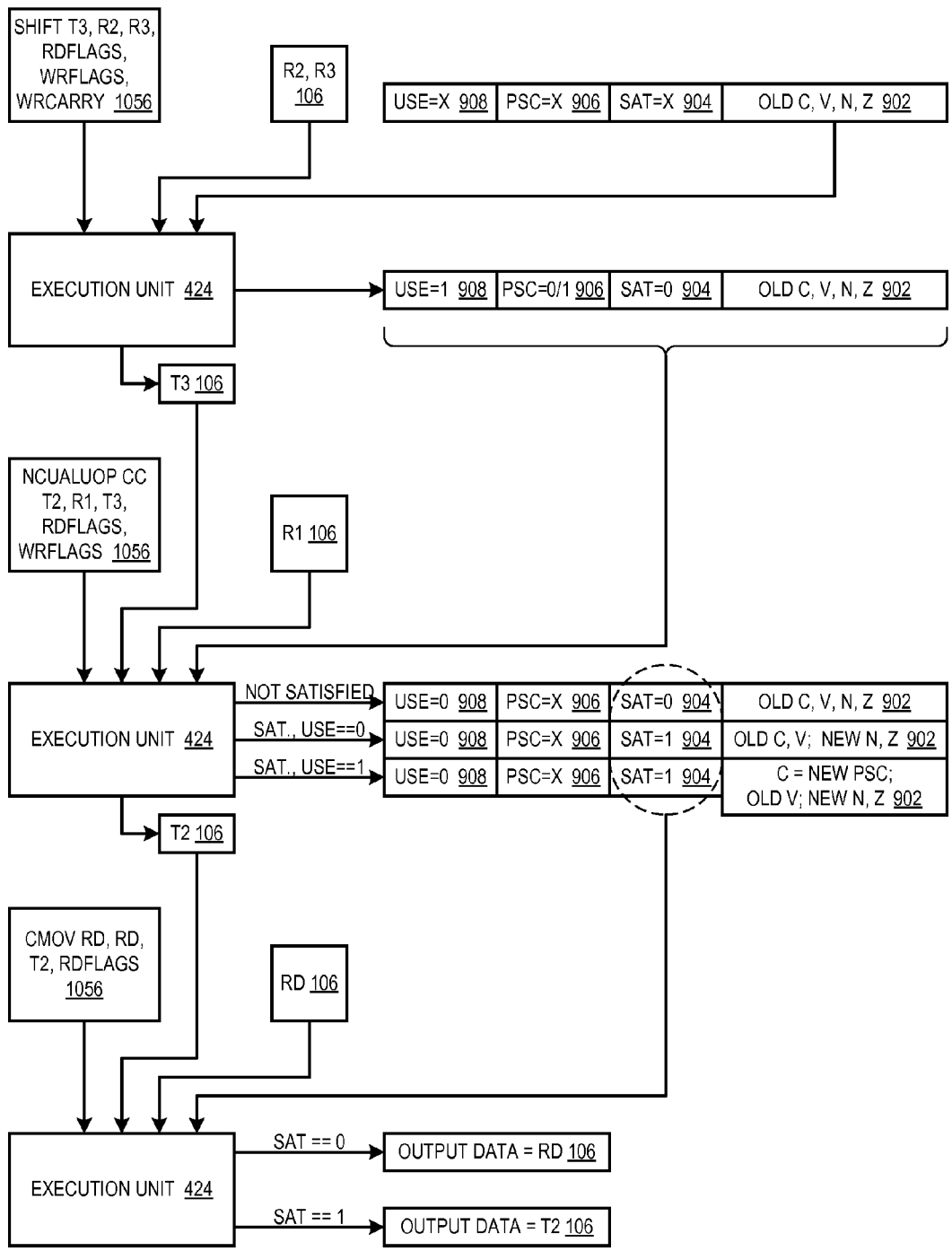

Referring now to FIG. 15, a block diagram illustrating operation of the execution pipeline 112 of FIG. 1 to execute a conditional ALU instruction 124 according to the present invention is shown. More specifically, the conditional ALU instruction 124 is a flag-updating, pre-shifting, non-carry-updating conditional ALU operation ISA instruction 124 which the hardware instruction translator 104 translates into the microinstructions 126 of block 1056 of FIG. 10. The operation according to FIG. 15 is similar in many respects to the operation described with respect to FIG. 14 such that like operations are not repeated for the sake of brevity and differences are now described. The RAT 402 of FIG. 4 generates dependencies for the NCUALUOP microinstruction 126 on the T3 register and condition flags register 926 values written by the shift microinstruction 126, among others. The microinstructions 126 are executed according to the description of FIGS. 11, 12 and 13.

The execution unit 424 receives the shift microinstruction 126 of block 1056 from the reservation station 406, the source operand values from registers R2 and R3 of the register file 106, and the condition flags 924 from the condition flags register 926 (or from the forwarding bus 128 and/or ROB 422) according to block 1102 of FIG. 11. The execution unit 424 performs the shift operation on R2 and R3 (and the received C flag 902 if the ALU operation is a carry-using operation) to generate a result to be written to temporary register T3 according to block 1104. Additionally, the execution unit 424 generates the new architectural condition flags 902 values according to block 1104 and writes the new condition flags 928 according to block 1114 of FIG. 11 for writing to the condition flags register 926. The T3 value and condition flags 928 are provided on forwarding bus 128 for consumption by the NCUALUOP microinstruction 126, are written to the ROB 422 entry for consumption by the NCUALUOP microinstruction 126 if not from the forwarding bus 128, and are eventually retired to their appropriate architectural state, barring the occurrence of an exception, branch misprediction, or other invalidating event, for consumption by the NCUALUOP microinstruction 126 if not from the forwarding bus 128 or ROB 422 entry. In particular, the mux 922 of FIG. 9 operates to select the appropriate source of the condition flags 924 for the execution unit 424.

The execution unit 424 receives the NCUALUOP microinstruction 126 of block 1056 from the reservation station 406, the source operand values from registers R1 and T3 of the register file 106, and the condition flags 924 from the condition flags register 926 according to block 1202. The execution unit 424 performs the ALU operation on R1 and T3 (and the received C flag 902 if the ALU operation is a carry-using operation) to generate a result to be written to temporary register T2 according to block 1204. Additionally: (1) if the architectural condition flags 902 do not satisfy the specified condition (denoted NOT SATISFIED in FIG. 15), the execution unit 424 generates the new condition flags 928 values according to block 1216 for writing to the condition flags register 926; (2) if the architectural condition flags 902 satisfy the specified condition and the USE bit 908 is clear (denoted SAT., USE-0 in FIG. 15), the execution unit 424 generates the new condition flags 928 values according to block 1226 of FIG. 12 for writing to the condition flags register 926; and (3) if the architectural condition flags 902 satisfy the specified condition and the USE bit 908 is set (denoted SAT., USE-1 in FIG. 15), the execution unit 424 generates the new condition flags 928 values according to block 1228 of FIG. 12 for writing to the condition flags register 926. The execution of the CMOV microinstruction 126 of FIG. 15 is similar to that described with respect to FIG. 14. In an alternate embodiment, as described above, the USE bit 908 does not exist and instead the execution unit 424 examines the indicator within the conditional ALU microinstruction 126 to determine whether to update the architectural carry flag 902 with the pre-shift carry flag value in the PSC bit 906 or with the old carry flag value 924.

As may be observed from the above, advantageously, the shift microinstruction 126 does not clobber the old value of the condition flags 902, but instead writes the old value of the condition flags 902 back to the condition flags register 926 so that the conditional ALU operation microinstruction 126 that receives the condition flags register 926 result from the shift microinstruction 126 can determine whether the old condition flags 902 satisfied the condition specified by the ISA conditional ALU instruction 124. Stated alternatively, if the shift microinstruction 126 had clobbered the old carry flag 902 with the newly generated carry flag value, then the conditional ALU operation microinstruction 126 would not have been able to determine whether the old condition flags 902 satisfied the specified condition.

Figure 16:
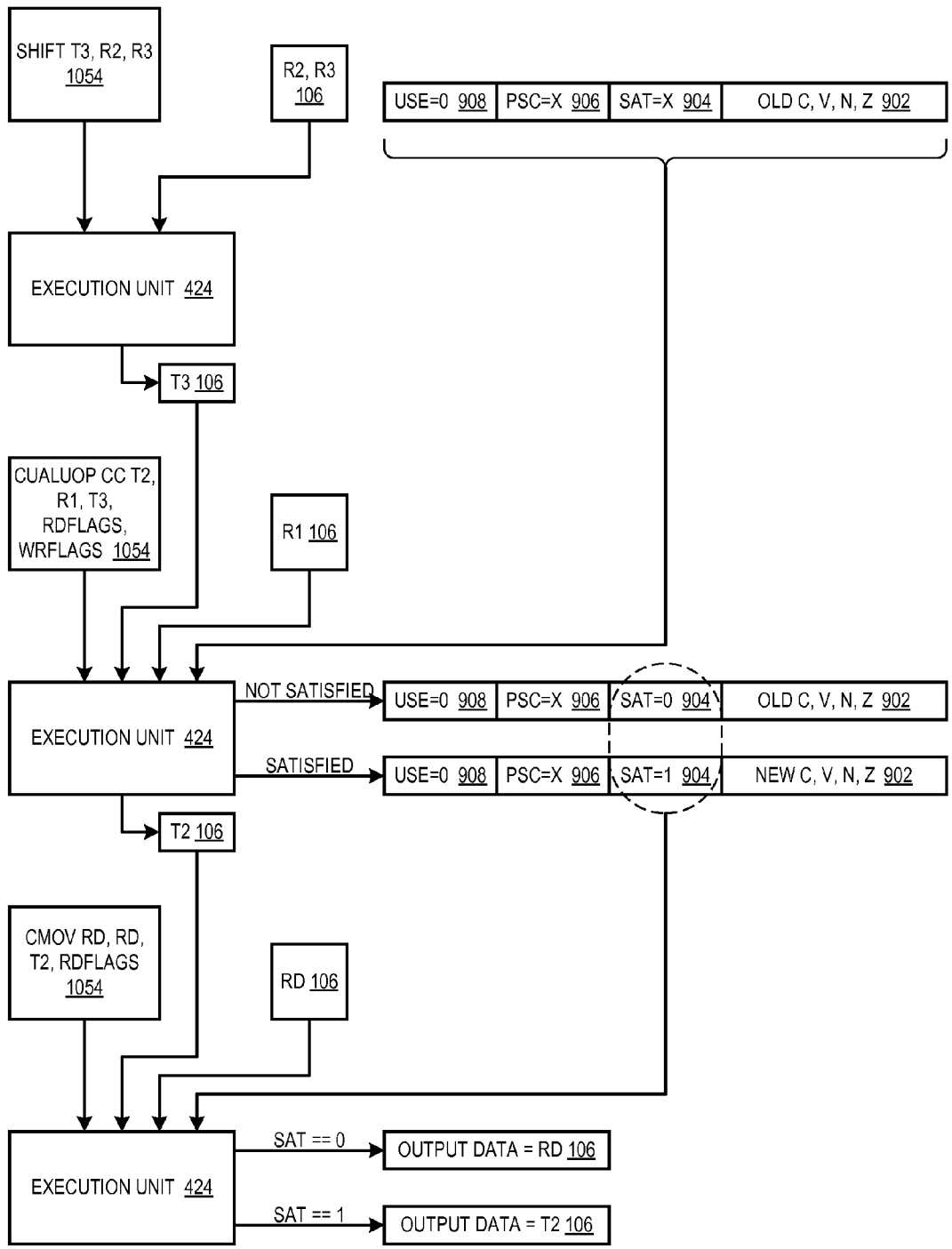

Referring now to FIG. 16, a block diagram illustrating operation of the execution pipeline 112 of FIG. 1 to execute a conditional ALU instruction 124 according to the present invention is shown. More specifically, the conditional ALU instruction 124 is a flag-updating, pre-shifting, carry-updating conditional ALU operation ISA instruction 124 which the hardware instruction translator 104 translates into the microinstructions 126 of block 1054 of FIG. 10. The operation according to FIG. 16 is similar in many respects to the operation described with respect to FIG. 15 such that like operations are not repeated for the sake of brevity and differences are now described. The RAT 402 of FIG. 4 generates dependencies for the CUALUOP microinstruction 126 on the T3 register value written by the shift microinstruction 126, among others, but since the shift microinstruction 126 does not write the condition flags register 926, the RAT 402 does not generate a dependency upon it.

The execution unit 424 receives the shift microinstruction 126 of block 1054 from the reservation station 406 and the source operand values from registers R2 and R3 of the register file 106 according to block 1102, but not the condition flags 924 (unless the ALU operation is a carry-using operation). The execution unit 424 performs the shift operation on R2 and R3 (and the received C flag 902 if the ALU operation is a carry-using operation) to generate a result to be written to temporary register T3 according to block 1104. The T3 value is provided on forwarding bus 128 for consumption by the CUALUOP microinstruction 126, is written to the ROB 422 entry for consumption by the CUALUOP microinstruction 126 if not from the forwarding bus 128, and is eventually retired to its appropriate architectural state, barring the occurrence of an exception, branch misprediction, or other invalidating event, for consumption by the CUALUOP microinstruction 126 if not from the forwarding bus 128 or ROB 422 entry.

The execution unit 424 receives the CUALUOP microinstruction 126 of block 1054 from the reservation station 406, the source operand values from registers R1 and T3 of the register file 106, and the condition flags 924 from the condition flags register 926 according to block 1202. The execution unit 424 performs the ALU operation on R1 and T3 (and the received C flag 902 if the ALU operation is a carry-using operation) to generate a result to be written to temporary register T2 according to block 1204. Additionally: (1) if the architectural condition flags 902 do not satisfy the specified condition (denoted NOT SATISFIED in FIG. 16), the execution unit 424 generates the new condition flags 928 values according to block 1216 for writing to the condition flags register 926; and (2) if the architectural condition flags 902 satisfy the specified condition (denoted SATISFIED in FIG. 16), the execution unit 424 generates the new condition flags 928 values according to block 1222 of FIG. 12 for writing to the condition flags register 926. The execution of the CMOV microinstruction 126 of FIG. 16 is similar to that described with respect to FIG. 14.

Figure 17:
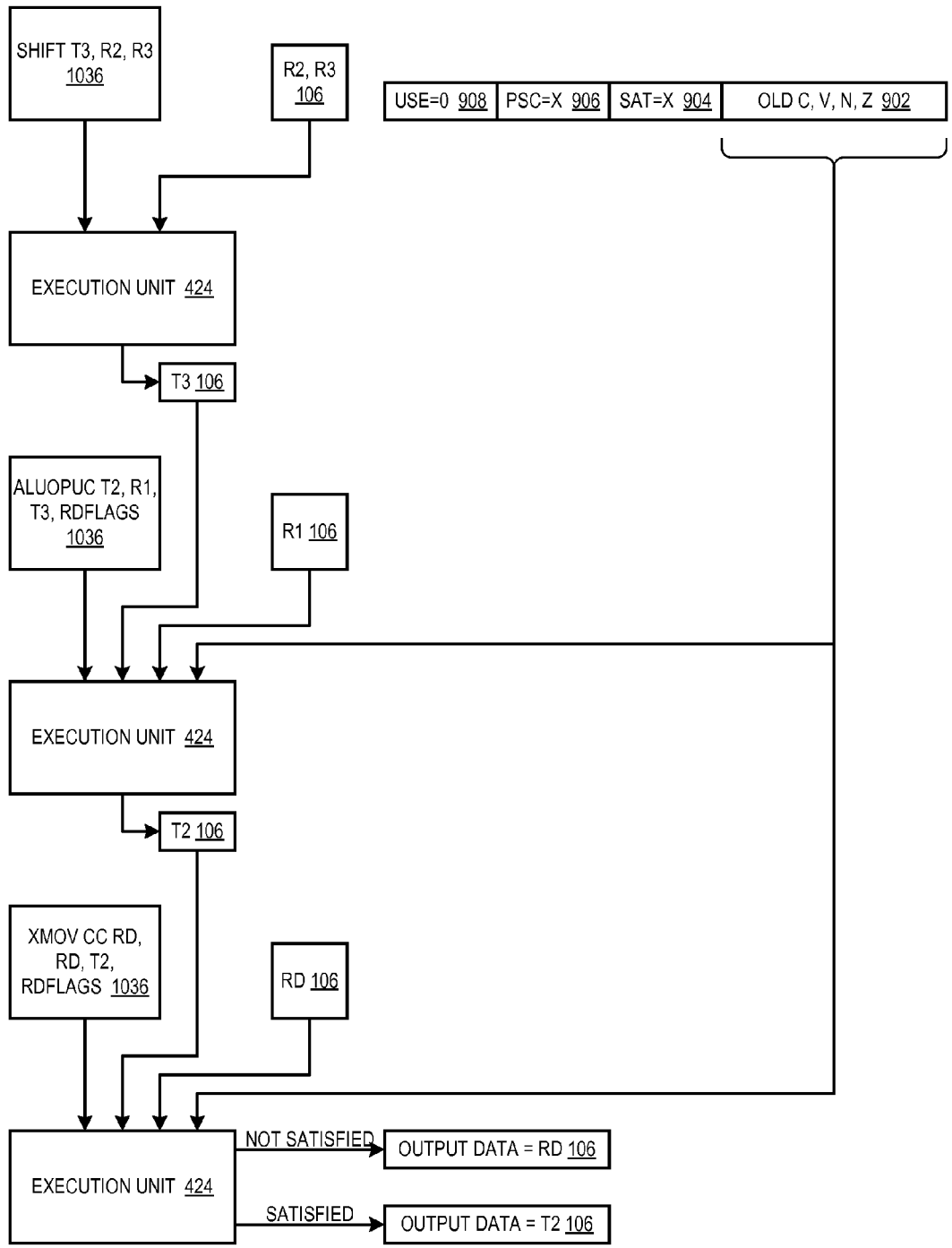

Referring now to FIG. 17, a block diagram illustrating operation of the execution pipeline 112 of FIG. 1 to execute a conditional ALU instruction 124 according to the present invention is shown. More specifically, the conditional ALU instruction 124 is a non-flag-updating, pre-shifting, carry-using conditional ALU operation ISA instruction 124 which the hardware instruction translator 104 translates into the microinstructions 126 of block 1036 of FIG. 10. The operation according to FIG. 17 is similar in many respects to the operation described with respect to FIG. 16 such that like operations are not repeated for the sake of brevity and differences are now described. The execution of the shift microinstruction 126 of FIG. 17 is similar to that described with respect to FIG. 16.

The execution unit 424 receives the ALUOPUC microinstruction 126 of block 1036 from the reservation station 406, the source operand values from registers R1 and T3 of the register file 106, and the condition flags 924 from the condition flags register 926 according to block 1202. The execution unit 424 performs the ALU operation on R1 and T3 and the received C flag 902, since the ALU operation is a carry-using operation, to generate a result to be written to temporary register T2 according to block 1204. The execution unit 424 does not write to the condition flags register 926.

The execution unit 424 receives the XMOV microinstruction 126 of block 1036, the source operand values T2 and RD, and the condition flags 924 according to block 1302 of FIG. 13. The execution unit 424 outputs as its result the value of the T2 source operand if the condition flags 924 satisfy the specified condition and outputs the value of the RD source operand if the condition flags 924 do not satisfy the specified condition, according to blocks 1316 and 1314, respectively, of FIG. 13. The result value is provided on forwarding bus 128 for consumption by subsequent microinstructions 126, is written to the ROB 422 entry, and is eventually retired to its appropriate architectural state barring the occurrence of an exception, branch misprediction, or other invalidating event.

Figure 18:
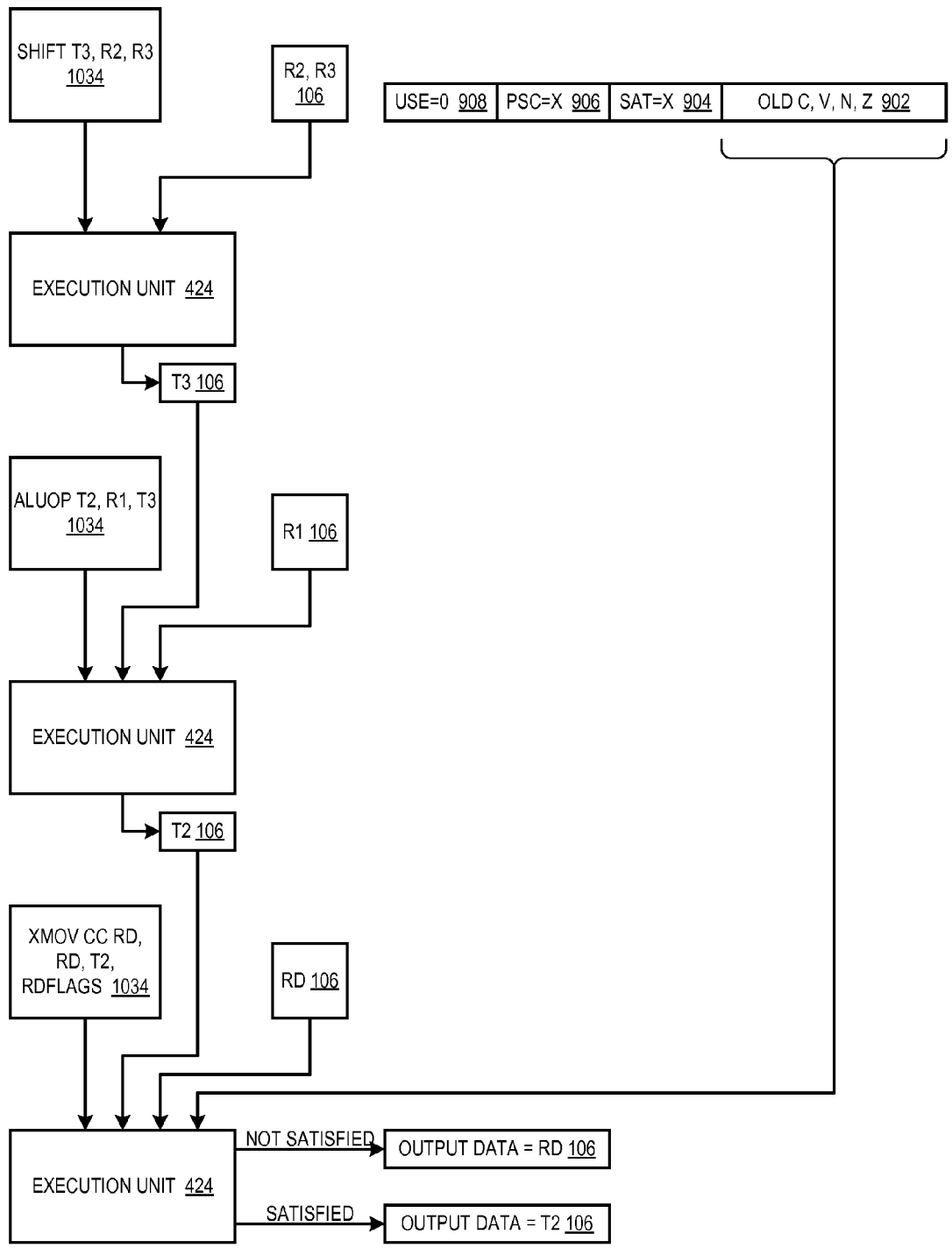

Referring now to FIG. 18, a block diagram illustrating operation of the execution pipeline 112 of FIG. 1 to execute a conditional ALU instruction 124 according to the present invention is shown. More specifically, the conditional ALU instruction 124 is a non-flag-updating, pre-shifting, non-carry-using conditional ALU operation ISA instruction 124 which the hardware instruction translator 104 translates into the microinstructions 126 of block 1034 of FIG. 10. The operation according to FIG. 18 is similar in many respects to the operation described with respect to FIG. 17 such that like operations are not repeated for the sake of brevity and differences are now described. The execution of the shift microinstruction 126 of FIG. 18 is similar to that described with respect to FIG. 16. The execution of the ALUOP microinstruction 126 of FIG. 18 is similar to the execution of the ALUOPUC microinstruction 126 of FIG. 17 except that the ALUOP microinstruction 126 of FIG. 18 does not use the C flag 902 to generate its result. The execution of the XMOV microinstruction 126 of FIG. 18 is similar to the execution of the XMOV microinstruction 126 of FIG. 17.

Figure 19:
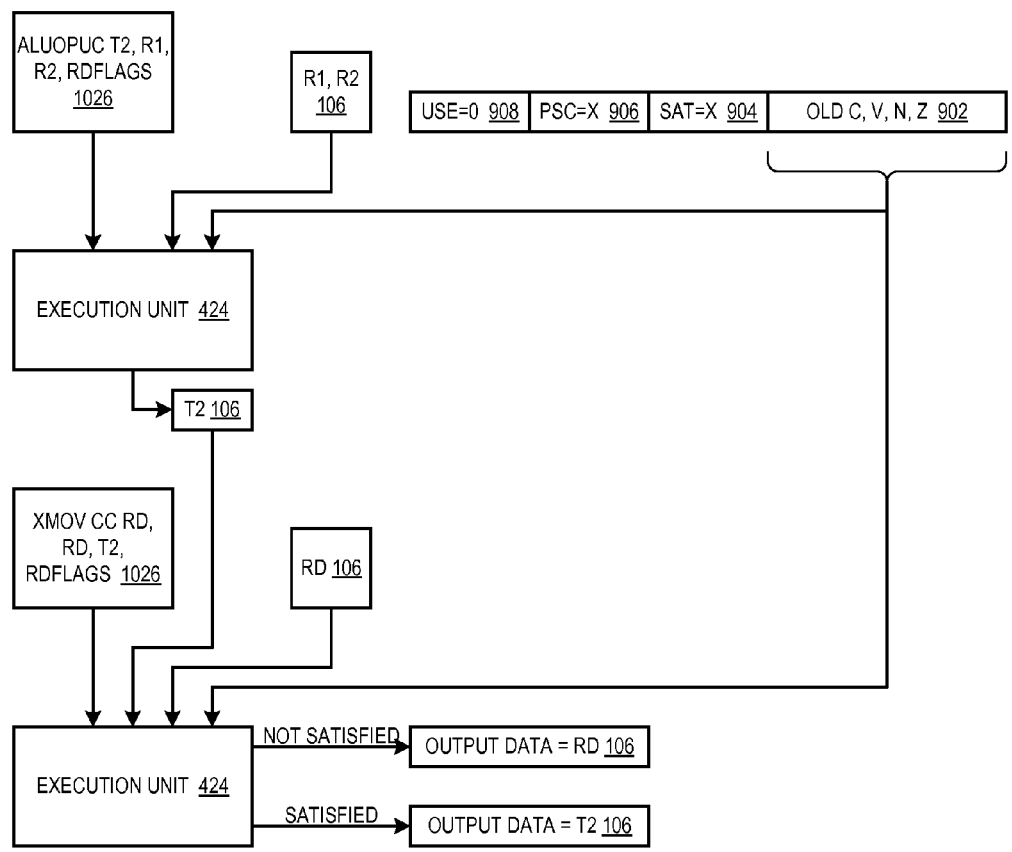

Referring now to FIG. 19, a block diagram illustrating operation of the execution pipeline 112 of FIG. 1 to execute a conditional ALU instruction 124 according to the present invention is shown. More specifically, the conditional ALU instruction 124 is a non-flag-updating, non-pre-shifting, carry-using conditional ALU operation ISA instruction 124 which the hardware instruction translator 104 translates into the microinstructions 126 of block 1026 of FIG. 10. The operation according to FIG. 19 is similar in many respects to the operation described with respect to FIG. 17 such that like operations are not repeated for the sake of brevity and differences are now described. The translation of the conditional ALU instruction 124 is a non-flag-updating, non-pre-shifting, carry-using conditional ALU operation ISA instruction 124 does not include a shift microinstruction 126.

The execution unit 424 receives the ALUOPUC microinstruction 126 of block 1026 from the reservation station 406, the source operand values from registers R1 and R2 of the register file 106, and the condition flags 924 from the condition flags register 926 according to block 1202. The execution unit 424 performs the ALU operation on R1 and R2 and the received C flag 902, since the ALU operation is a carry-using operation, to generate a result to be written to temporary register T2 according to block 1204. The execution unit 424 does not write to the condition flags register 926. The execution of the XMOV microinstruction 126 of FIG. 19 is similar to the execution of the XMOV microinstruction 126 of FIG. 17.

Figure 20:
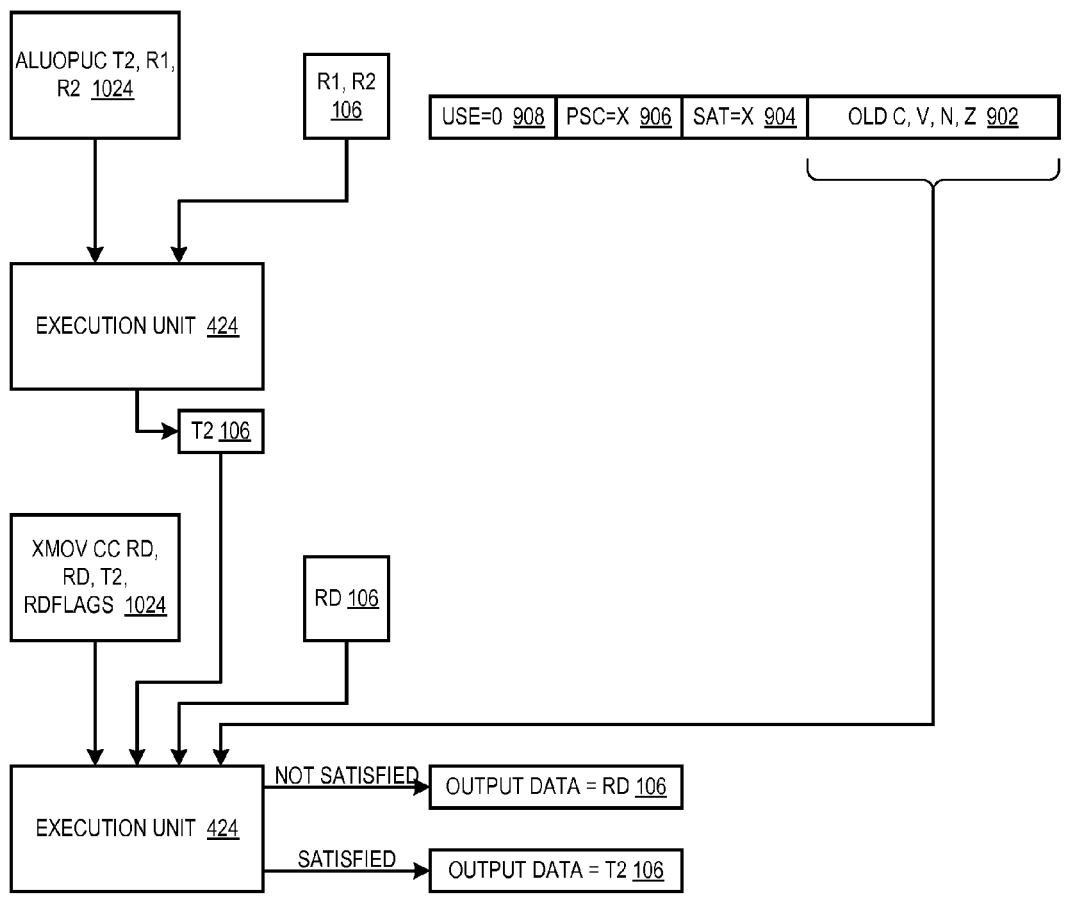

Referring now to FIG. 20, a block diagram illustrating operation of the execution pipeline 112 of FIG. 1 to execute a conditional ALU instruction 124 according to the present invention is shown. More specifically, the conditional ALU instruction 124 is a non-flag-updating, non-pre-shifting, non-carry-using conditional ALU operation ISA instruction 124 which the hardware instruction translator 104 translates into the microinstructions 126 of block 1024 of FIG. 10. The operation according to FIG. 20 is similar in many respects to the operation described with respect to FIG. 19 such that like operations are not repeated for the sake of brevity and differences are now described. The execution of the ALUOP microinstruction 126 of FIG. 20 is similar to the execution of the ALUOPUC microinstruction 126 of FIG. 19 except that the ALUOP microinstruction 126 of FIG. 20 does not use the C flag 902 to generate its result. The execution of the XMOV microinstruction 126 of FIG. 20 is similar to the execution of the XMOV microinstruction 126 of FIG. 17.

As may be observed from the foregoing, embodiments described herein potentially avoid disadvantages of allowing microinstructions 126 to specify an additional source operand, which may include the following. First, it may require an additional read port on the general purpose register file for each execution unit 424 that would execute microinstructions 126 with an additional source operand. Second, it may require an additional read port on the ROB 422 for each execution unit 424 that would execute microinstructions 126 with an additional source operand. Third, it may require more wires for the forwarding buses 128 for each execution unit 424 that would execute microinstructions 126 with an additional source operand. Fourth, it may require an additional relatively large multiplexer for each execution unit 424 that would execute microinstructions 126 with an additional source operand. Fifth, it may require Q additional tag comparators, where $Q = \Sigma i=1$ to $n, (R[i]*P[i]*J[i])$, where n is the number of execution units 424, R[i] is the number of reservation station 406 entries for execution unit [i] 424, P[i] is the maximum number of source operands specifiable by a microinstruction executable by execution unit [i] 424, and J[i] is the number of execution units 424 that are capable of forwarding to execution unit [i] 424. Sixth, it may require additional renaming lookup in the RAT 402 for the additional source operand. Seventh, it may require the reservation stations 406 to be expanded to handle the additional source operand. The additional cost in terms of speed, power, and real estate might be undesirable.

Same-Source-Destination Optimization Embodiments

Figure 21:
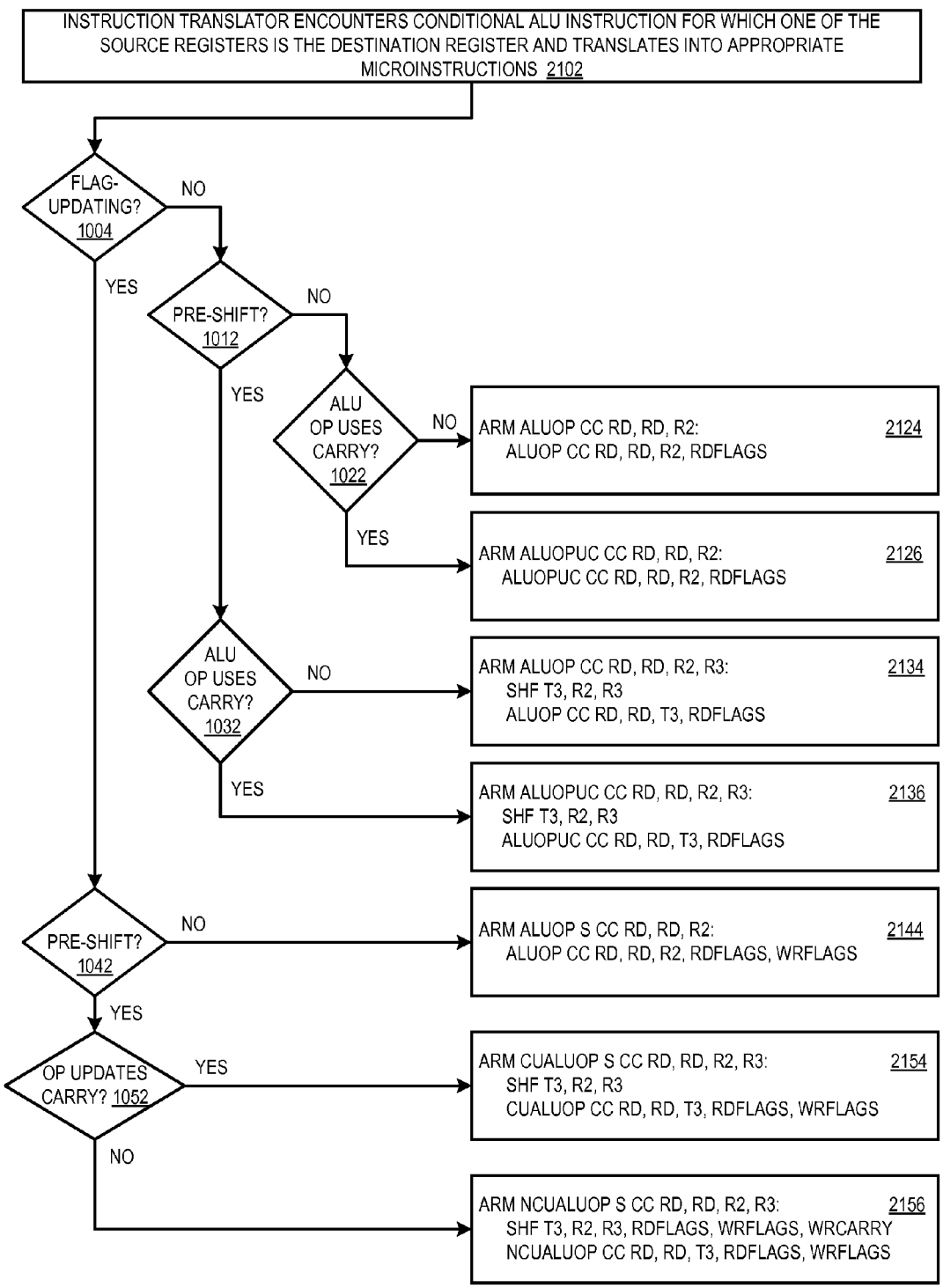
FIG. 21 is a flowchart illustrating operation of the hardware instruction translator of FIG. 1 to translate conditional ALU instructions that specify one of the source registers to be the same register as the destination register.
Figure 22:
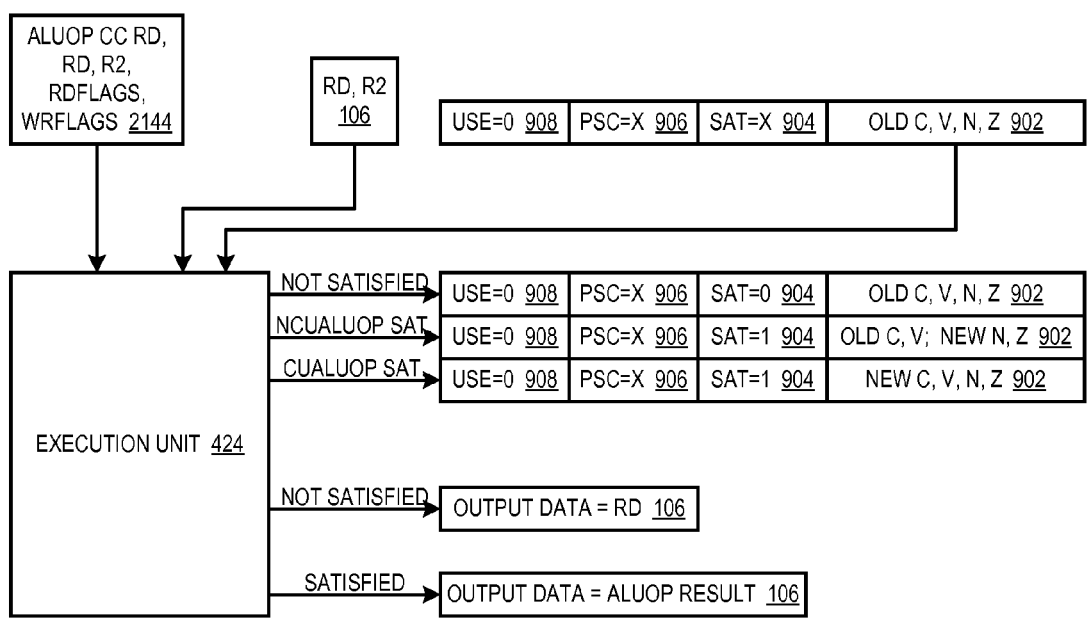
FIGS. 22 through 28 are block diagrams illustrating operation of the execution pipeline 112 of FIG. 1 to execute a conditional ALU instruction of various types translated according to FIG. 21.
Figure 23:
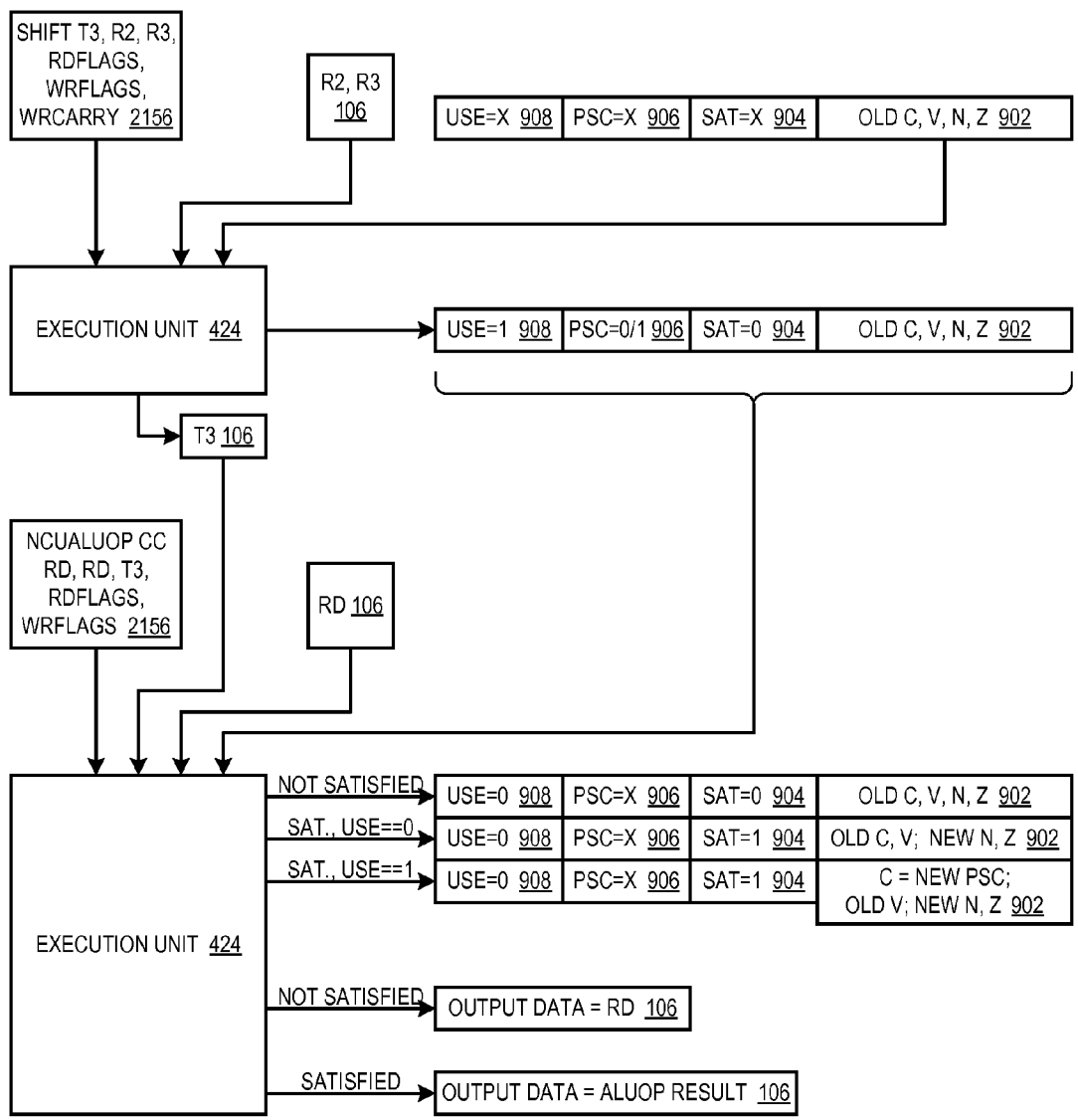
Figure 24:
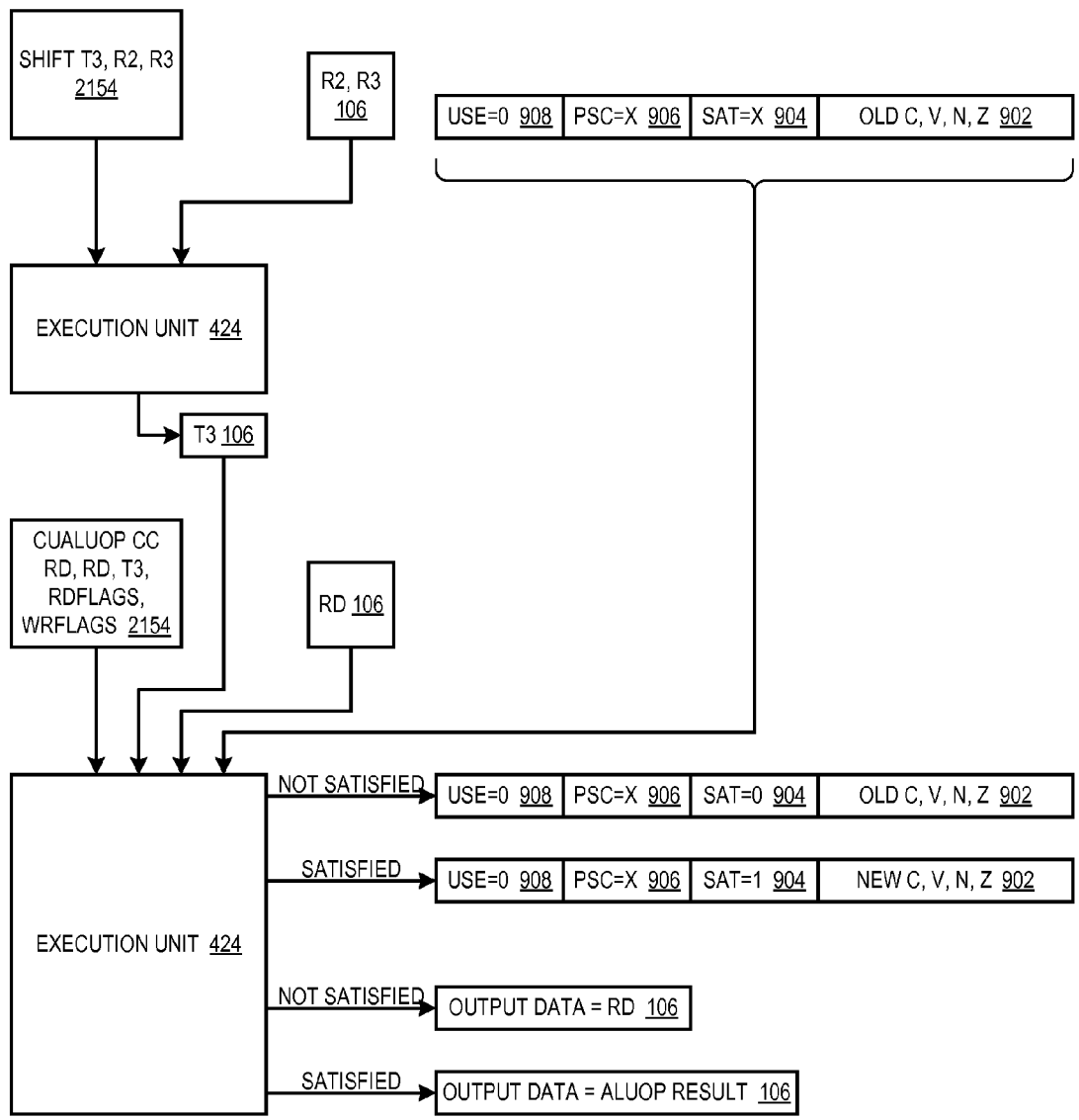

Referring now to FIG. 21, a flowchart illustrating operation of the hardware instruction translator 104 of FIG. 1 to translate conditional ALU instructions 124 according to the present invention is shown. Generally, the operation of the hardware instruction translator 104 according to FIG. 21 is similar in many ways to the operation of the hardware instruction translator 104 according to FIG. 10, particularly with respect to the various decisions made at the decision blocks, which are all therefore similarly numbered.

In FIG. 21, block 1002 of FIG. 10 is replaced with block 2102 in which the conditional ALU instruction 124 encountered by the hardware instruction translator 104 is different from that encountered at block 1002 because the conditional ALU instruction 124 encountered at block 2102 specifies one of the source registers to be the same register as the destination register. Advantageously, the hardware instruction translator 104 is configured to recognize this condition and make optimizations to the microinstruction 126 it emits. In particular, the hardware instruction translator 104 decodes the same-source-destination conditional ALU instruction 124 and translates it into different sequence of microinstructions 126 than those described with respect to blocks 1024, 1026, 1034, 1036, 1044, 1054, and 1056 (the "ten hundred blocks") of FIG. 10. The different sequence of microinstructions 126 are described in blocks 2124, 2126, 2134, 2136, 2144, 2154 and 2156 (the "twenty-one hundred blocks") in FIG. 21 that replace their corresponding ten hundred block. In particular, the microinstruction 126 sequence in each of the twenty-one hundred blocks has one less microinstruction 126 than the microinstruction 126 sequence in its corresponding ten hundred block. More specifically, the twenty-one hundred block sequences do not include the CMOV or XMOV microinstructions 126, and the selective writing of either the original destination register value or the result value is performed by a conditional ALU microinstruction 126 at the end of the sequence, as discussed in more detail below.

At block 2124, the hardware instruction translator 104 translates the same-source-destination non-flag-updating, non-pre-shifting, non-carry-using conditional ALU instruction 124 into a single microinstruction 126, namely, a conditional ALU operation microinstruction 126 (denoted ALUOP CC). In the example of block 2124, the conditional ALU instruction 124 is similar to that described with respect to block 1024, except that the first source operand is the destination register (RD). Thus, the conditional ALU instruction 124 specifies a first source register (RD) and a second source register (R2), an ALU operation (denoted ALUOP) to be performed on RD and R2 to generate a result, and a destination register (RD), which is the same as the first source register, to which the result is conditionally written. The conditional ALUOP microinstruction 126 specifies the same ALU operation and condition as the conditional ALU instruction 124. The execution unit 424 that executes the conditional ALUOP microinstruction 126 receives the old, or current, value of the destination register RD and receives the second source operand value R2, according to block 1202, and performs the ALU operation on the two source operands to generate a result, according to block 1204. The execution unit 424 also receives the condition flags 924 and examines them to determine whether they satisfy the specified condition, according to block 1204. If so, the execution unit 424 outputs the result, according to block 1211, and otherwise outputs the old destination register value, according to block 1212. The execution of the conditional ALUOP microinstruction 126 is shown in the block diagram of FIG. 28. Flow ends at block 2124.

Figure 27:
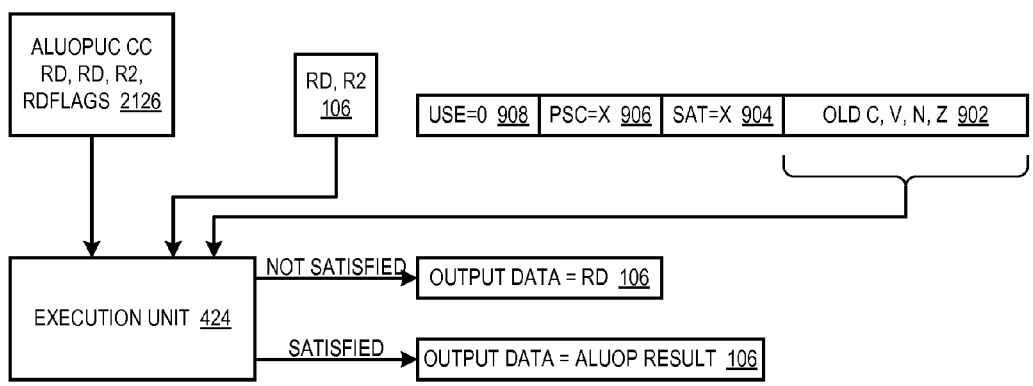
Figure 28:
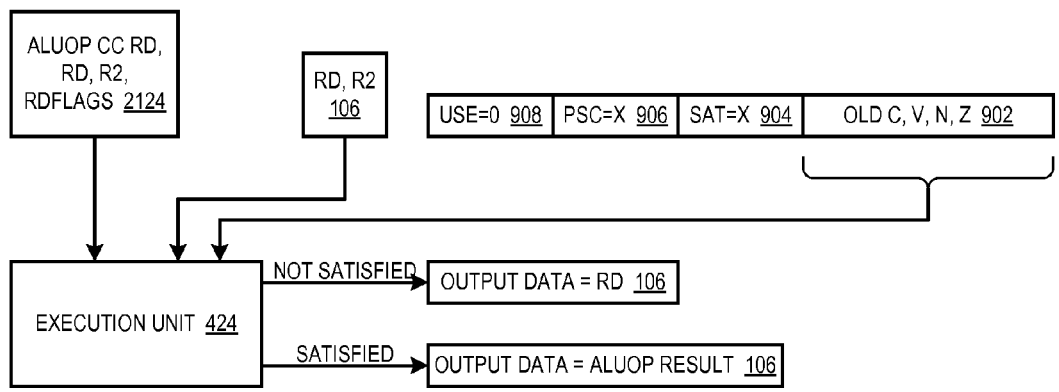

At block 2126, the hardware instruction translator 104 translates the same-source-destination non-flag-updating, non-pre-shifting, carry-using conditional ALU instruction 124 into a single microinstruction 126, namely, a carry-using conditional ALU operation microinstruction 126 (denoted ALUOPUC CC). In the example of block 2126, the conditional ALU instruction 124 is similar to that of block 2124, except that the ALU operation it specifies uses the carry flag, and is similar to that described with respect to block 1026, except that the first source operand is the destination register (RD). The conditional ALUOPUC microinstruction 126 is similar to that described with respect to block 2124; however, the ALU operation it specifies uses the carry flag. The execution of the conditional ALUOPUC microinstruction 126, as shown in the block diagram of FIG. 27, is similar to the execution of the conditional ALUOP microinstruction 126 of block 2124 except that the execution unit 424 uses the carry flag to perform the ALU operation. Flow ends at block 2126.

At block 2134, the hardware instruction translator 104 translates the same-source-destination non-flag-updating, pre-shifting, non-carry-using conditional ALU instruction 124 into first and second microinstructions 126, namely: (1) a shift microinstruction 126; and (2) a conditional ALUOP microinstruction 126. In the example of block 2134, the conditional ALU instruction 124 is similar to that described with respect to block 1034, except that the first source operand is the destination register (RD), and is similar to that described with respect to block 2124, except the conditional ALU instruction 124 also specifies a pre-shift operation on the second source operand (R2) by a shift amount which, in the example of block 2134, is held in a third source register (R3) specified by the conditional ALU instruction 124. However, if the conditional ALU instruction 124 is of the type that specifies the shift amount as a constant within the instruction 124, then the third source register is not used. The shift microinstruction 126 is similar to that described with respect to block 1034, and the execution unit 424 executes the shift microinstruction 126 similar to the manner described with respect to block 1034 and FIG. 18. Although in the case of block 2134 the carry flag value generated by the shift microinstruction 126 is not used since the conditional ALU instruction 124 specifies that the architectural condition flags 902 are not updated, in the case of block 2156, for example, the carry flag value generated by the shift microinstruction 126 is used as discussed in more detail below. Furthermore, the pre-shift operation may require the old carry flag to be rotated into the resulting shifted value; for example, the RRX pre-shift operation shifts the carry flag into the most significant bit of the result. In such situations, although not shown in FIG. 21 (except in block 2156), when the execution unit 424 executes the shift microinstruction 126 it will also read the condition flags 924 to get the current carry flag value. The conditional ALUOP microinstruction 126 and its execution is similar to that described with respect to block 2124; however, it receives the value of T3 rather than R2 and performs the ALU operation on R1 and T3 to generate the result written to RD. The execution of the shift microinstruction 126 and the conditional ALUOP microinstruction 126 is shown in the block diagram of FIG. 26. Flow ends at block 2134.

Figure 25:
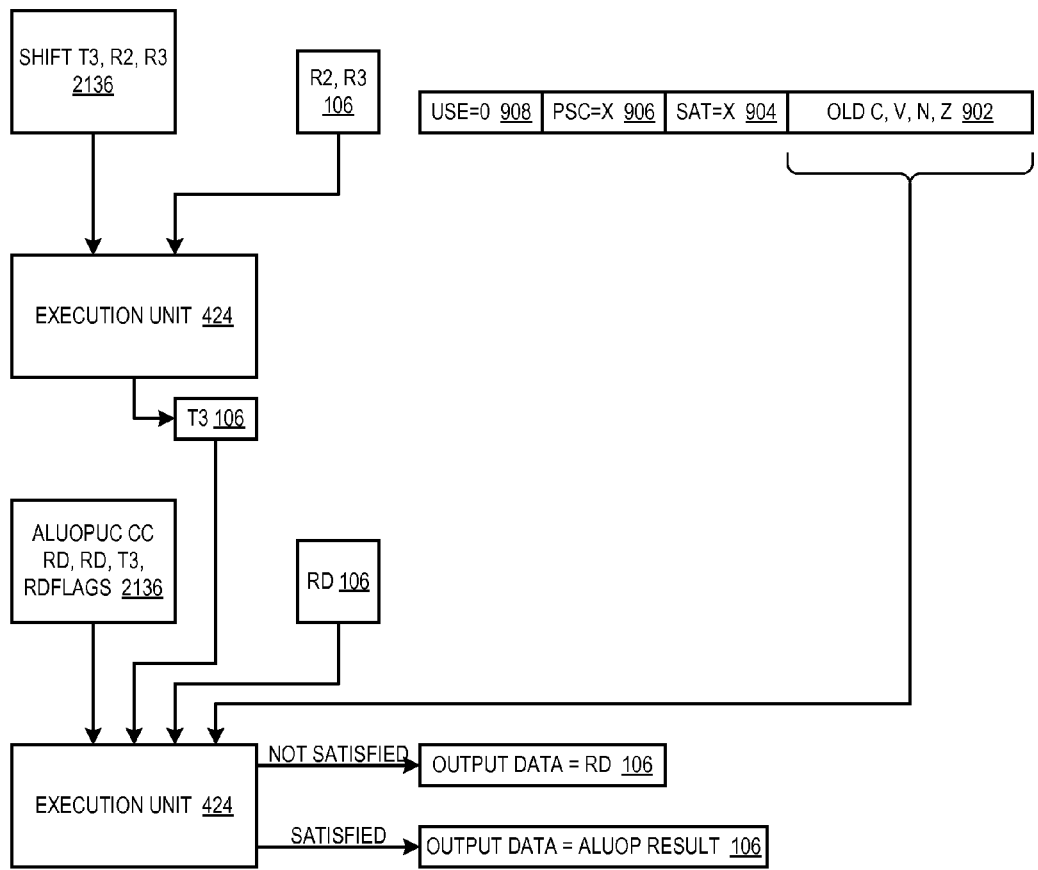
Figure 26:
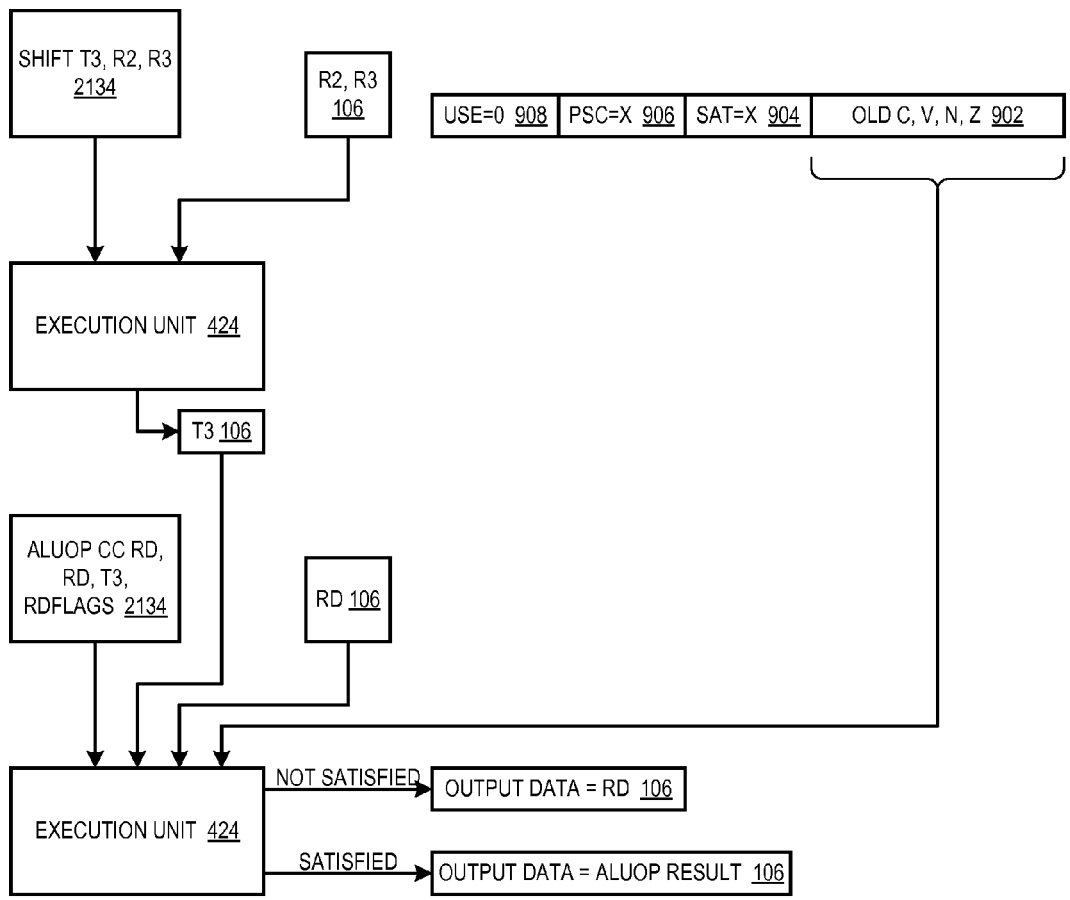

At block 2136, the hardware instruction translator 104 translates the same-source-destination non-flag-updating, pre-shifting, carry-using conditional ALU instruction 124 into first and second microinstructions 126, namely: (1) a shift microinstruction 126; and (2) a carry-using conditional ALUOP microinstruction 126 (denoted ALUOPUC CC). In the example of block 2136, the conditional ALU instruction 124 is similar to that of block 2134, except that the ALU operation it specifies uses the carry flag, and is similar to that described with respect to block 1036, except that the first source operand is the destination register (RD). The two microinstructions 126 and their execution are similar to those described with respect to block 2134; however, the ALUOPUC microinstruction 126 also receives the condition flags 924 in order to obtain the current value of the carry flag for use in the carry-using ALU operation. The execution of the shift microinstruction 126 and the conditional ALUOPUC microinstruction 126, as shown in the block diagram of FIG. 25, is similar to the execution of the shift microinstruction 126 and the conditional ALUOP microinstruction 126 of block 2134 except that the execution unit 424 uses the carry flag to perform the ALU operation. Flow ends at block 2136.

At block 2144, the hardware instruction translator 104 translates the same-source-destination flag-updating, non-pre-shifting conditional ALU instruction 124 into a single microinstruction 126, namely a conditional ALU operation microinstruction 126 (denoted ALUOP CC). In the example of block 2144, the conditional ALU instruction 124 is similar to the conditional ALU instruction 124 of block 2124 except that it updates the architectural condition flags 902, and is similar to that described with respect to block 1044, except that the first source operand is the destination register (RD). The conditional ALU operation microinstruction 126 of block 2144 and its execution are similar to that of block 2124, except that the ALU operation microinstruction 126 of block 2144 also updates the architectural condition flags 902, and is similar to the conditional ALU microinstruction 126 of block 1044, except that its first operand is the destination register (RD) rather than R1 and its destination register is RD rather than T2. The execution unit 424 that executes the conditional ALU microinstruction 126 receives RD and R2 as source operands, according to block 1202, and performs the specified ALU operation on the two source operands to generate a result, according to block 1204. The execution unit 424 also receives the architectural condition flags 902 and determines whether they satisfy the specified condition, according to block 1206. If so, the execution unit 424 outputs the ALU operation result for writing to RD, according to block 1222 or 1226 depending upon whether the ALU operation is carry-updating, and otherwise outputs the old value of RD, according to block 1216. Furthermore, the execution unit 424 writes the condition flags register 926, according to block 1216, 1222 or 1226 depending upon whether the condition was satisfied and whether the ALU operation was carry-updating. If the condition was not satisfied, the execution unit 424 writes the old condition flag values to the architectural condition flags 902, according to block 1216; whereas, if the condition was satisfied, the execution unit 424 updates the architectural condition flags 902 based on the result of the ALU operation, according to block 1222 for a carry-updating ALU operation and according to block 1226 for a non-carry-updating ALU operation. The execution of the conditional ALUOP microinstruction 126 is shown in the block diagram of FIG. 22. It is noted that the ALU operation performed by the conditional ALU operation microinstruction 126 generated at block 2144 (and at blocks 1054 and 1056) may be an ALU operation that uses the carry flag (similar to those described with respect to blocks 1026 and 1036), and since the microinstruction 126 reads the flags (as indicated by the RDFLAGS indicator) the execution unit 424 has the carry flag to perform the carry-using ALU operation. Flow ends at block 2144.

At block 2154, the hardware instruction translator 104 translates the same-source-destination flag-updating, pre-shifting, carry-updating conditional ALU instruction 124 into first and second microinstructions 126, namely: (1) a shift microinstruction 126; and (2) a conditional carry-updating ALU operation microinstruction 126 (denoted CUALUOP CC). In the example of block 2154, the conditional ALU instruction 124 is similar to that described with respect to block 2134, except the conditional ALU instruction 124 also specifies that the architectural condition flags 902 are to be updated, and is similar to that described with respect to block 1054, except that the first source operand is the destination register (RD). The shift microinstruction 126 is similar to that described with respect to block 1034, and the execution unit 424 executes the shift microinstruction 126 similar to the manner described with respect to block 1034 and FIG. 18. The CUALUOP microinstruction 126 and its execution are similar to the conditional ALU microinstruction 126 of block 2124, except that the CUALUOP microinstruction 126 of block 2144 also updates the architectural condition flags 902, and is similar to the conditional ALU microinstruction 126 of block 1054, except that its first operand is the destination register (RD) rather than R1 and its destination register is RD rather than T2. The execution unit 424 that executes the CUALUOP microinstruction 126 receives RD and T3 as source operands, according to block 1202, and performs the specified ALU operation on RD and T3 to generate a result, according to block 1204. Additionally, the execution unit 424 receives the architectural condition flags 902, according to block 1202, and determines whether they satisfy the specified condition, according to block 1206. Furthermore, the execution unit 424 updates the condition flags register 926, according to block 1216 or block 1222, depending upon whether the condition was satisfied. If the condition was not satisfied, the execution unit 424 writes the old condition flag values to the architectural condition flags 902; whereas, if the condition was satisfied, the execution unit 424 updates the architectural condition flags 902 based on the result of the ALU operation. The execution of the shift microinstruction 126 and the conditional ALUOP microinstruction 126 is shown in the block diagram of FIG. 24. Flow ends at block 2154.

At block 2156, the hardware instruction translator 104 translates the same-source-destination flag-updating, pre-shifting, non-carry-updating conditional ALU instruction 124 into first and second microinstructions 126, namely: (1) a shift microinstruction 126; and (2) a conditional non-carry-updating ALU operation microinstruction 126 (denoted NCUALUOP CC). In the example of block 2156, the conditional ALU instruction 124 is similar to that described with respect to block 2154, except the conditional ALU instruction 124 specifies a non-carry-updating ALU operation, and is similar to that described with respect to block 1056, except that the first source operand is the destination register (RD). Consequently, the architectural carry flag 902 is updated with the pre-shift carry flag value if the condition is satisfied. The shift microinstruction 126 is similar to that described with respect to block 2134; however, the shift microinstruction 126 reads and writes the condition flags register 926. More specifically, the execution unit 424 that executes the shift microinstruction 126: (1) writes the carry flag value generated by the pre-shift operation to the PSC bit 906; (2) sets the USE bit 908 to instruct the conditional NCUALUOP microinstruction 126 to use the PSC 906 to update the architectural carry flag 902; and (3) writes the old architectural condition flags 902 back to the condition flags register 926, according to block 1114, so that the NCUALUOP microinstruction 126 can evaluate the old value of the architectural condition flags 902 to determine whether they satisfy the specified condition. The NCUALUOP microinstruction 126 specifies the same condition specified by the conditional ALU instruction 124. The execution unit 424 that executes the NCUALUOP microinstruction 126 performs the ALU operation on RD and T3 to generate a result, according to block 1204. Additionally, the execution unit 424 receives the architectural condition flags 902 and determines whether they satisfy the condition, according to block 1206. Furthermore, the execution unit 424 writes the condition flags register 926, according to block 1216, 1226 or 1228, depending upon whether the condition was satisfied and whether the USE bit 908 is set. More specifically, if the condition was not satisfied, the execution unit 424 writes the old condition flag values to the architectural condition flags 902, according to block 1216; whereas, if the condition was satisfied, the execution unit 424 updates the architectural condition flags 902 based on the result of the ALU operation, according to block 1226 or 1228, depending upon whether the USE bit 908 is set. More specifically, the architectural overflow (V) flag 902 is written with the old overflow flag value 924 and the N and Z flags are written with the new values generated based on the result. Additionally, the architectural carry flag 902 is updated with the pre-shift carry flag value in the PSC bit 906 if the USE bit 908 so indicates, according to block 1228, and otherwise is updated with the old carry flag value 924, according to block 1226. The execution of the shift microinstruction 126 and the NCUALUOP microinstruction 126 is shown in the block diagram of FIG. 23. Flow ends at block 2156.

There are advantages associated with the fact that the hardware instruction translator 104 makes an optimization when the conditional ALU instruction 124 specifies the destination register is the same as one of the source registers and generates a sequence of with one less microinstruction 126. First, it may increase the lookahead capability of the microprocessor 100 to exploit instruction level parallelism of the program being run, which typically increases the utilization of the execution units 424. The lookahead capability may be increased because the reduction in the number of microinstructions 126 means an increase in free slots in the ROB 422 for additional microinstructions 126 associated with subsequently translated ISA instructions 124, which potentially creates a larger pool of microinstructions 126 who are ready to be issued for execution. Second, because there is a predetermined number of slots to which the hardware instruction translator 104 can emit microinstruction 126 each clock cycle and, at least in one embodiment the hardware instruction translator 104 must emit in the same clock cycle all the microinstructions 126 that implement a given ISA instruction 124, reducing the number of microinstructions 126 into which a conditional ALU instruction 124 is translated may also decrease the average number of empty microinstruction 126 slots per clock, which also tends to increase the lookahead capability of the microprocessor 100 and utilization of the execution units 424.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network or other communications medium. Embodiments of the apparatus and method described herein may be included in a semiconductor intellectual property core, such as a microprocessor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor having architectural condition flags that include an architectural carry flag and other architectural condition flags, wherein the microprocessor performs an architectural instruction that instructs the microprocessor to perform a shift operation on a first source operand to generate a first result, to perform a second operation on the first result and a second operand to generate a second result, and to write the second result to a destination register and update the condition flags only if the architectural condition flags satisfy a condition specified in the architectural instruction, the microprocessor comprising:
 a register, that includes storage for the architectural condition flags and includes storage for a non-architectural carry flag;
 a hardware instruction translator, that receives the architectural instruction and responsively translates the architectural instruction into first and second microinstructions; and
 an execution pipeline, that executes the microinstructions received from the hardware instruction translator;
 wherein in response to the first microinstruction, the execution pipeline:
  performs the shift operation on the first source operand to generate the first result and a carry flag value; and
  updates the non-architectural carry flag with the generated carry flag value;
 wherein in response to the second microinstruction, the execution pipeline:
  performs the second operation on the first result and the second operand to generate the second result and new condition flag values based on the second result; and
  if the architectural condition flags satisfy the condition, updates the architectural carry flag with the non-architectural carry flag value and updates at least one of the other architectural condition flags with the corresponding generated new condition flag values; and
  if the architectural condition flags do not satisfy the condition, updates the architectural condition flags with the current value of the architectural condition flags.

2. The microprocessor of claim 1,
 wherein the register also includes storage for a non-architectural indicator;
 wherein the hardware instruction translator responsively translates the architectural instruction also into a third microinstruction that succeeds the first and second microinstructions;
 wherein in response to the second microinstruction, the execution pipeline:
  determines whether the architectural condition flags satisfy the condition and updates the non-architectural indicator accordingly;
 wherein in response to the third microinstruction, the execution pipeline:
  updates the destination register with the second result if the non-architectural indicator indicates the architectural condition flags satisfy the condition; and
  updates the destination register with the current value of the destination register if the non-architectural indicator indicates the architectural condition flags do not satisfy the condition.

3. The microprocessor of claim 2, further comprising:
 a register file, wherein the register file is configured such that it can supply at most two source operands at a time for the microinstructions;
 wherein the first and second source operands are provided from two source registers of the register file, wherein the destination register is of the register file, wherein the destination register is distinct from the two source registers.

4. The microprocessor of claim 1,
 wherein in response to the second microinstruction, the execution pipeline:
  updates the destination register with the second result if the architectural condition flags satisfy the condition; and
  updates the destination register with the current value of the destination register if the architectural condition flags do not satisfy the condition.

5. The microprocessor of claim 4, further comprising:
 a register file, wherein the register file is configured such that it can supply at most two source operands at a time for the microinstructions;
 wherein the first and second source operands are provided from two source registers of the register file, wherein the destination register is of the register file, wherein the destination register is the same register as one of the two source registers.

6. The microprocessor of claim 1, wherein in response to the first microinstruction, the execution pipeline further:
 updates the architectural condition flags with the current value of the architectural condition flags.

7. The microprocessor of claim 1, wherein the register is renamed by a rename unit of the microprocessor.

8. The microprocessor of claim 1, wherein the first source operand is a constant value specified within an immediate field of the architectural instruction.

9. The microprocessor of claim 1, wherein the first source operand is a value stored in an architectural register of the microprocessor.

10. The microprocessor of claim 1, wherein the first source operand is shifted by an amount specified within an immediate field of the architectural instruction.

11. The microprocessor of claim 1, wherein the first source operand is shifted by an amount stored in an architectural register of the microprocessor.

12. The microprocessor of claim 1,
 wherein the architectural condition flags include an architectural overflow flag;
 wherein the generated new condition flag values based on the second result include an overflow flag value;
 wherein in response to the second microinstruction, the execution pipeline:
  if the architectural condition flags satisfy the condition:
   if the second operation specified by the architectural instruction is a type that does not update the architectural overflow flag, updates the architectural overflow flag with the current value of the architectural overflow flag; and
   if the second operation specified by the architectural instruction is a type that does update the architectural overflow flag, updates the architectural overflow flag with the generated new overflow flag value.

13. The microprocessor of claim 1, wherein the at least one of the other architectural condition flags updated by the execution pipeline in response to the second microinstruction includes a negative condition flag and a zero condition flag.

14. The microprocessor of claim 1, wherein the architectural instruction is an ARM ISA instruction.

15. A method for a microprocessor, having architectural condition flags that include an architectural carry flag and other architectural condition flags, to perform an architectural instruction that instructs the microprocessor to perform a shift operation on a first source operand to generate a first result, to perform a second operation on the first result and a second operand to generate a second result, and to write the second result to a destination register and update the condition flags only if the architectural condition flags satisfy a condition specified in the architectural instruction, the method comprising:

translating the architectural instruction into first and second microinstructions, wherein said translating is performed by a hardware instruction translator of the microprocessor; and executing the first and second microinstructions received from the hardware instruction translator, wherein said executing is performed by an execution pipeline of the microprocessor;

wherein said executing the first microinstruction comprises:

performing the shift operation on the first source operand to generate the first result and a carry flag value; and updating a non-architectural carry flag with the generated carry flag value;

wherein said executing the second microinstruction comprises:

performing the second operation on the first result and the second operand to generate the second result and new condition flag values based on the second result;

if the architectural condition flags satisfy the condition, updating the architectural carry flag with the non-architectural carry flag value and updating at least one of the other architectural condition flags with the corresponding generated new condition flag values; and if the architectural condition flags do not satisfy the condition, updating the architectural condition flags with the current value of the architectural condition flags.

16. The method of claim 15, further comprising:

translating the architectural instruction also into a third microinstruction that succeeds the first and second microinstructions;

wherein said executing the second microinstruction comprises:

determining whether the architectural condition flags satisfy the condition and updating the non-architectural indicator accordingly;

wherein said executing the third microinstruction comprises:

updating the destination register with the second result if the non-architectural indicator indicates the architectural condition flags satisfy the condition; and updating the destination register with the current value of the destination register if the non-architectural indicator indicates the architectural condition flags do not satisfy the condition.

17. The method of claim 16, wherein the microprocessor also includes a register file configured such that it can supply at most two source operands at a time for the microinstructions, the method further comprising:

providing the first and second source operands to the execution pipeline from two source registers of the register file;

wherein the destination register is of the register file, wherein the destination register is distinct from the two source registers.

18. The method of claim 15, wherein said executing the second microinstruction comprises:

updating the destination register with the second result if the architectural condition flags satisfy the condition; and updating the destination register with the current value of the destination register if the architectural condition flags do not satisfy the condition.

19. The method of claim 18, wherein the microprocessor also includes a register file configured such that it can supply at most two source operands at a time for the microinstructions, the method further comprising:

providing the first and second source operands to the execution pipeline from two source registers of the register file;

wherein the destination register is of the register file, wherein the destination register is the same register as one of the two source registers.

20. The method of claim 15, wherein said executing the first microinstruction further comprises:

updating the architectural condition flags with the current value of the architectural condition flags.

21. The method of claim 15, wherein the architectural condition flags include an architectural overflow flag;

wherein the generated new condition flag values based on the second result include an overflow flag value;

wherein said executing the second microinstruction comprises:

if the architectural condition flags satisfy the condition:

if the second operation specified by the architectural instruction is a type that does not update the architectural overflow flag, updating the architectural overflow flag with the current value of the architectural overflow flag; and if the second operation specified by the architectural instruction is a type that does update the architectural overflow flag, updating the architectural overflow flag with the generated new overflow flag value.

22. The method of claim 15, wherein the at least one of the other architectural condition flags updated by the execution pipeline in response to the second microinstruction includes a negative condition flag and a zero condition flag.

23. The method of claim 15, wherein the architectural instruction is an ARM ISA instruction.

24. A computer program product encoded in at least one non-transitory computer readable storage medium for use with a computing device, the computer program product comprising:

computer readable program code embodied in said non-transitory computer readable storage medium, for specifying a microprocessor having architectural condition flags that include an architectural carry flag and other architectural condition flags, wherein the microprocessor performs an architectural instruction that instructs the microprocessor to perform a shift operation on a first source operand to generate a first result, to perform a second operation on the first result and a second operand to generate a second result, and to write the second result to a destination register and update the condition flags only if the architectural condition flags satisfy a condition specified in the architectural instruction, the computer readable program code comprising:
first program code for specifying a register, that includes storage for the architectural condition flags and includes storage for a non-architectural carry flag;
second program code for specifying a hardware instruction translator, that receives the architectural instruction and responsively translates the architectural instruction into first and second microinstructions; and
third program code for specifying an execution pipeline, that executes the microinstructions received from the hardware instruction translator;
wherein in response to the first microinstruction, the execution pipeline:
performs the shift operation on the first source operand to generate the first result and a carry flag value; and
updates the non-architectural carry flag with the generated carry flag value;
wherein in response to the second microinstruction, the execution pipeline:
performs the second operation on the first result and the second operand to generate the second result and new condition flag values based on the second result;
if the architectural condition flags satisfy the condition, updates the architectural carry flag with the non-architectural carry flag value and updates at least one of the other architectural condition flags with the corresponding generated new condition flag values; and
if the architectural condition flags do not satisfy the condition, updates the architectural condition flags with the current value of the architectural condition flags.

25. The computer program product of claim 24, wherein the at least one computer readable storage medium is selected from the set of a disk, tape, or other magnetic, optical, or electronic storage medium and a network, wire line, wireless or other communications medium.

\* \* \* \* \*